US008738255B2

(12) United States Patent
Carter et al.

(10) Patent No.: US 8,738,255 B2
(45) Date of Patent: May 27, 2014

(54) SYSTEMS AND METHODS FOR CONTROL OF TRANSMISSION AND/OR PRIME MOVER

(75) Inventors: Jeremy Carter, Austin, TX (US); Brad P Pohl, Leander, TX (US); Loren T McDaniel, Austin, TX (US); Cyril Keilers, Round Rock, TX (US); Tim Ruggles, Round Rock, TX (US); David Rogers, Round Rock, TX (US); Eric Diehl, Austin, TX (US); Austin Orand, Austin, TX (US); Alan Mark Delz, Round Rock, TX (US); Paul Argus Parks, Austin, TX (US); Mark E Bartholomew, Round Rock, TX (US); Christopher M Vasiliotis, Cedar Park, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 1065 days.

(21) Appl. No.: 12/525,294

(22) PCT Filed: Jan. 31, 2008

(86) PCT No.: PCT/US2008/052685
§ 371 (c)(1),
(2), (4) Date: Jul. 30, 2009

(87) PCT Pub. No.: WO2008/095116
PCT Pub. Date: Aug. 7, 2008

(65) Prior Publication Data
US 2010/0131164 A1 May 27, 2010

Related U.S. Application Data

(60) Provisional application No. 60/887,767, filed on Feb. 1, 2007, provisional application No. 60/895,713, filed on Mar. 19, 2007, provisional application No. 60/914,633, filed on Apr. 27, 2007.

(51) Int. Cl.
*G06F 17/00* (2006.01)

(52) U.S. Cl.
USPC ............ 701/61; 701/57; 701/58; 701/60; 180/65.1; 180/65.25; 475/189; 475/190; 475/191; 476/36; 476/38; 476/39

(58) Field of Classification Search
None
See application file for complete search history.

(56) References Cited

U.S. PATENT DOCUMENTS

| 719,595 A | 2/1903 | Huss |
|---|---|---|
| 1,121,210 A | 12/1914 | Techel |

(Continued)

FOREIGN PATENT DOCUMENTS

| CH | 118064 | 12/1926 |
|---|---|---|
| CN | 1157379 A | 8/1997 |

(Continued)

OTHER PUBLICATIONS

International Search Report and Written Opinion dated Feb. 2, 2010 from International Patent Application No. PCT/US2008/068929, filed on Jan. 7, 2008.

(Continued)

*Primary Examiner* — Khoi Tran
*Assistant Examiner* — Jonathan L Sample
(74) *Attorney, Agent, or Firm* — Knobbe Martens Olson & Bear LLP

(57) ABSTRACT

Disclosed here are inventive systems and methods for a powertrain of an electric vehicle (EV). In some embodiments, said powertrain includes a continuously variable transmission (CVT) coupled to an electric drive motor, wherein a control system is configured to control the CVT and/or the drive motor to optimize various efficiencies associated with the EV and/or its subsystems. In one specific embodiment, the control system is configured to operate the EV in an economy mode. Operating in said mode, the control system simultaneously manages the CVT and the drive motor to optimize the range of the EV. The control system can be configured to manage the current provided to the drive motor, as well as adjust a transmission speed ratio of the CVT. Other modes of operation are also disclosed. The control system can be configured to manage the power to the drive motor and adjust the transmission speed ratio of the CVT taking into account battery voltage, throttle position, and transmission speed ratio, for example.

13 Claims, 43 Drawing Sheets

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A * | 5/1921 | Nielsen .................... 475/189 |
| 1,390,971 A | 9/1921 | Samain |
| 1,558,222 A | 10/1925 | Beetow |
| 1,629,092 A | 5/1927 | Arter et al. |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Georges |
| 2,461,258 A | 2/1949 | Brooks |
| 2,469,653 A | 5/1949 | Kopp |
| 2,480,968 A | 9/1949 | Ronai |
| 2,596,538 A | 5/1952 | Dicke |
| 2,597,849 A | 5/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,874,592 A | 2/1959 | Oehrli |
| 2,883,883 A | 4/1959 | Chillson |
| 2,891,213 A | 6/1959 | Kern |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,163,050 A | 12/1964 | Kraus |
| 3,176,542 A | 4/1965 | Monch |
| 3,184,983 A | 5/1965 | Kraus |
| 3,211,364 A | 10/1965 | Wentling et al. |
| 3,216,283 A | 11/1965 | General |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,340,895 A | 9/1967 | Osgood, Jr. et al. |
| 3,407,687 A | 10/1968 | Hayashi |
| 3,440,895 A | 4/1969 | Fellows |
| 3,464,281 A | 9/1969 | Azuma Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,996,807 A | 12/1976 | Adams |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,526,255 A | 7/1985 | Hennessey et al. |
| 4,560,369 A | 12/1985 | Hattori |
| 4,574,649 A | 3/1986 | Seol |
| 4,585,429 A | 4/1986 | Marier |
| 4,630,839 A | 12/1986 | Seol |
| 4,631,469 A | 12/1986 | Tsuboi et al. |
| 4,651,082 A | 3/1987 | Kaneyuki |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A * | 4/1991 | Itoh et al. .................. 474/28 |
| 5,020,384 A | 6/1991 | Kraus |
| 5,033,322 A | 7/1991 | Nakano |
| 5,037,361 A | 8/1991 | Takahashi |
| 5,069,655 A | 12/1991 | Schievelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,330,396 A | 7/1994 | Lohr et al. |
| 5,355,749 A * | 10/1994 | Obara et al. .................. 477/20 |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,690,346 A | 11/1997 | Keskitalo |

(56) References Cited

U.S. PATENT DOCUMENTS

| | | | |
|---|---|---|---|
| 5,722,502 A * | 3/1998 | Kubo | 180/65.23 |
| 5,746,676 A | 5/1998 | Kawase et al. | |
| 5,755,303 A | 5/1998 | Yamamoto et al. | |
| 5,799,541 A | 9/1998 | Arbeiter | |
| 5,823,052 A | 10/1998 | Nobumoto | |
| 5,846,155 A | 12/1998 | Taniguchi et al. | |
| 5,888,160 A | 3/1999 | Miyata et al. | |
| 5,899,827 A | 5/1999 | Nakano et al. | |
| 5,902,207 A | 5/1999 | Sugihara | |
| 5,967,933 A | 10/1999 | Valdenaire | |
| 5,984,826 A | 11/1999 | Nakano | |
| 6,000,707 A | 12/1999 | Miller | |
| 6,004,239 A | 12/1999 | Makino | |
| 6,006,151 A | 12/1999 | Graf | |
| 6,015,359 A | 1/2000 | Kunii | |
| 6,019,701 A | 2/2000 | Mori et al. | |
| 6,029,990 A | 2/2000 | Busby | |
| 6,042,132 A | 3/2000 | Suenaga et al. | |
| 6,045,477 A | 4/2000 | Schmidt | |
| 6,045,481 A | 4/2000 | Kumagai | |
| 6,053,833 A * | 4/2000 | Masaki | 475/2 |
| 6,053,841 A | 4/2000 | Koide et al. | |
| 6,054,844 A | 4/2000 | Frank | |
| 6,066,067 A | 5/2000 | Greenwood | |
| 6,071,210 A | 6/2000 | Kato et al. | |
| 6,076,846 A | 6/2000 | Clardy | |
| 6,079,726 A | 6/2000 | Busby | |
| 6,095,940 A | 8/2000 | Ai et al. | |
| 6,099,431 A | 8/2000 | Hoge et al. | |
| 6,113,513 A | 9/2000 | Itoh et al. | |
| 6,119,539 A | 9/2000 | Papanicolaou | |
| 6,119,800 A * | 9/2000 | McComber | 180/65.7 |
| 6,159,126 A | 12/2000 | Oshidari | |
| 6,171,210 B1 | 1/2001 | Miyata et al. | |
| 6,174,260 B1 | 1/2001 | Tsukada et al. | |
| 6,186,922 B1 | 2/2001 | Bursal et al. | |
| 6,217,473 B1 | 4/2001 | Ueda et al. | |
| 6,241,636 B1 | 6/2001 | Miller | |
| 6,243,638 B1 | 6/2001 | Abo et al. | |
| 6,251,038 B1 | 6/2001 | Ishikawa et al. | |
| 6,258,003 B1 | 7/2001 | Hirano et al. | |
| 6,311,113 B1 * | 10/2001 | Danz et al. | 701/57 |
| 6,312,358 B1 | 11/2001 | Goi et al. | |
| 6,322,475 B2 | 11/2001 | Miller | |
| 6,325,386 B1 | 12/2001 | Shoge | |
| 6,358,178 B1 | 3/2002 | Wittkopp | |
| 6,375,412 B1 | 4/2002 | Dial | |
| 6,390,946 B1 | 5/2002 | Hibi et al. | |
| 6,406,399 B1 | 6/2002 | Ai | |
| 6,414,401 B1 | 7/2002 | Kuroda et al. | |
| 6,419,608 B1 | 7/2002 | Miller | |
| 6,425,838 B1 | 7/2002 | Matsubara et al. | |
| 6,461,268 B1 | 10/2002 | Milner | |
| 6,482,094 B2 | 11/2002 | Kefes | |
| 6,492,785 B1 | 12/2002 | Kasten et al. | |
| 6,494,805 B2 | 12/2002 | Ooyama et al. | |
| 6,499,373 B2 | 12/2002 | Van Cor | |
| 6,514,175 B2 * | 2/2003 | Taniguchi et al. | 477/156 |
| 6,527,662 B2 | 3/2003 | Miyata et al. | |
| 6,532,890 B2 | 3/2003 | Chen | |
| 6,551,210 B2 | 4/2003 | Miller | |
| 6,575,047 B2 | 6/2003 | Reik et al. | |
| 6,659,901 B2 | 12/2003 | Sakai et al. | |
| 6,672,418 B1 | 1/2004 | Makino | |
| 6,676,559 B2 | 1/2004 | Miller | |
| 6,679,109 B2 | 1/2004 | Gierling et al. | |
| 6,682,432 B1 | 1/2004 | Shinozuka | |
| 6,689,012 B2 | 2/2004 | Miller | |
| 6,721,637 B2 * | 4/2004 | Abe et al. | 701/22 |
| 6,723,016 B2 | 4/2004 | Sumi | |
| 6,805,654 B2 | 10/2004 | Nishii | |
| 6,849,020 B2 | 2/2005 | Sumi | |
| 6,931,316 B2 | 8/2005 | Joe et al. | |
| 6,932,739 B2 | 8/2005 | Miyata et al. | |
| 6,942,593 B2 | 9/2005 | Nishii et al. | |
| 6,945,903 B2 | 9/2005 | Miller | |
| 6,949,049 B2 | 9/2005 | Miller | |
| 6,958,029 B2 | 10/2005 | Inoue | |
| 6,991,575 B2 | 1/2006 | Inoue | |
| 6,991,579 B2 | 1/2006 | Kobayashi et al. | |
| 7,011,600 B2 * | 3/2006 | Miller et al. | 476/36 |
| 7,011,601 B2 | 3/2006 | Miller | |
| 7,014,591 B2 | 3/2006 | Miller | |
| 7,029,418 B2 | 4/2006 | Taketsuna et al. | |
| 7,032,914 B2 | 4/2006 | Miller | |
| 7,036,620 B2 | 5/2006 | Miller et al. | |
| 7,044,884 B2 | 5/2006 | Miller | |
| 7,063,640 B2 | 6/2006 | Miller | |
| 7,074,007 B2 | 7/2006 | Miller | |
| 7,074,154 B2 | 7/2006 | Miller | |
| 7,074,155 B2 | 7/2006 | Miller | |
| 7,077,777 B2 | 7/2006 | Miyata et al. | |
| 7,086,979 B2 | 8/2006 | Frenken | |
| 7,086,981 B2 | 8/2006 | Ali et al. | |
| 7,094,171 B2 | 8/2006 | Inoue | |
| 7,111,860 B1 | 9/2006 | Grimaldos | |
| 7,112,158 B2 | 9/2006 | Miller | |
| 7,112,159 B2 | 9/2006 | Miller et al. | |
| 7,125,297 B2 | 10/2006 | Miller et al. | |
| 7,131,930 B2 | 11/2006 | Miller et al. | |
| 7,140,999 B2 | 11/2006 | Miller | |
| 7,147,586 B2 | 12/2006 | Miller et al. | |
| 7,153,233 B2 | 12/2006 | Miller et al. | |
| 7,156,770 B2 | 1/2007 | Miller | |
| 7,160,220 B2 | 1/2007 | Shinojima et al. | |
| 7,160,222 B2 | 1/2007 | Miller | |
| 7,163,485 B2 | 1/2007 | Miller | |
| 7,163,486 B2 | 1/2007 | Miller et al. | |
| 7,166,052 B2 | 1/2007 | Miller et al. | |
| 7,166,056 B2 | 1/2007 | Miller et al. | |
| 7,166,057 B2 | 1/2007 | Miller et al. | |
| 7,166,058 B2 | 1/2007 | Miller et al. | |
| 7,169,076 B2 | 1/2007 | Miller et al. | |
| 7,172,529 B2 | 2/2007 | Miller et al. | |
| 7,175,564 B2 | 2/2007 | Miller | |
| 7,175,565 B2 | 2/2007 | Miller et al. | |
| 7,175,566 B2 | 2/2007 | Miller et al. | |
| 7,192,381 B2 | 3/2007 | Miller et al. | |
| 7,197,915 B2 | 4/2007 | Luh et al. | |
| 7,198,582 B2 | 4/2007 | Miller et al. | |
| 7,198,583 B2 | 4/2007 | Miller et al. | |
| 7,198,584 B2 | 4/2007 | Miller et al. | |
| 7,198,585 B2 | 4/2007 | Miller et al. | |
| 7,201,693 B2 | 4/2007 | Miller et al. | |
| 7,201,694 B2 | 4/2007 | Miller et al. | |
| 7,201,695 B2 | 4/2007 | Miller et al. | |
| 7,204,777 B2 | 4/2007 | Miller et al. | |
| 7,214,159 B2 | 5/2007 | Miller et al. | |
| 7,217,215 B2 | 5/2007 | Miller et al. | |
| 7,217,216 B2 | 5/2007 | Inoue | |
| 7,217,219 B2 | 5/2007 | Miller | |
| 7,217,220 B2 | 5/2007 | Careau et al. | |
| 7,232,395 B2 | 6/2007 | Miller et al. | |
| 7,234,873 B2 * | 6/2007 | Kato et al. | 384/572 |
| 7,235,031 B2 | 6/2007 | Miller et al. | |
| 7,238,136 B2 | 7/2007 | Miller et al. | |
| 7,238,137 B2 | 7/2007 | Miller et al. | |
| 7,238,138 B2 | 7/2007 | Miller et al. | |
| 7,238,139 B2 | 7/2007 | Roethler et al. | |
| 7,246,672 B2 | 7/2007 | Shirai et al. | |
| 7,250,018 B2 | 7/2007 | Miller et al. | |
| 7,261,663 B2 | 8/2007 | Miller et al. | |
| 7,275,610 B2 | 10/2007 | Kuang et al. | |
| 7,285,068 B2 | 10/2007 | Hosoi | |
| 7,288,042 B2 | 10/2007 | Miller et al. | |
| 7,320,660 B2 | 1/2008 | Miller | |
| 7,322,901 B2 | 1/2008 | Miller et al. | |
| 7,347,801 B2 | 3/2008 | Guenter et al. | |
| 7,384,370 B2 | 6/2008 | Miller | |
| 7,393,300 B2 | 7/2008 | Miller et al. | |
| 7,393,302 B2 | 7/2008 | Miller | |
| 7,393,303 B2 | 7/2008 | Miller | |
| 7,395,731 B2 | 7/2008 | Miller et al. | |
| 7,396,209 B2 | 7/2008 | Miller et al. | |

(56) References Cited

U.S. PATENT DOCUMENTS

| | | | |
|---|---|---|---|
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 * | 8/2009 | Rohs et al. ............... 74/349 |
| 7,591,755 B2 | 9/2009 | Petrzik et al. |
| 7,727,115 B2 | 6/2010 | Serkh |
| 7,909,727 B2 * | 3/2011 | Smithson et al. ........... 476/36 |
| 7,976,426 B2 * | 7/2011 | Smithson et al. ........... 476/38 |
| 8,142,323 B2 | 3/2012 | Tsuchiya et al. |
| 8,167,759 B2 * | 5/2012 | Pohl et al. ............. 475/189 |
| 8,171,636 B2 * | 5/2012 | Smithson et al. .......... 29/893.3 |
| 8,360,917 B2 * | 1/2013 | Nichols et al. ............ 475/189 |
| 2001/0008192 A1 * | 7/2001 | Morisawa ............... 180/197 |
| 2001/0044361 A1 * | 11/2001 | Taniguchi et al. .......... 477/111 |
| 2002/0019285 A1 | 2/2002 | Henzler |
| 2002/0028722 A1 | 3/2002 | Sakai et al. |
| 2002/0045511 A1 | 4/2002 | Geiberger et al. |
| 2002/0169051 A1 * | 11/2002 | Oshidari ................. 476/10 |
| 2003/0015358 A1 * | 1/2003 | Abe et al. ............... 180/65.3 |
| 2003/0015874 A1 * | 1/2003 | Abe et al. ............... 290/40 C |
| 2003/0022753 A1 | 1/2003 | Mizuno et al. |
| 2003/0036456 A1 | 2/2003 | Skrabs |
| 2003/0216216 A1 | 11/2003 | Inoue et al. |
| 2003/0221892 A1 | 12/2003 | Matsumoto et al. |
| 2004/0058772 A1 | 3/2004 | Inoue et al. |
| 2004/0082421 A1 | 4/2004 | Wafzig |
| 2004/0119345 A1 | 6/2004 | Takano |
| 2004/0204283 A1 | 10/2004 | Inoue |
| 2005/0037876 A1 | 2/2005 | Unno et al. |
| 2005/0113202 A1 * | 5/2005 | Miller et al. ............. 475/215 |
| 2005/0227809 A1 | 10/2005 | Bitzer et al. |
| 2006/0052204 A1 | 3/2006 | Eckert et al. |
| 2006/0084549 A1 | 4/2006 | Smithson et al. |
| 2006/0108956 A1 * | 5/2006 | Clark et al. .............. 318/139 |
| 2006/0111212 A9 | 5/2006 | Ai et al. |
| 2006/0180363 A1 * | 8/2006 | Uchisasai et al. .......... 180/65.2 |
| 2006/0234822 A1 | 10/2006 | Morscheck et al. |
| 2007/0004552 A1 | 1/2007 | Matsudaira et al. |
| 2007/0004556 A1 * | 1/2007 | Rohs et al. .............. 477/130 |
| 2007/0049450 A1 | 3/2007 | Miller |
| 2007/0142161 A1 | 6/2007 | Miller |
| 2007/0149342 A1 | 6/2007 | Guenter et al. |
| 2007/0155567 A1 | 7/2007 | Miller et al. |
| 2007/0155580 A1 | 7/2007 | Nichols et al. |
| 2007/0219696 A1 | 9/2007 | Miller et al. |
| 2008/0032852 A1 | 2/2008 | Smithson et al. |
| 2008/0032853 A1 | 2/2008 | Smithson et al. |
| 2008/0032854 A1 | 2/2008 | Smithson et al. |
| 2008/0034585 A1 | 2/2008 | Smithson et al. |
| 2008/0034586 A1 | 2/2008 | Smithson et al. |
| 2008/0039269 A1 | 2/2008 | Smithson et al. |
| 2008/0039270 A1 | 2/2008 | Smithson et al. |
| 2008/0039271 A1 | 2/2008 | Smithson et al. |
| 2008/0039272 A1 | 2/2008 | Smithson et al. |
| 2008/0039273 A1 | 2/2008 | Smithson et al. |
| 2008/0039274 A1 | 2/2008 | Smithson et al. |
| 2008/0039275 A1 | 2/2008 | Smithson et al. |
| 2008/0039276 A1 | 2/2008 | Smithson et al. |
| 2008/0039277 A1 | 2/2008 | Smithson et al. |
| 2008/0040008 A1 | 2/2008 | Smithson et al. |
| 2008/0081728 A1 * | 4/2008 | Faulring et al. ............ 476/40 |
| 2008/0121487 A1 | 5/2008 | Miller et al. |
| 2008/0125281 A1 | 5/2008 | Miller et al. |
| 2008/0125282 A1 | 5/2008 | Miller et al. |
| 2008/0132373 A1 | 6/2008 | Miller et al. |
| 2008/0132377 A1 | 6/2008 | Miller et al. |
| 2008/0139363 A1 | 6/2008 | Williams |
| 2008/0141809 A1 | 6/2008 | Miller et al. |
| 2008/0141810 A1 | 6/2008 | Miller et al. |
| 2008/0146403 A1 | 6/2008 | Miller |
| 2008/0146404 A1 | 6/2008 | Miller |
| 2008/0161151 A1 | 7/2008 | Miller |
| 2008/0188345 A1 | 8/2008 | Miller |
| 2008/0200300 A1 | 8/2008 | Smithson et al. |
| 2008/0236319 A1 | 10/2008 | Nichols et al. |
| 2008/0248917 A1 | 10/2008 | Nichols et al. |
| 2008/0261771 A1 | 10/2008 | Nichols et al. |
| 2008/0284170 A1 | 11/2008 | Cory |
| 2008/0305920 A1 | 12/2008 | Nishii et al. |
| 2009/0107454 A1 | 4/2009 | Hiyoshi et al. |
| 2009/0164076 A1 | 6/2009 | Vasiliotis et al. |
| 2009/0189397 A1 | 7/2009 | Miller et al. |
| 2009/0280949 A1 | 11/2009 | Lohr |
| 2009/0312145 A1 | 12/2009 | Pohl et al. |
| 2010/0056322 A1 * | 3/2010 | Thomassy ................ 476/39 |
| 2010/0093479 A1 | 4/2010 | Carter et al. |
| 2010/0093480 A1 | 4/2010 | Pohl et al. |
| 2010/0093485 A1 | 4/2010 | Pohl et al. |
| 2010/0131164 A1 * | 5/2010 | Carter et al. ............. 701/61 |
| 2010/0264620 A1 | 10/2010 | Miles et al. |
| 2010/0267510 A1 | 10/2010 | Nichols et al. |
| 2011/0088503 A1 | 4/2011 | Armstrong et al. |
| 2011/0105274 A1 | 5/2011 | Lohr et al. |
| 2011/0127096 A1 | 6/2011 | Schneidewind |
| 2011/0172050 A1 | 7/2011 | Nichols et al. |
| 2011/0218072 A1 | 9/2011 | Lohr et al. |
| 2011/0230297 A1 | 9/2011 | Shiina et al. |
| 2011/0319222 A1 | 12/2011 | Ogawa et al. |
| 2012/0035015 A1 * | 2/2012 | Ogawa et al. ............. 475/186 |
| 2012/0035016 A1 | 2/2012 | Miller et al. |
| 2012/0043841 A1 | 2/2012 | Miller |
| 2012/0238386 A1 * | 9/2012 | Pohl et al. ............... 475/115 |
| 2012/0258839 A1 * | 10/2012 | Smithson et al. ........... 477/42 |
| 2012/0309579 A1 * | 12/2012 | Miller et al. ............. 475/189 |

FOREIGN PATENT DOCUMENTS

| | | |
|---|---|---|
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155372 A1 | 5/2003 |
| EP | 0 432 742 | 12/1990 |
| EP | 0528381 | 2/1993 |
| EP | 0528382 | 2/1993 |
| EP | 635639 A1 | 1/1995 |
| EP | 0638741 | 2/1995 |
| EP | 0976956 | 2/2000 |
| EP | 1136724 | 9/2001 |
| EP | 1366978 | 3/2003 |
| FR | 620375 | 4/1927 |
| FR | 2460427 A | 1/1981 |
| FR | 2590638 | 5/1987 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| GB | 1 376 057 | 12/1974 |
| GB | 2031822 | 4/1980 |
| GB | 2 035 482 | 6/1980 |
| GB | 2 080 452 | 8/1982 |
| JP | 44-1098 | 1/1944 |
| JP | 42-2843 | 2/1967 |
| JP | 42-2844 | 2/1967 |
| JP | 47-29762 | 11/1972 |

(56) References Cited

FOREIGN PATENT DOCUMENTS

| | | |
|---|---|---|
| JP | 48-54371 | 7/1973 |
| JP | 49-12742 | 3/1974 |
| JP | 50-114581 | 9/1975 |
| JP | 51-25903 | 8/1976 |
| JP | 51-150380 | 12/1976 |
| JP | 47-20535 | 8/1977 |
| JP | 53 048166 | 1/1978 |
| JP | 55-135259 | 4/1979 |
| JP | 58065361 | 4/1983 |
| JP | 59069565 | 4/1984 |
| JP | 60-247011 | 12/1985 |
| JP | 61031754 | 2/1986 |
| JP | 61-144466 | 7/1986 |
| JP | 61-173722 | 10/1986 |
| JP | 63-219953 | 9/1988 |
| JP | 63219953 | 9/1988 |
| JP | 63-160465 | 10/1988 |
| JP | 02157483 | 6/1990 |
| JP | 02271142 | 6/1990 |
| JP | 04-166619 | 6/1992 |
| JP | 04-272553 | 9/1992 |
| JP | 52-35481 | 9/1993 |
| JP | 7-42799 | 2/1995 |
| JP | 7-139600 | 5/1995 |
| JP | 08170706 A | 7/1996 |
| JP | 09024743 A | 1/1997 |
| JP | 09-089064 | 3/1997 |
| JP | 411063130 | 3/1999 |
| JP | 11-257479 | 9/1999 |
| JP | 2000-46135 | 2/2000 |
| JP | 2001-27298 | 1/2001 |
| JP | 2001521109 A | 11/2001 |
| JP | 2002-147558 | 5/2002 |
| JP | 2002-250421 | 6/2002 |
| JP | 2003-56662 | 2/2003 |
| JP | 2003-524119 | 8/2003 |
| JP | 2003-336732 | 11/2003 |
| JP | 2004162652 A | 6/2004 |
| JP | 8-247245 | 9/2004 |
| JP | 2005/240928 A | 9/2005 |
| JP | 2006015025 | 1/2006 |
| JP | 2007-535715 | 12/2007 |
| JP | 2008-002687 | 1/2008 |
| JP | 03-149442 | 1/2009 |
| JP | 2010069005 | 4/2010 |
| NE | 98467 | 7/1961 |
| TW | 582363 | 4/2004 |
| TW | 590955 | 6/2004 |
| WO | WO 01/73319 | 10/2001 |
| WO | WO 02/088573 | 11/2002 |
| WO | WO 03100294 | 12/2003 |
| WO | WO 2005/083305 | 9/2005 |
| WO | WO 2007/077502 | 7/2007 |
| WO | WO 2008/002457 | 1/2008 |
| WO | WO 2009/157920 | 12/2009 |
| WO | WO2010/017242 | 2/2010 |
| WO | WO 2010/024809 | 3/2010 |
| WO | WO 2010/044778 | 4/2010 |
| WO | WO 2011/101991 | 8/2011 |

OTHER PUBLICATIONS

Office Action dated Feb. 12, 2010 from Japanese Patent Application No. 2009-294086.

Office Action dated Feb. 17, 2010 from Japanese Patent Application No. 2006-508892.

"An Evaluation of the Morse Constant Speed Accessory Drive"; Technology Assessment & Evaluation Branch, Office of Mobile Source Air Pollution Control, US EPA; Jun. 1976.

Masashi, U., et al, "Continuously Variable Transmission for Accessory Drive System", 1999 Proceedings. JSAE Annual Congress.

Van der lieijaen, A.C., "Continuously Variable Accessory Drive and other methods to reduce additional fuel consumption caused by engine accessories"; Technische Universiteit Eindhoven Department Mechanical Engineering; Eindhoven, Jul. 2004.

Partial International Search Report for International application No. PCT/US2008/052685 dated Jun. 9, 2008.

Thomassy: An Engineering Approach to Simulating Traction EHL. CVT-Hybrid International Conference Mecc/Maastricht/The Netherlands, Nov. 17-19, 2010, p. 97.

International Search Report and Written Opinion dated Feb. 9, 2008 for PCT Application No. PCT/US2008/052685.

\* cited by examiner

| | | Fixed Ratio Drive | Drive With Control System 18 |
|---|---|---|---|
| ACCELERATION | | | |
| 0 to 16 kph (10 mph) | (sec) | 3.38 | 2.53 |
| 0 to 19 kph (12 mph) | (sec) | 4.79 | 3.65 |
| 0.2 km (1/8 mile) | (sec) | 36.3 | 34.0 |
| TOP SPEED | | | |
| Max sustained during 0.2 km | (kph) | 21.1 | 23.0 |
| HILL CLIMB, 0.75 KM | | | |
| Average Time | (minutes) | 4.6 | 2.5 |
| Average Speed | (kph) | 9.7 | 18.0 |
| RANGE, 5.2 KM LOOP | | | |
| Average Distance | (km) | 16.7 | 16.1 |
| Average Speed | (kph) | 20.0 | 21.1 |

| Min Act Pos | 40 | | RPM | 1500 | | | | | | | | |
|---|---|---|---|---|---|---|---|---|---|---|---|---|
| Max Act Pos | 442 | | | | | | | | | | | |
| | | | | | | | | | | Shift Curves | | |
| | | | | | | | | | | Act Position (0-462) | | |
| | Number | MPH | Wheel Speed (rad/s) | RPM | Ideal GR old | Ideal GR | GR | Revs | Test | Perf | Econ | Drag Race | Step |
| | 0 | 0 | 0.00 | 1500 | 0 | 0.00 | 0.51 | 0.00 | 40 | 40 | 40 | 40 | 40 |
| | 1 | 0.2 | 0.05 | 1500 | 0.03 | 0.02 | 0.51 | 0.00 | 40 | 40 | 40 | 40 | 40 |
| | 2 | 0.4 | 0.10 | 1500 | 0.06 | 0.04 | 0.51 | 0.00 | 40 | 40 | 40 | 40 | 40 |
| | 3 | 0.6 | 0.15 | 1500 | 0.08 | 0.06 | 0.51 | 0.00 | 40 | 40 | 40 | 40 | 40 |
| | 4 | 0.8 | 0.20 | 1500 | 0.11 | 0.08 | 0.51 | 0.00 | 40 | 40 | 40 | 43 | 40 |
| | 5 | 1 | 0.24 | 1500 | 0.14 | 0.10 | 0.51 | 0.00 | 40 | 40 | 40 | 47 | 40 |
| | 6 | 1.2 | 0.29 | 1500 | 0.17 | 0.12 | 0.51 | 0.00 | 40 | 40 | 40 | 50 | 40 |
| | 7 | 1.4 | 0.34 | 1500 | 0.19 | 0.14 | 0.51 | 0.00 | 40 | 40 | 40 | 54 | 40 |
| | 8 | 1.6 | 0.39 | 1500 | 0.22 | 0.16 | 0.51 | 0.00 | 40 | 40 | 40 | 58 | 40 |
| | 9 | 1.8 | 0.44 | 1500 | 0.25 | 0.18 | 0.51 | 0.00 | 40 | 40 | 40 | 61 | 40 |
| | 10 | 2 | 0.49 | 1500 | 0.28 | 0.20 | 0.51 | 0.00 | 40 | 40 | 40 | 65 | 40 |
| | 11 | 2.2 | 0.54 | 1500 | 0.31 | 0.22 | 0.51 | 0.00 | 40 | 40 | 40 | 69 | 40 |
| | 12 | 2.4 | 0.59 | 1500 | 0.33 | 0.24 | 0.51 | 0.00 | 40 | 40 | 40 | 72 | 40 |
| | 13 | 2.6 | 0.64 | 1500 | 0.36 | 0.26 | 0.51 | 0.00 | 40 | 40 | 40 | 76 | 40 |
| | 14 | 2.8 | 0.68 | 1500 | 0.39 | 0.29 | 0.51 | 0.00 | 40 | 40 | 40 | 80 | 40 |
| | 15 | 3 | 0.73 | 1500 | 0.42 | 0.31 | 0.51 | 0.00 | 40 | 40 | 40 | 84 | 40 |
| | 16 | 3.2 | 0.78 | 1500 | 0.44 | 0.33 | 0.51 | 0.00 | 40 | 45 | 40 | 87 | 100 |
| | 17 | 3.4 | 0.83 | 1500 | 0.47 | 0.35 | 0.51 | 0.00 | 40 | 50 | 40 | 91 | 100 |
| | 18 | 3.6 | 0.88 | 1500 | 0.5 | 0.37 | 0.51 | 0.00 | 40 | 55 | 40 | 95 | 100 |
| | 19 | 3.8 | 0.93 | 1500 | 0.53 | 0.39 | 0.51 | 0.00 | 40 | 60 | 40 | 98 | 100 |
| | 20 | 4 | 0.98 | 1500 | 0.56 | 0.41 | 0.51 | 0.00 | 40 | 65 | 40 | 102 | 100 |
| | 21 | 4.2 | 1.03 | 1500 | 0.58 | 0.43 | 0.51 | 0.00 | 40 | 70 | 40 | 106 | 100 |
| | 22 | 4.4 | 1.08 | 1500 | 0.61 | 0.45 | 0.51 | 0.00 | 40 | 75 | 40 | 109 | 100 |
| | 23 | 4.6 | 1.12 | 1500 | 0.64 | 0.47 | 0.51 | 0.00 | 40 | 80 | 50 | 113 | 100 |
| | 24 | 4.8 | 1.17 | 1500 | 0.67 | 0.49 | 0.51 | 0.00 | 40 | 85 | 60 | 117 | 100 |
| | 25 | 5 | 1.22 | 1500 | 0.69 | 0.51 | 0.51 | 0.00 | 40 | 90 | 70 | 121 | 100 |
| | 26 | 5.2 | 1.27 | 1500 | 0.72 | 0.53 | 0.53 | 0.06 | 40 | 95 | 80 | 124 | 100 |
| | 27 | 5.4 | 1.32 | 1500 | 0.75 | 0.55 | 0.55 | 0.11 | 40 | 100 | 90 | 128 | 100 |
| | 28 | 5.6 | 1.37 | 1500 | 0.78 | 0.57 | 0.57 | 0.15 | 40 | 105 | 95 | 132 | 100 |
| | 29 | 5.8 | 1.42 | 1500 | 0.81 | 0.59 | 0.59 | 0.20 | 50 | 110 | 100 | 135 | 100 |
| | 30 | 6 | 1.47 | 1500 | 0.83 | 0.61 | 0.61 | 0.24 | 61 | 115 | 105 | 139 | 100 |
| | 31 | 6.2 | 1.52 | 1500 | 0.86 | 0.63 | 0.63 | 0.28 | 71 | 120 | 110 | 143 | 100 |
| | 32 | 6.4 | 1.56 | 1500 | 0.89 | 0.65 | 0.65 | 0.32 | 82 | 125 | 115 | 146 | 100 |
| | 33 | 6.6 | 1.61 | 1500 | 0.92 | 0.67 | 0.67 | 0.36 | 92 | 130 | 120 | 150 | 100 |
| | 34 | 6.8 | 1.66 | 1500 | 0.94 | 0.69 | 0.69 | 0.40 | 103 | 135 | 125 | 154 | 100 |
| | 35 | 7 | 1.71 | 1500 | 0.97 | 0.71 | 0.71 | 0.45 | 114 | 140 | 130 | 158 | 100 |
| | 36 | 7.2 | 1.76 | 1500 | 1 | 0.73 | 0.73 | 0.49 | 124 | 145 | 135 | 161 | 200 |
| | 37 | 7.4 | 1.81 | 1500 | 1.03 | 0.75 | 0.75 | 0.53 | 134 | 150 | 140 | 165 | 200 |
| | 38 | 7.6 | 1.86 | 1500 | 1.06 | 0.77 | 0.77 | 0.57 | 144 | 155 | 145 | 170 | 200 |
| | 39 | 7.8 | 1.91 | 1500 | 1.08 | 0.79 | 0.79 | 0.61 | 154 | 160 | 150 | 175 | 200 |
| | 40 | 8 | 1.96 | 1500 | 1.11 | 0.81 | 0.81 | 0.64 | 163 | 165 | 155 | 180 | 200 |
| | 41 | 8.2 | 2.00 | 1500 | 1.14 | 0.83 | 0.83 | 0.68 | 173 | 170 | 160 | 185 | 200 |
| | 42 | 8.4 | 2.05 | 1500 | 1.17 | 0.86 | 0.86 | 0.71 | 182 | 175 | 165 | 190 | 200 |

| Min Act Pos | 40 | RPM | 1500 | | | | | | | | | |
|---|---|---|---|---|---|---|---|---|---|---|---|---|
| Max Act Pos | 442 | | | | | | | | | | | |
| | | | | | | | | | Shift Curves | | | |
| | | | | | | | | | Act Position (0-462) | | | |
| Number | MPH | Wheel Speed (rad/s) | RPM | Ideal GR old | Ideal GR | GR | Revs | Test | Perf | Econ | Drag Race | Step |
| 43 | 8.6 | 2.10 | 1500 | 1.19 | 0.88 | 0.88 | 0.75 | 192 | 180 | 170 | 195 | 200 |
| 44 | 8.8 | 2.15 | 1500 | 1.22 | 0.90 | 0.90 | 0.79 | 201 | 185 | 175 | 200 | 200 |
| 45 | 9 | 2.20 | 1500 | 1.25 | 0.92 | 0.92 | 0.82 | 210 | 190 | 180 | 205 | 200 |
| 46 | 9.2 | 2.25 | 1500 | 1.28 | 0.94 | 0.94 | 0.86 | 219 | 195 | 185 | 210 | 200 |
| 47 | 9.4 | 2.30 | 1500 | 1.3 | 0.96 | 0.96 | 0.89 | 228 | 200 | 190 | 215 | 200 |
| 48 | 9.6 | 2.35 | 1500 | 1.33 | 0.98 | 0.98 | 0.93 | 237 | 205 | 195 | 220 | 200 |
| 49 | 9.8 | 2.40 | 1500 | 1.36 | 1.00 | 1.00 | 0.96 | 245 | 210 | 200 | 225 | 200 |
| 50 | 10 | 2.44 | 1500 | 1.39 | 1.02 | 1.02 | 0.99 | 252 | 215 | 205 | 230 | 200 |
| 51 | 10.2 | 2.49 | 1500 | 1.42 | 1.04 | 1.04 | 1.02 | 261 | 220 | 210 | 235 | 200 |
| 52 | 10.4 | 2.54 | 1500 | 1.44 | 1.06 | 1.06 | 1.05 | 269 | 225 | 215 | 240 | 200 |
| 53 | 10.6 | 2.59 | 1500 | 1.47 | 1.08 | 1.08 | 1.08 | 277 | 230 | 220 | 245 | 200 |
| 54 | 10.8 | 2.64 | 1500 | 1.5 | 1.10 | 1.10 | 1.11 | 285 | 235 | 225 | 250 | 200 |
| 55 | 11 | 2.69 | 1500 | 1.53 | 1.12 | 1.12 | 1.14 | 292 | 240 | 225 | 255 | 200 |
| 56 | 11.2 | 2.74 | 1500 | 1.55 | 1.14 | 1.14 | 1.17 | 300 | 245 | 225 | 260 | 300 |
| 57 | 11.4 | 2.79 | 1500 | 1.58 | 1.16 | 1.16 | 1.20 | 307 | 250 | 225 | 265 | 300 |
| 58 | 11.6 | 2.84 | 1500 | 1.61 | 1.18 | 1.18 | 1.23 | 314 | 255 | 225 | 270 | 300 |
| 59 | 11.8 | 2.88 | 1500 | 1.64 | 1.20 | 1.20 | 1.25 | 320 | 260 | 225 | 275 | 300 |
| 60 | 12 | 2.93 | 1500 | 1.67 | 1.22 | 1.22 | 1.28 | 327 | 265 | 225 | 280 | 300 |
| 61 | 12.2 | 2.98 | 1500 | 1.69 | 1.24 | 1.24 | 1.31 | 334 | 270 | 225 | 285 | 300 |
| 62 | 12.4 | 3.03 | 1500 | 1.72 | 1.26 | 1.26 | 1.33 | 341 | 275 | 225 | 290 | 300 |
| 63 | 12.6 | 3.08 | 1500 | 1.75 | 1.28 | 1.28 | 1.36 | 347 | 280 | 225 | 295 | 300 |
| 64 | 12.8 | 3.13 | 1500 | 1.78 | 1.30 | 1.30 | 1.38 | 354 | 285 | 225 | 300 | 300 |
| 65 | 13 | 3.18 | 1500 | 1.8 | 1.32 | 1.32 | 1.41 | 360 | 290 | 225 | 305 | 300 |
| 66 | 13.2 | 3.23 | 1500 | 1.83 | 1.34 | 1.34 | 1.43 | 366 | 295 | 225 | 308 | 300 |
| 67 | 13.4 | 3.28 | 1500 | 1.86 | 1.36 | 1.36 | 1.45 | 372 | 300 | 225 | 311 | 300 |
| 68 | 13.6 | 3.32 | 1500 | 1.89 | 1.38 | 1.38 | 1.47 | 377 | 305 | 225 | 313 | 300 |
| 69 | 13.8 | 3.37 | 1500 | 1.92 | 1.40 | 1.40 | 1.50 | 383 | 310 | 225 | 316 | 300 |
| 70 | 14 | 3.42 | 1500 | 1.94 | 1.43 | 1.43 | 1.52 | 388 | 315 | 225 | 319 | 300 |
| 71 | 14.2 | 3.47 | 1500 | 1.97 | 1.45 | 1.45 | 1.54 | 393 | 320 | 225 | 322 | 300 |
| 72 | 14.4 | 3.52 | 1500 | 2 | 1.47 | 1.47 | 1.56 | 399 | 325 | 225 | 325 | 300 |
| 73 | 14.6 | 3.57 | 1500 | 2.03 | 1.49 | 1.49 | 1.58 | 404 | 327 | 225 | 327 | 300 |
| 74 | 14.8 | 3.62 | 1500 | 2.05 | 1.51 | 1.51 | 1.60 | 409 | 327 | 225 | 330 | 300 |
| 75 | 15 | 3.67 | 1500 | 2.08 | 1.53 | 1.53 | 1.62 | 413 | 327 | 225 | 333 | 300 |
| 76 | 15.2 | 3.72 | 1500 | 2.11 | 1.55 | 1.55 | 1.63 | 418 | 327 | 225 | 336 | 400 |
| 77 | 15.4 | 3.76 | 1500 | 2.14 | 1.57 | 1.57 | 1.65 | 422 | 327 | 225 | 339 | 400 |
| 78 | 15.6 | 3.81 | 1500 | 2.17 | 1.59 | 1.59 | 1.67 | 426 | 327 | 225 | 341 | 400 |
| 79 | 15.8 | 3.86 | 1500 | 2.19 | 1.61 | 1.61 | 1.68 | 431 | 327 | 225 | 344 | 400 |
| 80 | 16 | 3.91 | 1500 | 2.22 | 1.63 | 1.63 | 1.70 | 435 | 327 | 225 | 347 | 400 |
| 81 | 16.2 | 3.96 | 1500 | 2.25 | 1.65 | 1.65 | 1.71 | 438 | 327 | 225 | 350 | 400 |
| 82 | 16.4 | 4.01 | 1500 | 2.28 | 1.67 | 1.67 | 1.73 | 442 | 327 | 225 | 353 | 400 |
| 83 | 16.6 | 4.06 | 1500 | 2.3 | 1.69 | 1.69 | 1.74 | 446 | 327 | 225 | 355 | 400 |
| 84 | 16.8 | 4.11 | 1500 | 2.33 | 1.71 | 1.71 | 1.76 | 449 | 327 | 225 | 358 | 400 |
| 85 | 17 | 4.16 | 1500 | 2.36 | 1.73 | 1.73 | 1.77 | 453 | 327 | 225 | 361 | 400 |

| Min Act Pos | 40 | RPM | 1500 | | | | | | | | |
|---|---|---|---|---|---|---|---|---|---|---|---|
| Max Act Pos | 442 | | | | | | | | | | |
| | | | | | | | | | | Shift Curves | |
| | | | | | | | | | | Act Position (0-462) | |
| Number | MPH | Wheel Speed (rad/s) | RPM | Ideal GR old | Ideal GR | GR | Revs | Test | Perf | Econ | Drag Race | Step |
| 86 | 17.2 | 4.20 | 1500 | 2.39 | 1.75 | 1.75 | 1.78 | 455 | 327 | 225 | 364 | 400 |
| 87 | 17.4 | 4.25 | 1500 | 2.42 | 1.77 | 1.77 | 1.79 | 458 | 327 | 225 | 367 | 400 |
| 88 | 17.6 | 4.30 | 1500 | 2.44 | 1.79 | 1.79 | 1.80 | 461 | 327 | 225 | 369 | 400 |
| 89 | 17.8 | 4.35 | 1500 | 2.47 | 1.81 | 1.80 | 1.81 | 462 | 327 | 225 | 372 | 400 |
| 90 | 18 | 4.40 | 1500 | 2.5 | 1.83 | 1.80 | 1.81 | 462 | 327 | 225 | 375 | 400 |
| 91 | 18.2 | 4.45 | 1500 | 2.53 | 1.85 | 1.80 | 1.81 | 462 | 327 | 225 | 378 | 400 |
| 92 | 18.4 | 4.50 | 1500 | 2.55 | 1.87 | 1.80 | 1.81 | 462 | 327 | 225 | 381 | 400 |
| 93 | 18.6 | 4.55 | 1500 | 2.58 | 1.89 | 1.80 | 1.81 | 462 | 327 | 225 | 383 | 400 |
| 94 | 18.8 | 4.60 | 1500 | 2.61 | 1.91 | 1.80 | 1.81 | 462 | 327 | 225 | 386 | 400 |
| 95 | 19 | 4.64 | 1500 | 2.64 | 1.93 | 1.80 | 1.81 | 462 | 327 | 225 | 389 | 400 |
| 96 | 19.2 | 4.69 | 1500 | 2.67 | 1.95 | 1.80 | 1.81 | 462 | 327 | 225 | 392 | 442 |
| 97 | 19.4 | 4.74 | 1500 | 2.69 | 1.97 | 1.80 | 1.81 | 462 | 327 | 225 | 395 | 442 |
| 98 | 19.6 | 4.79 | 1500 | 2.72 | 2.00 | 1.80 | 1.81 | 462 | 327 | 225 | 397 | 442 |
| 99 | 19.8 | 4.84 | 1500 | 2.75 | 2.02 | 1.80 | 1.81 | 462 | 327 | 225 | 400 | 442 |
| 100 | 20 | 4.89 | 1500 | 2.78 | 2.04 | 1.80 | 1.81 | 462 | 327 | 225 | 403 | 442 |
| 101 | 20.2 | 4.94 | 1500 | 2.8 | 2.06 | 1.80 | 1.81 | 462 | 327 | 225 | 406 | 442 |
| 102 | 20.4 | 4.99 | 1500 | 2.83 | 2.08 | 1.80 | 1.81 | 462 | 327 | 225 | 409 | 442 |
| 103 | 20.6 | 5.04 | 1500 | 2.86 | 2.10 | 1.80 | 1.81 | 462 | 327 | 225 | 411 | 442 |
| 104 | 20.8 | 5.08 | 1500 | 2.89 | 2.12 | 1.80 | 1.81 | 462 | 327 | 225 | 414 | 442 |
| 105 | 21 | 5.13 | 1500 | 2.92 | 2.14 | 1.80 | 1.81 | 462 | 327 | 225 | 417 | 442 |
| 106 | 21.2 | 5.18 | 1500 | 2.94 | 2.16 | 1.80 | 1.81 | 462 | 327 | 225 | 420 | 442 |
| 107 | 21.4 | 5.23 | 1500 | 2.97 | 2.18 | 1.80 | 1.81 | 462 | 327 | 225 | 423 | 442 |
| 108 | 21.6 | 5.28 | 1500 | 3 | 2.20 | 1.80 | 1.81 | 462 | 327 | 225 | 425 | 442 |
| 109 | 21.8 | 5.33 | 1500 | 3.03 | 2.22 | 1.80 | 1.81 | 462 | 327 | 225 | 428 | 442 |
| 110 | 22 | 5.38 | 1500 | 3.05 | 2.24 | 1.80 | 1.81 | 462 | 327 | 225 | 431 | 442 |
| 111 | 22.2 | 5.43 | 1500 | 3.08 | 2.26 | 1.80 | 1.81 | 462 | 327 | 225 | 434 | 442 |
| 112 | 22.4 | 5.48 | 1500 | 3.11 | 2.28 | 1.80 | 1.81 | 462 | 327 | 225 | 437 | 442 |
| 113 | 22.6 | 5.52 | 1500 | 3.14 | 2.30 | 1.80 | 1.81 | 462 | 327 | 225 | 439 | 442 |
| 114 | 22.8 | 5.57 | 1500 | 3.17 | 2.32 | 1.80 | 1.81 | 462 | 327 | 225 | 442 | 442 |
| 115 | 23 | 5.62 | 1500 | 3.19 | 2.34 | 1.80 | 1.81 | 462 | 327 | 225 | 442 | 442 |
| 116 | 23.2 | 5.67 | 1500 | 3.22 | 2.36 | 1.80 | 1.81 | 462 | 327 | 225 | 442 | 442 |
| 117 | 23.4 | 5.72 | 1500 | 3.25 | 2.38 | 1.80 | 1.81 | 462 | 327 | 225 | 442 | 442 |
| 118 | 23.6 | 5.77 | 1500 | 3.28 | 2.40 | 1.80 | 1.81 | 462 | 327 | 225 | 442 | 442 |
| 119 | 23.8 | 5.82 | 1500 | 3.3 | 2.42 | 1.80 | 1.81 | 462 | 327 | 225 | 442 | 442 |
| 120 | 24 | 5.87 | 1500 | 3.33 | 2.44 | 1.80 | 1.81 | 462 | 327 | 225 | 442 | 442 |
| 121 | 24.2 | 5.92 | 1500 | 3.36 | 2.46 | 1.80 | 1.81 | 462 | 327 | 225 | 442 | 442 |
| 122 | 24.4 | 5.96 | 1500 | 3.39 | 2.48 | 1.80 | 1.81 | 462 | 327 | 225 | 442 | 442 |
| 123 | 24.6 | 6.01 | 1500 | 3.41 | 2.50 | 1.80 | 1.81 | 462 | 327 | 225 | 442 | 442 |
| 124 | 24.8 | 6.06 | 1500 | 3.44 | 2.52 | 1.80 | 1.81 | 462 | 327 | 225 | 442 | 442 |
| 125 | 25 | 6.11 | 1500 | 3.47 | 2.54 | 1.80 | 1.81 | 462 | 327 | 225 | 442 | 442 |
| 126 | 25.2 | 6.16 | 1500 | 3.5 | 2.57 | 1.80 | 1.81 | 462 | 327 | 225 | 442 | 442 |
| 127 | 25.4 | 6.21 | 1500 | 3.53 | 2.59 | 1.80 | 1.81 | 462 | 327 | 225 | 442 | 442 |
| 128 | 25.6 | 6.26 | 1500 | 3.55 | 2.61 | 1.80 | 1.81 | 462 | 327 | 225 | 442 | 442 |

FIG. 33 (cont.)

| Min Act Pos | 40 | RPM | 1500 | | | | | | | | | |
|---|---|---|---|---|---|---|---|---|---|---|---|---|
| Max Act Pos | 442 | | | | | | | | | | | |
| | | | | | | | | | | Shift Curves | | |
| | | | | | | | | | | Act Position (0-462) | | |
| | | Wheel Speed (rad/s) | RPM | Ideal GR old | Ideal GR | GR | Revs | Test | Perf | Econ | Drag Race | Step |
| Number | MPH | | | | | | | | | | | |
| 129 | 25.8 | 6.31 | 1500 | 3.58 | 2.63 | 1.80 | 1.81 | 462 | 327 | 225 | 442 | 442 |
| 130 | 26 | 6.36 | 1500 | 3.61 | 2.65 | 1.80 | 1.81 | 462 | 327 | 225 | 442 | 442 |
| 131 | 26.2 | 6.40 | 1500 | 3.64 | 2.67 | 1.80 | 1.81 | 462 | 327 | 225 | 442 | 442 |
| 132 | 26.4 | 6.45 | 1500 | 3.66 | 2.69 | 1.80 | 1.81 | 462 | 327 | 225 | 442 | 442 |
| 133 | 26.6 | 6.50 | 1500 | 3.69 | 2.71 | 1.80 | 1.81 | 462 | 327 | 225 | 442 | 442 |
| 134 | 26.8 | 6.55 | 1500 | 3.72 | 2.73 | 1.80 | 1.81 | 462 | 327 | 225 | 442 | 442 |
| 135 | 27 | 6.60 | 1500 | 3.75 | 2.75 | 1.80 | 1.81 | 462 | 327 | 225 | 442 | 442 |
| 136 | 27.2 | 6.65 | 1500 | 3.78 | 2.77 | 1.80 | 1.81 | 462 | 327 | 225 | 442 | 442 |
| 137 | 27.4 | 6.70 | 1500 | 3.8 | 2.79 | 1.80 | 1.81 | 462 | 327 | 225 | 442 | 442 |
| 138 | 27.6 | 6.75 | 1500 | 3.83 | 2.81 | 1.80 | 1.81 | 462 | 327 | 225 | 442 | 442 |
| 139 | 27.8 | 6.80 | 1500 | 3.86 | 2.83 | 1.80 | 1.81 | 462 | 327 | 225 | 442 | 442 |
| 140 | 28 | 6.84 | 1500 | 3.89 | 2.85 | 1.80 | 1.81 | 462 | 327 | 225 | 442 | 442 |
| 141 | 28.2 | 6.89 | 1500 | 3.91 | 2.87 | 1.80 | 1.81 | 462 | 327 | 225 | 442 | 442 |
| 142 | 28.4 | 6.94 | 1500 | 3.94 | 2.89 | 1.80 | 1.81 | 462 | 327 | 225 | 442 | 442 |
| 143 | 28.6 | 6.99 | 1500 | 3.97 | 2.91 | 1.80 | 1.81 | 462 | 327 | 225 | 442 | 442 |
| 144 | 28.8 | 7.04 | 1500 | 4 | 2.93 | 1.80 | 1.81 | 462 | 327 | 225 | 442 | 442 |
| 145 | 29 | 7.09 | 1500 | 4.03 | 2.95 | 1.80 | 1.81 | 462 | 327 | 225 | 442 | 442 |
| 146 | 29.2 | 7.14 | 1500 | 4.05 | 2.97 | 1.80 | 1.81 | 462 | 327 | 225 | 442 | 442 |
| 147 | 29.4 | 7.19 | 1500 | 4.08 | 2.99 | 1.80 | 1.81 | 462 | 327 | 225 | 442 | 442 |
| 148 | 29.6 | 7.24 | 1500 | 4.11 | 3.01 | 1.80 | 1.81 | 462 | 327 | 225 | 442 | 442 |
| 149 | 29.8 | 7.28 | 1500 | 4.14 | 3.03 | 1.80 | 1.81 | 462 | 327 | 225 | 442 | 442 |
| 150 | 30 | 7.33 | 1500 | 4.16 | 3.05 | 1.80 | 1.81 | 462 | 327 | 225 | 442 | 442 |

DETAIL G

DETAIL C

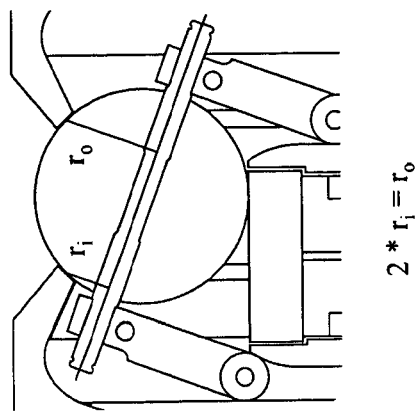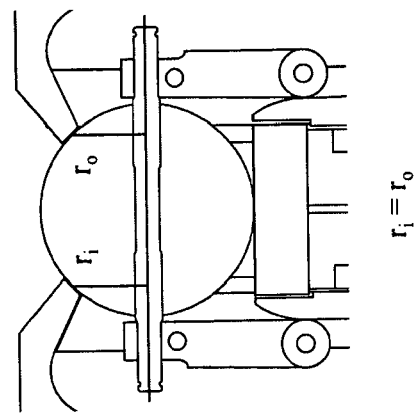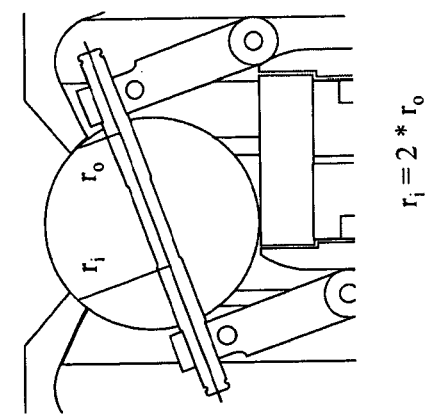
FIG. 37

SYSTEMS AND METHODS FOR CONTROL OF TRANSMISSION AND/OR PRIME MOVER

RELATED APPLICATIONS

This application claims priority to, and hereby explicitly incorporates herein by reference in their entireties, U.S. Provisional Patent Applications 60/887,767; 60/895,713; and 60/914,633.

FIELD OF THE INVENTION

The present invention relates generally to mechanical power transmission, and more specifically to systems for and methods of control of continuously variable transmissions and electric drive motors.

RELATED TECHNOLOGY

Electric vehicles are becoming more popular around the world as battery prices decline and technology and performance advance. Factors such as high fuel costs and internal combustion engine emissions are making electric vehicles more attractive to customers looking for a cost-effective commuting option. However, the performance and range of a typical electric vehicle is often inferior when compared to that of competitive gasoline-powered vehicles. Additionally, manufacturer stated maximum speed and range values are often based on idealized duty cycles that are not representative of real-world conditions.

There is a need for technology that can increase performance and range of electric vehicles to make them competitive with gasoline-powered vehicles; hence, providing quiet, clean, and efficient transportation for commuters worldwide. By way of example, as described herein below in relation to inventive embodiments, integrating a continuously variable drivetrain (for example, employing a continuously variable transmission and suitable control strategies) in electric vehicles yields numerous advantages.

SUMMARY OF THE INVENTION

The systems and methods described herein have several features, no single one of which is solely responsible for the overall desirable attributes. Without limiting the scope as expressed by the claims that follow, the more prominent features of certain embodiments of the invention will now be discussed briefly. After considering this discussion, and particularly after reading the section entitled "Detailed Description of Certain Inventive Embodiments," one will understand how the features of the systems and methods provide several advantages over related traditional systems and methods.

One aspect of the invention concerns a drive system having a prime mover coupled to a continuously variable transmission (CVT). The drive system includes a control system operably coupled to the CVT, wherein the control system is configured to manage power distribution to the prime mover, and wherein the control system is further configured to adjust a transmission speed ratio of the CVT.

Another aspect of the invention is directed to a drive system having a continuously variable transmission (CVT) and a control system coupled to the CVT. The control system includes a mechanical actuator coupled to the CVT, a controller configured to be in electrical communication with the mechanical actuator (the controller configured to control the mechanical actuator), a data display configured to be in electrical communication with the controller, and a plurality of sensors coupled to the controller.

Yet another aspect of the invention is addressed to a control system for use with a continuously variable transmission (CVT). The control system has a controller configured to provide a plurality of operating modes for the CVT, said modes being selectable by a user of the CVT. The control system can further include an actuator motor coupled to the CVT and in electrical communication with the controller. In one embodiment, the control system also includes a drive motor coupled to the CVT and in electrical communication with the controller. In one embodiment, the control system includes an actuator position sensor coupled to the actuator motor and in electrical communication with the controller, wherein the actuator position sensor is configured to provide an indication of a transmission speed ratio of the CVT.

In one aspect the invention is concerned with a drive system having a continuously variable transmission (CVT) housed in a wheel hub, a drive motor operably coupled to the CVT and configured to provide power to the CVT, and an actuator motor coupled to the CVT and configured to adjust a transmission speed ratio of the CVT.

Yet a different aspect of the invention is directed to a control system for a drivetrain having a continuously variable transmission (CVT) and a drive motor. The control system includes a controller having a microcontroller, a random access memory, and a flash memory; a power control module configured to be in electrical communication with a power source and the controller, the power control module adapted to regulate a voltage; and a communication interface operably coupled to the power control module and the controller, the communication interface configured to connect to an external programming or data acquisition hardware. The control system can also include a main drive module configured to communicate with the controller, the main drive module further configured to modulate electrical power provided to the drive motor; and an actuator control module configured to communicate with the controller, the actuator control module operably coupled to the CVT.

In one aspect, the invention is directed to a control system for a drivetrain having a continuously variable transmission (CVT), an actuator motor, and a drive motor. The control system includes a transmission controller module configured to communicate with the actuator motor, a drive motor controller module configured to communicate with the transmission controller module and the drive motor, and a throttle position sensor configured to communicate with the transmission controller. The control system can additionally include a brake cut-off switch configured to communicate with the drive motor controller, a wheel speed sensor configured to communicate with the transmission controller, and an actuator position sensor configured to communicate with the transmission controller.

In another aspect, the invention concerns a method of controlling a drivetrain of a vehicle having a continuously variable transmission (CVT) and a drive motor. The method includes the steps of sensing a vehicle speed and a battery voltage, determining an optimum transmission speed ratio of the CVT based at least in part on the sensed vehicle speed and battery voltage, and commanding a shift actuator of the CVT based at least in part on the optimum transmission speed ratio.

Yet one more aspect of the invention is directed to a controller having a controller housing, which controller housing exhibits an interior cavity; a controller board assembly coupled to the controller housing and arranged in the interior cavity. In one embodiment, the controller board assembly includes a motor controller board and a transmission controller board, which transmission controller board is configured to be in electrical communication with the motor controller board.

Yet another aspect of the invention addresses a controller housing having a body with a generally rectangular-shaped interior cavity adapted to receive a controller board assembly. Said body includes, in one embodiment, a plurality of protrusions located on the interior cavity, the protrusions configured to attach to the controller board assembly. Said body can further be provided with a potting formed in the interior cavity, the potting configured to enclose substantially the controller board assembly.

These and other improvements will become apparent to those skilled in the art as they read the following detailed description and view the enclosed figures.

BRIEF DESCRIPTION OF THE DRAWINGS

FIG. 10 is a data table showing observed differences and advantages obtained by using the transmission and/or prime mover controllers disclosed here as compared to certain known fixed ratio drive systems.

FIG. 25A is a block diagram of one embodiment of still another control system that can be used with the drive system of FIG. 1.

FIG. 33 is a data table used to derive the chart of FIG. 32.

FIG. 37 is a schematic diagram that shows certain kinematic relationships of a ball planetary CVT.

DETAILED DESCRIPTION OF CERTAIN INVENTIVE EMBODIMENTS

Figure 1:
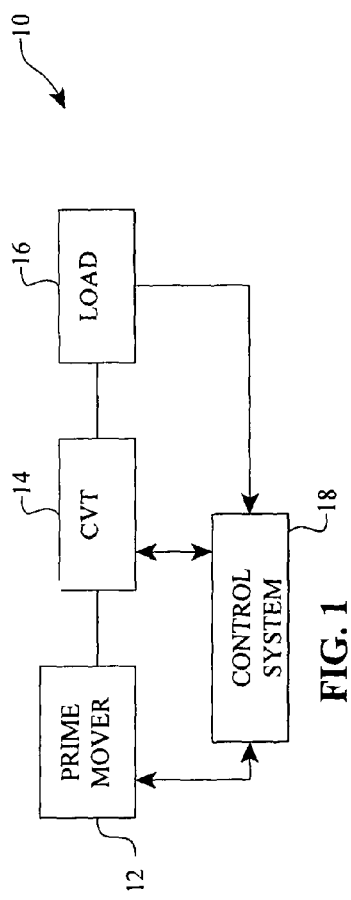
FIG. 1 is a block diagram of a drive system that can implement the control systems and methods disclosed here.

The preferred embodiments will now be described with reference to the accompanying figures, wherein like numerals refer to like elements throughout. Inventive embodiments may include several novel features, no single one of which is solely responsible for its desirable attributes or which is essential to practicing the inventions herein described. The CVT/IVT embodiments described here are generally related to transmissions and variators disclosed in U.S. Pat. Nos. 6,241,636; 6,419,608; 6,689,012; 7,011,600; U.S. patent application Ser. Nos. 11/243,484 and 11/543,311. The entire disclosure of each of said patents and patent applications is hereby incorporated herein by reference.

A typical powertrain of an electric vehicle (EV) includes a power source (for example, a battery), an electric drive (for example, a drive motor and a drive motor controller), and a fixed-gear transmission device (for example, sprockets, chain, gearing, etc.). Usually an EV uses a direct-drive configuration where the operating speed of the EV is linked directly to the speed of the electric drive motor by a fixed gear ratio (or, in other words, a fixed transmission speed ratio). This is a simple configuration, and no variable transmission speed ratios are implemented, usually at the expense of efficiency and/or performance (for example, limiting acceleration and maximum speed of the EV).

However, an EV system can be improved by incorporating a continuously variable transmission (CVT) into the EV drivetrain. When a CVT is used in an EV, vehicle performance can be improved because the drivetrain can be optimized at particular operational speeds and load conditions. A CVT also improves the efficiency of an EV. The efficiency of the electric motor is a function of operating speed and load, and battery life is a function of current draw. A CVT and a suitable controller allow the drivetrain to operate at speeds of the drive motor, and with selected drive motor current management, such that overall efficiency and range can be improved. In one embodiment, the CVT is a NuVinci® CVT, which is a compact, high torque-density unit that uses a planetary configuration based on spheres and traction to provide continuously variable speed ratio control.

By way of example, a NuVinci® CVT and a suitable control system (such those inventive embodiments described herein) can provide smooth, seamless shifts of the transmission speed ratio across the full range of speed ratios. In addition, since there are no fixed gear ratios, the control system is able to control component speeds precisely, allowing them to operate substantially at their optimal speed for a given operating condition. In some embodiments, the control logic also allows programming for different conditions, allowing the user (or manufacturer) to decide when performance or range is ultimately desired. Certain configurations of the NuVinci® CVT are easily packaged on an EV, and do not significantly affect the cost or the weight of the EV.

Additionally, users demand different operating characteristics from EVs. Some users are concerned with maximum range, while other users care more about performance factors (for example, vehicle launch, maximum speed, and hill climbing at speed). In the case of an inexperienced user, desiring maximum efficiency and range, the user might operate the EV in a fashion that provides better performance (for example, a quicker launch and/or higher maximum speed of the EV), but ultimately causes the maximum range to suffer dramatically because of high current draw and operation of the electric drive motor at an inefficient speed. However, when combined with a suitable control system for optimal drivetrain operation, a CVT can allow the EV to operate in a desired mode, such as a performance mode or an efficiency mode. In performance mode, range and efficiency are less important than outright performance, and the transmission control system optimizes for acceleration, maximum speed of the EV, and hill climbing at speed, for example. In efficiency mode, range is the priority, so the control system keeps the drive motor at its most efficient speed and imposes limits on current draw from the battery, for example.

In one embodiment, a control strategy uses data for motor efficiency versus motor speed and motor torque, as well as battery life versus current draw, to improve performance and efficiency of the overall system. Analysis models indicate that there are benefits of using a CVT in EVs, and the results of the modeling have been confirmed by empirical testing of CVT-equipped EVs that were compared to benchmark stock vehicles (fixed-gear ratio).

The typical duty cycle of an EV is highly dynamic because it involves numerous stops and starts, uneven terrain, and variable wind resistance. A drivetrain with a CVT can benefit an EV that operates over these dynamic speed and load conditions by allowing the drive motor to operate closer to its peak power or peak efficiency over a broad range of a given duty cycle. Generally, when coupled to a CVT a propulsion source is capable of generating more torque and more speed than when coupled with a fixed gear ratio transmission. As compared to a fixed-gear ratio configuration, a CVT lower gear ratio can allow for better launch feel and better hill climb ability, while a CVT higher gear ratio can allow for higher maximum speeds. Additionally, in certain circumstances, increased acceleration of the EV is possible because the CVT changes the effective inertia seen at the drive motor.

In one embodiment, the CVT is installed in a recreational-type LEV using an in-wheel configuration where the housing of the CVT also forms the spokes and rim of the wheel. A drive motor is configured to transfer power to the transmission via a chain and sprocket coupled to the transmission. Alternative methods of integrating the CVP to a vehicle include mounting the CVP to the chassis or the drive motor, or integrating the wheel, CVP, and drive motor as one unit, for example.

Referencing FIG. 37, there is shown the system kinematics of a well-known CVT, where $r_i$ is the contact radius of the input contact, and $r_o$ is the contact radius at the output contact. The transmission speed ratio is determined by the tilt angle of the ball axis, which changes the ratio of $r_i$ to $r_o$, and thus the transmission speed ratio. The result is the ability to sweep the transmission through the entire ratio range smoothly.

Two features allow the NuVinci® CVT to provide continuous gear ratio range operation in a small package. The first is the geometric configuration of the drive, which is based on differential contact radii of a sphere. Contacting a rotating sphere at two different locations provides a "gear ratio" (that is, a transmission speed ratio), which can range from underdrive to overdrive depending on the location of the contact points for input and output speed. The spheres are placed in a circular array around a central traction component and contact an input ring and an output ring. Continuously variable transmission speed ratios are possible by tilting the rotational axis of the spheres (that is, varying the contact radii between the spheres and the input and output rings). This configuration allows input and output to be concentric and compact. The result is the ability to sweep the CVT through the entire ratio range smoothly.

The second feature the NuVinci® CVT exhibits is a traction fluid. A typical traction drive uses a traction fluid that under normal circumstances and pressures provides lubrication for the drive. When the traction fluid undergoes high contact pressures, the fluid undergoes a phase change and becomes a tractive solid. Within a traction patch, molecules of the fluid stack up and form a solid through which shear and torque can be transferred. In one embodiment, the CVT for an EV uses multiple spheres to transfer torque through multiple traction patches.

In one inventive embodiment, a drive motor and a transmission controller are configured to optimize the drive-train components of the EV. The hardware can be provided as an add-on controller that works in conjunction with the existing motor controller of the EV, or as a stand-alone integrated controller. In the case of the add-on configuration, in one embodiment, correct CVT speed ratio can be determined from a speed sensor and a throttle position (intercepted between the throttle and the drive motor controller). For the integrated controller, control of the drive motor and of the CVT can be joined more intimately, thereby increasing efficiency, simplicity, and reducing cost. The control system can react to driving conditions and is configured to keep the drive motor in an optimal range for a given operating condition. As used here, the term "operating condition" refers to a vehicle operating parameter, environmental state, and/or user selections, commands, or inputs. Additionally, the control system can take into account battery state of charge and duty cycle efficiency to help manage power consumption.

In one case, the NuVinci® CVT is installed in an EV. In one example, the CVT is integrated into the rear wheel of the EV, and the CVT speed ratio is controlled automatically via a shift actuator and an electronic control system.

In one embodiment, the EV application of the NuVinci® CVT uses a shift actuator and a suitable control system to allow continuous and optimized shifting. The EV is equipped with an electronic controller that monitors system operating parameters (for example, battery current, wheel speed, shift position, etc.) to control the CVT and the drive motor in closed loop control. Although the NuVinci® is used here as an example, inventive embodiments described here can be used with various types of CVTs, including belt-pulley CVTs, toroidal CVTs, cone-based CVTs, Milner CVT, hydrostatic CVTs, and the like.

In some embodiments, the control system can optimize the drive motor speed, battery current, and transmission speed ratio based on, for example, drive motor and CVT efficiency maps. In one example, the system seeks to keep relatively constant the speed of the drive motor and/or to limit the maximum current draw from the battery.

In one embodiment, a shift actuator is configured to shift the speed ratio of the transmission. In certain embodiments, the transmission control system can be integrated with the motor controller (single control unit per vehicle), or can operate in conjunction with a drive motor controller already provided with the EV. The transmission controller can be configured to read drive motor current draw, drive motor speed, wheel speed, and/or battery voltage to determine the best CVT speed ratio for a given operating condition. This allows the drive components to operate at optimal speeds for the given operating conditions (including taking into account the selected mode of operation).

In one study, the Currie IZIP 1000 scooter (a direct-drive EV) was used for simulation and analysis. Vehicle dynamics equations illustrate the possible performance advantages of a CVT added to this direct-drive EV. The equation of longitudinal motion is:

$$M_v a_v = F_t - F_f - F_w \quad (1)$$

where: $M_v$=mass of the vehicle and rider; $a_v$=acceleration of the vehicle and rider; $F_t$=tractive force at the drive wheel; $F_f$=force due to total road loads; $F_w$=force due to aerodynamic drag.

Equations for the forces above can be stated as:

$$F_t = \frac{(T_m - I_{eg_m}\alpha_m)i_o i_{cvp}\eta_{cvp}}{r_d} \quad (2)$$

$$F_f = M_v g(f_r + \text{slope}) \quad (3)$$

$$F_w = \frac{1}{2}\rho C_d A_f v^2 \quad (4)$$

where: $T_m$=torque output of the drive motor; $I_{eg_m}$=equivalent reflected inertia at the drive motor; $\alpha_m$=angular acceleration of the drive motor; $i_o$=gear ratio of the drive motor to the CVP (motor speed/CVP input speed); $i_{cvp}$=gear ratio of CVP (CVP input speed/CVP output speed); $\eta_{cvp}$=efficiency of CVP; $r_d$=effective radius of the tire; g=acceleration due to gravity; $f_r$=rolling resistance coefficient; slope=elevation divided by distance; $\rho$=density of air; $C_d$=aerodynamic drag coefficient; $A_f$=frontal area of vehicle and rider; v=velocity of vehicle and rider.

The equivalent reflected inertia at the drive motor shaft is given by:

$$I_{eq_m} = I_m + \frac{I_w}{i_o^2 i_{cvp}^2} \quad (5)$$

where: $I_m$=rotational inertia of the motor, and $I_w$=rotational inertia of the wheel.

These equations provide a framework to determine acceleration, hill climb ability, and maximum speed improvements possible for a Currie IZIP 1000 scooter equipped with a CVT.

For vehicle launch, initial speed and aerodynamic drag are zero. At this instant, the acceleration of the vehicle is determined from Equations 1 through 4 and is:

$$a_v = \frac{(T_m - I_{eq_m}\alpha)i_o i_{cvp}\eta_{cvp}}{M_v r_d} - gf_r \quad (6)$$

Using values representative of the Currie IZIP 1000 scooter, this analysis indicates that initial launch acceleration ($a_v$) can be increased up to 45% by implementing a CVT into the system. This result assumes that the EV is not traction limited by the traction capacity of the tires, and that the acceleration is stable and controllable.

Figure 38:
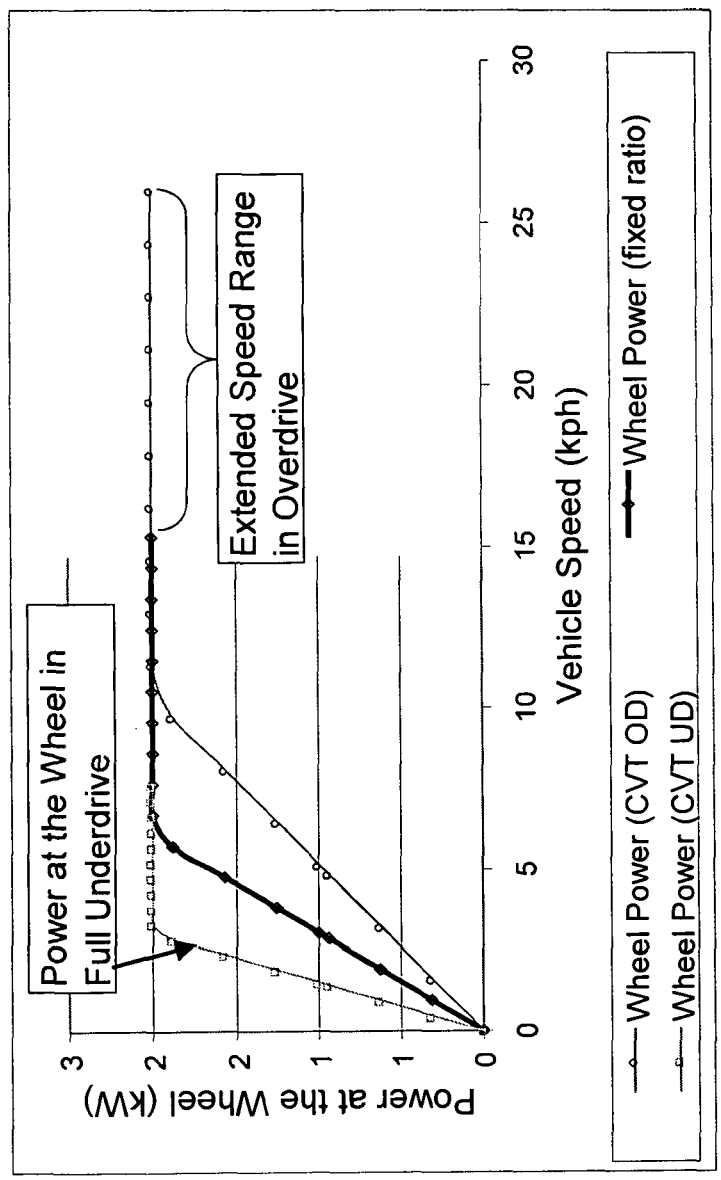
FIG. 38 is chart that presents data illustrating the power level delivered to the wheel of an EV when equipped with a CVT and when equipped with a fixed ratio drive.

Further, FIG. 38 shows that for a representative drive motor curve, the CVT allows the drive motor to reach the peak power condition at a lower speed of the EV than with a fixed ratio configuration.

The CVT can also have a significant effect on reflected inertia at the motor shaft, as defined in equation 5. A higher gear ratio reduces the rotational inertia reflected at the drive motor, and thus increases acceleration for a given torque. With the ability to modulate the equivalent inertia at the drive motor shaft, the control system can use the CVT to manage acceleration at all portions of the drive cycle.

A reasonable metric for hill climb capability can be defined as the max num steady state speed that can be achieved on a given slope. Because this is a steady state metric, the acceleration component of equation 1 is zero and we can determine the speed for a given slope by combining equations 1 through 4 and solving for steady state velocity:

$$v = \sqrt{\frac{2T_m i_o i_{cvp} \eta_{cvp} - M_v g(f_r + \text{slope})r_d}{\rho_a C_d A_f r_d}} \quad (7)$$

Another metric of interest is the maximum slope the vehicle and rider can climb at a given velocity, which is simply solving equation 7 for steady state slope:

$$\text{slope} = \frac{T_m i_o i_{cvp} \eta_{cvp} - \frac{1}{2}\rho C_d A_f v^2 r_d}{M_v g r_d} - f_r \quad (8)$$

Using values representative of the Currie IZIP 1000 scooter, it can be shown that a CVT equipped scooter can theoretically obtain at least a 69% increase in steady state velocity up a given slope. It should be noted that this is the case because in the stock scooter the speed of the drive motor drops below its base speed, where the drive motor delivers less power. It can also be shown that the maximum slope the EV and rider can climb increases by at least 45% with a CVT.

Additionally, steady state torque at the rear wheel ($T_w$) can be defined from Equation 2 as:

$$T_w = F_t r_d = T_m i_o i_{cvt} \eta_{cvt} \quad (9)$$

Figure 39:
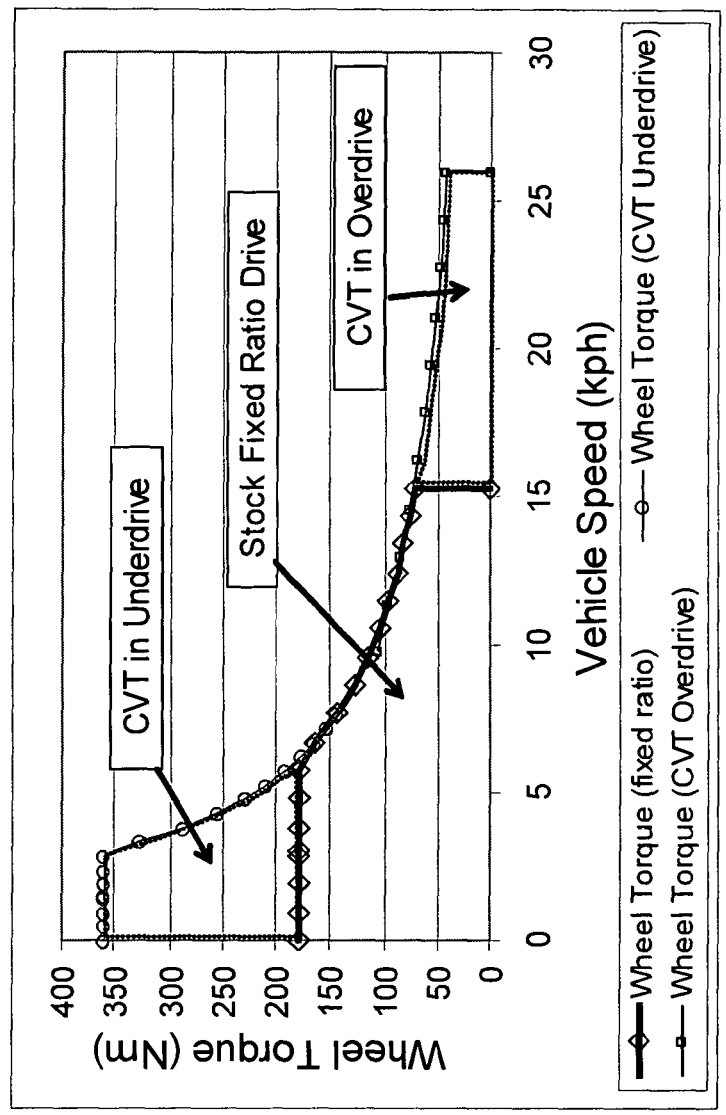
FIG. 39 is a chart that presents data illustrating the torque versus speed relationships for an EV equipped with a CVT and for an EV equipped with a fixed ratio drive.

Applying a generic torque curve for a typical, controlled, brushed DC motor (as shown in FIG. 39), commonly used in some EVs, and applying the CVT ratio in equation 9, we can determine the effect that the CVT has in increasing the overall operating range of the EV. FIG. 39 shows that in underdrive the CVT increases the torque delivered to ground and increases the hill climb capability of the EV.

Maximum speed is defined as the maximum speed a vehicle and rider can reach at steady state, with no grade. Similar to the hill climb, acceleration is zero at this condition and there is no dependence on system inertia.

Two scenarios can define the maximum possible speed for an electric vehicle. If the drive motor can spin freely to its maximum speed, the vehicle is said to be motor speed-limited. If the drive motor cannot overcome the total road load and aerodynamic forces before reaching its top speed, the vehicle is said to be power-limited.

If the vehicle is motor speed-limited, the maximum speed of the EV can be increased by adding a CVT, as shown in the overdrive region of FIG. 39. The vehicle can be geared such that, at the maximum speed of the EV, the tractive force at the wheel is completely opposed by the road loads and aerodynamic drag. This is also governed by equation 7.

The Currie IZIP 1000 scooter is motor speed-limited, and therefore it benefits from the addition of the CVT. Using equation 7 with representative values for the Currie scooter, it can be shown that the maximum speed of the EV can be increased by up to 75%.

If the maximum speed of an EV is power-limited in a fixed ratio configuration, the addition of a CVT might not increase the maximum speed of the EV. The reason being that beyond its base speed the electric drive motor provides constant power (as shown in FIG. 37). A transmission does not add power to the system. Hence, if the total road load and aerodynamic drag has matched the power limit of the EV, the EV is not likely to accelerate further. It should be noted, however, that for the operating range of certain EVs on the market today (for example, scooters, neighborhood electric vehicles, etc.), the maximum speed of such EVs is not power-limited.

It is apparent that a CVT in an EV increases performance in different categories, including launch acceleration, hill climb ability, and maximum speed of the EV. To improve operating range on a single battery charge, however, the control system preferably takes into account battery performance, as well as drive motor and transmission efficiency. Additionally, the control system is preferably configured to take a systems approach to controlling all the components to conditions that optimize overall system efficiency.

The operating range of an EV is dependent on the drive cycle (for example, frequency of stops and starts and hill climb and descent). For a preliminary analysis, a drive cycle was used that included no stops, four substantial elevation changes, and speeds ranging from 16-kph to 24-kph on the stock Currie IZIP 1000 scooter.

A dynamic simulation was created to model the performance of a 1000 W scooter over the chosen drive cycle. The simulation included the following features: (a) dynamic permanent magnet DC motor model (including measured efficiency data), (b) dynamic CVP model (including measured efficiency data), (c) total road load and aerodynamic drag model, (d) battery model where voltage drops as a function of current draw, and (e) current limiter that limits input power to the drive motor.

A control process simulated control of the transmission speed ratio of the CVT to shift the CVT when an efficiency improvement could be achieved. Otherwise, the control process kept the CVT at the transmission speed ratio of peak efficiency. The simulation showed that for the given duty cycle, the CVT-equipped scooter approximately matched the range performance of the stock scooter while still providing improvements in hill climb, acceleration, and maximum speed of the EV.

To empirically evaluate the impact of the use of a CVT in an EV, tests were conducted to benchmark the performance of a stock (that is, unmodified) EV against a vehicle equipped with a CVT and a suitable control system. The test EV was the 2006 model Currie IZIP 1000 scooter.

A NuVinci® CVT was integrated into a rear wheel design, which is compatible with the frame of the stock scooter. Tests were conducted with a data acquisition system fixed to the vehicle that included a data logger, supply battery, and various sensors and wiring. Four tests were performed, including standing start acceleration, maximum speed, hill climb ability and range. For acceleration, hill climb, and range tests, the system control software limited the maximum speed of the CVT-equipped scooter to match approximately the maximum speed of the stock scooter. The acceleration test was conducted from a standing start on flat asphalt and used a predetermined start line and an infrared photogate for the finish line at a distance of 0.2-km. Speed data was used to obtain acceleration times from 0-kph to 16-kph and 0-kph to 19-kph, and the time to complete the distance. The maximum speed of the scooter was measured as an independent test on flat asphalt with the speed limit removed. The system was manually set to its maximum, possible sustained vehicle speed, and speed data was recorded. The hill climb benchmark was performed on a predetermined hill with a subtly increasing grade over a fixed distance of 0.75-km. The range test involved driving the vehicle continually over a 5.15-km loop until the maximum, sustained vehicle speed dropped below a predetermined level. The course included a variety of grades and two stops and starts. In addition to collecting data on vehicle performance, drive cycle characteristics (such as GPS data, elevation, and hill grade) were recorded to characterize a typical drive cycle of an EV used for commuting.

The results of the benchmark tests indicate significant increases in performance and hill climb capability. The 0-kph to 16-kph and 0-kph to 19-kph times represent 25% and 24% increases, respectively, with the use of the CVT and the control system. Additionally, the time to complete the hill climb test was almost halved, and there was an 85% increase in average speed.

With the speed limit removed in the control system software, the CVT-equipped vehicle achieved a maximum speed of 34-kph, which represents a 61% increase over the maximum speed of the stock vehicle. This indicates that the maximum speed of the stock vehicle is not power-limited, but rather, is motor speed-limited.

Some of the factors influencing the range results with the CVT-equipped EV include that the maximum speed limit of the CVT-equipped EV was set slightly higher than with the stock EV, yielding higher aerodynamic losses. Additionally, the drive motor controller allowed the battery to deliver slightly higher current with the CVT-equipped EV. It is notable that the CVT and the control system provided substantial performance improvements with negligible impact on range. The benefits realized are, in part, a result of controlling the drive motor and the transmission as a system.

The stock scooter showed reasonable consistency in performance data, but failed to climb hills with a 10% without overloading the drive motor controller. With an adult rider, the advertised maximum speed of the stock scooter could not be achieved.

In some embodiments, the controller can be configured to facilitate different modes of operation. In some cases, it is preferable to have an economy mode where the EV is used for commuting or a performance mode where the EV is used for recreation. Although not as efficient, manual shifting of the transmission can provide a unique and fun aspect to rider experience. The desired controller mode can be selected through an external user interface, throttle position, or can be set by the control system automatically by analyzing driving parameters, inputs, and history.

EVs that employ regenerative braking can also benefit from use of the CVT and control system. The control system can be configured to command the CVT to allow the drive motor to operate at its most efficient speed for generating energy to supply back to the battery system, when regeneration is required during braking or extended descents.

Described in the following are various inventive embodiments of drivetrains for EVs that incorporate one or more configurations of CVTs, drive motor, and suitable controllers and processes for optimizing EV performance, range, etc., under various operating conditions and/or desired operating modes. As used here, the terms "drivetrain" and "powertrain" are used interchangeably; it should be understood that in some embodiments a drivetrain includes references to a power source, such as a battery.

Referencing FIG. 1 now, a drive system 10 includes a prime mover 12 coupled to a continuously variable transmission (CVT) 14, which is coupled to a load 16. In one embodiment, a control system 18 is adapted to receive information from the prime mover 12, CVT 14, and/or load 16. The control system 18 can also be adapted to provide commands to or actuate the prime mover 12 and/or the CVT 14. The prime mover 12 can be any source of power, such as an electric motor, internal combustion engine, wind turbine, a combination thereof, etc. The electric motor can be, for example, a brushed DC motor, a brushless DC motor, a permanent magnet motor, or any other type of electric motor. The load 16 can be a tractive load, which can include the weight of vehicle and/or an operator and/or cargo and passengers. The CVT can be a ball planetary CVT, a toroidal CVT, or a belt-and-pulley CVT, for example. In one embodiment, a drive system 10 includes a NuVinci® continuously variable planetary, and a drive mechanism between the prime mover and the CVT. The drive mechanism can be, for example, a chain and sprocket drive, a direct gear drive, or any other type of power transmission gearing. In some embodiments, the control system 18 includes sensors, actuators, and control hardware, firmware, and logic as described further below.

The system, or subassemblies thereof, shown in FIG. 1 can be adapted for use in any ground, air, or water transportation machine, industrial or agricultural equipment, aerospace vehicles and equipment, and household machines, to name a few applications.

Figure 2:
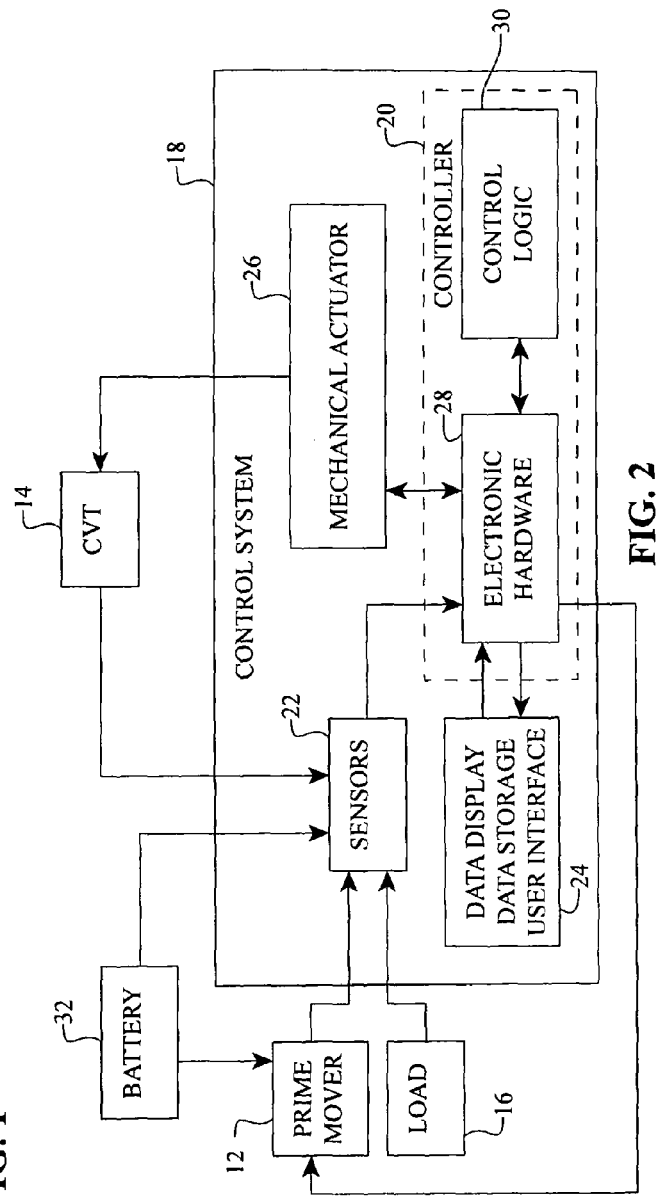
FIG. 2 is a block diagram of one embodiment of a control system that can be used with the drive system of FIG. 1.

FIG. 2 illustrates one embodiment of a control system 18 that includes a controller 20 in communication with sensors 22, a data display and user interface 24, a mechanical actuator 26, and the prime mover 12. In one embodiment, the controller 20 includes electronic hardware 28 in communication with control logic 30. In some embodiments, the sensors 22 are adapted to sense conditions of the prime mover 12, load 16, and a battery 32, which can be configured to provide power to the prime mover 12. The battery 32 can be, for example, a 36V battery.

Figure 3:
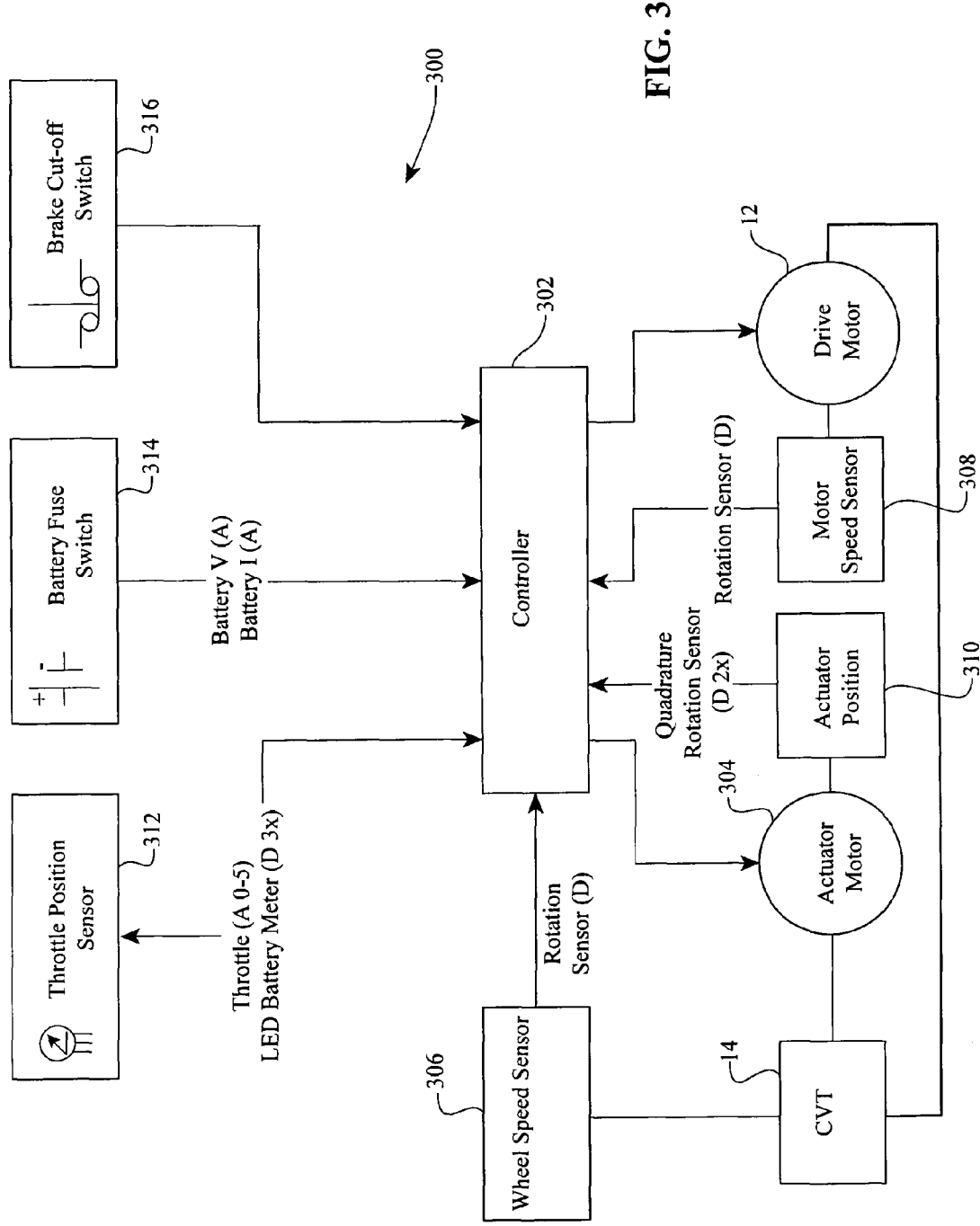
FIG. 3 is a block diagram of a drive control system having an integrated controller.

Referencing FIG. 3 now, in one embodiment, a controller 302 can control the CVT 14 and the prime mover 12 to maximize the performance and efficiency of a vehicle. This embodiment can be referred to as an integrated control in that most or all of the control components and functionality used to control the CVT 14 and the prime mover 12 can be integrated in a single controller 302, which in some embodiments includes a single electronic board. In one embodiment, the controller 302 can be adapted to receive a throttle input (which can be a voltage source).

In one embodiment, a control system 300 can include an actuator motor 304 to actuate a shift (that is, an adjustment) of the speed ratio of the CVT 14. The CVT 14 can be coupled to the drive wheel assembly of a vehicle, for example. In one embodiment, the system includes sensors. These can include a wheel speed sensor 306 for sensing wheel speed and/or a motor speed sensor 308 for sensing the speed of the drive motor. The sensors 306, 308 can be any type of speed sensor, for example an active magnetic sensor, passive magnetic sensor, or encoder of any type. In some embodiments, the speed of the drive motor 12 can be sensed directly in a controller 340 by measuring the frequency of electric current supplied to the drive motor. Similarly, there can be an actuator position sensor 310 that can be, for example, an encoder or potentiometer. In some embodiments, the actuator position can be derived from the measured speed ratio of the CVT 14. The speed ratio of the CVT 14 can be calculated from the wheel speed, speed of the drive motor 12, and any gear ratios in the system. The system 300 can additionally include a throttle position sensor 312, a battery fuse switch and/or sensor 314, and a brake cut-off switch and/or sensor 316, any of which can be configured to provide signals to the controller 302.

Figures 4, 5:
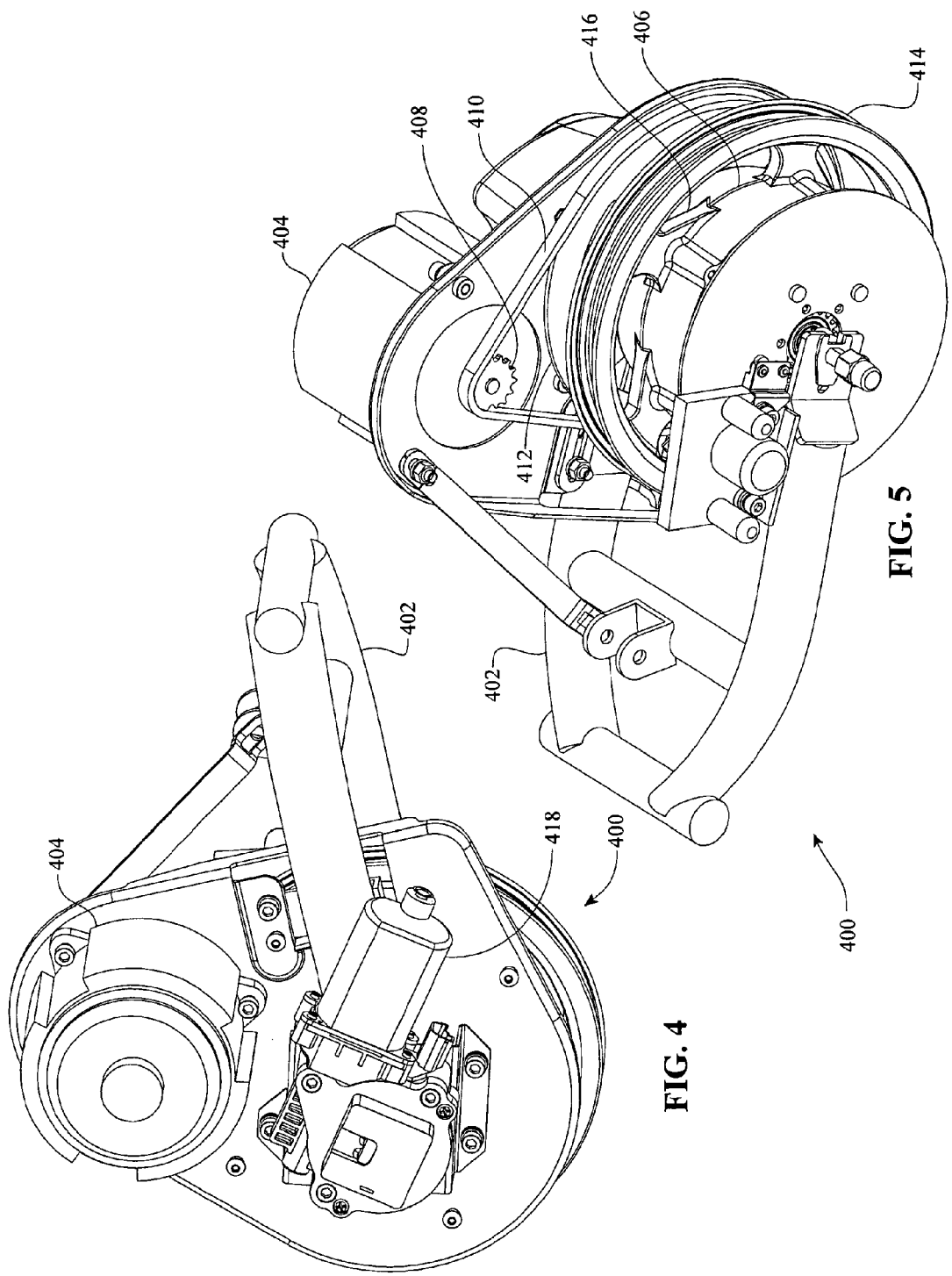
FIG. 4 is a perspective view of a drive control system as implemented in a vehicle.
FIG. 5 is a second perspective view of the drive control system of FIG. 4.

FIGS. 4 and 5 show different views of one embodiment of a drive system 400. A frame 402 of a vehicle (a scooter, electric bicycle, or motorcycle, for example) supports a drive motor 404 that is coupled to a CVT 406 via a pinion 408, a chain 410, and a sprocket 412. In this embodiment, the CVT 406 is integrated in the rear wheel hub of the vehicle and it drives a rim 414 via spoke 416. A shift actuator 418 is coupled to the CVT 406. The shift actuator 418 can include a shift actuator motor and suitable gearing (such as reduction gears, for example).

Figure 6:
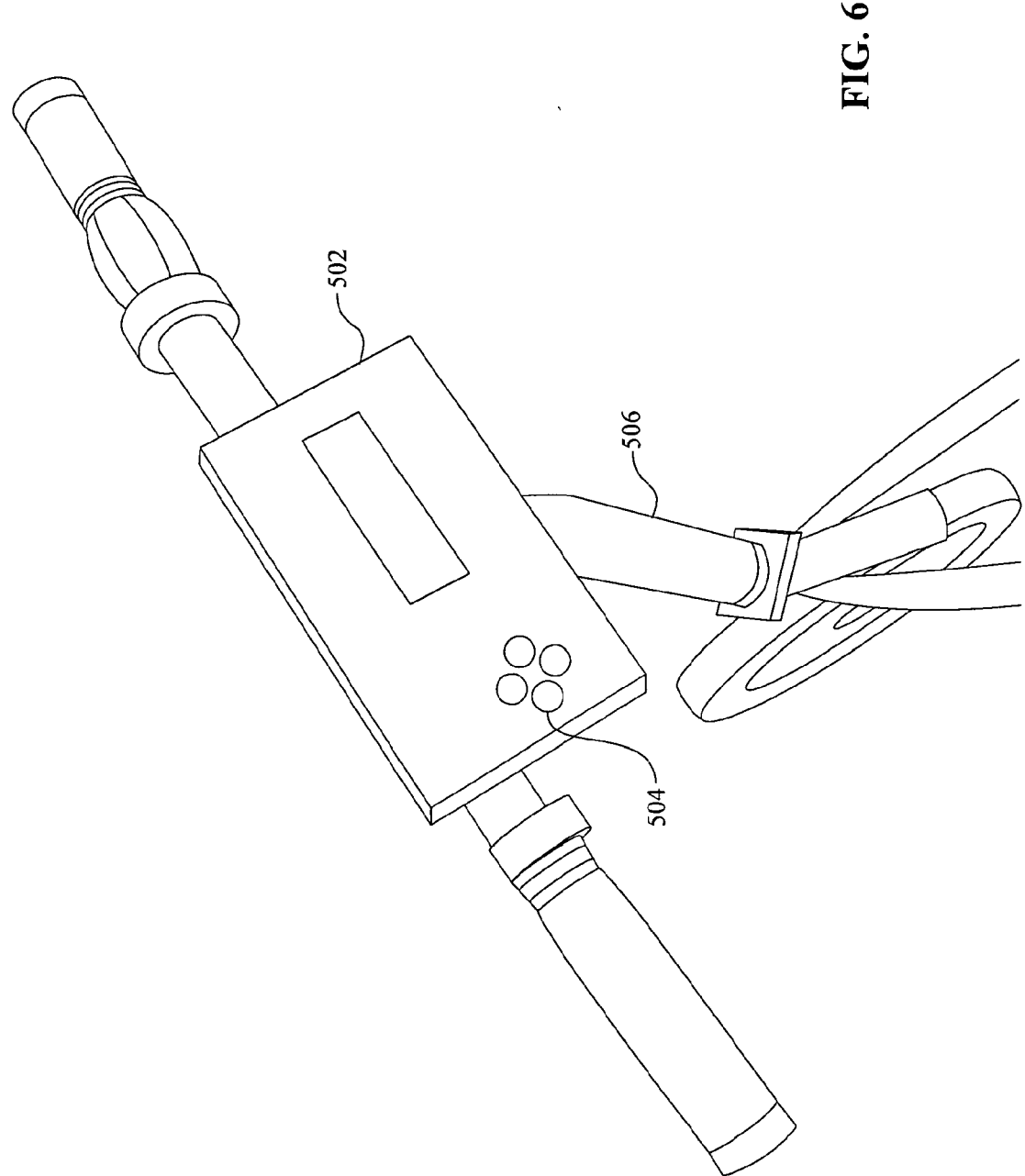
FIG. 6 is a perspective view of one embodiment of a user interface device that can be used with the control system of FIG. 2.

In one embodiment, the control system 18 includes a user interface device 502 as shown in FIG. 6. The interface device 502 can display at least some of the operating parameters of the system 10, for example, battery voltage, speed of the drive motor 12, speed of the vehicle 506, throttle position, speed ratio of the CVT 14, or mileage. Mileage can be displayed in terms of Watt-hrs/mile or some other units. The interface device 502 can be equipped with input buttons 504 to allow selection of different modes of operation while stopped or driving. The interface device 502 can be integral with the vehicle 506. Alternatively, the interface device 502 can be removable, with attachment hardware that allows easy removal of the interface device 502. The interface device 502 can be configured to record data of any signal generated or derived from the controller 340. Data can be recorded at periodic frequency, for example, a reading of all measured or derived signals every 50 ms.

Figure 7:
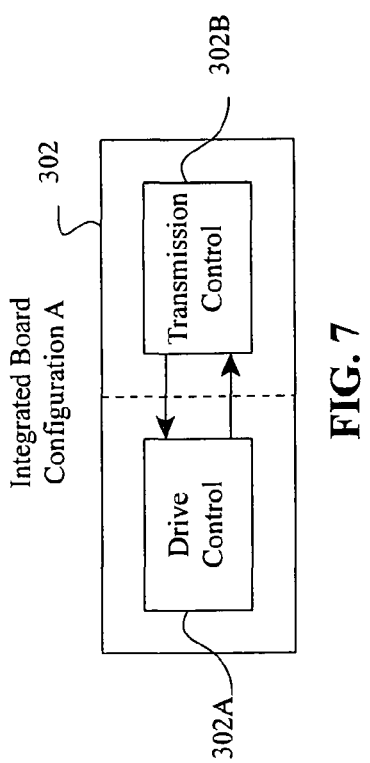
FIG. 7 is a schematic block diagram of one embodiment of an integrated transmission and drive motor controller that can be used with the drive system of FIG. 1.
Figure 8A:
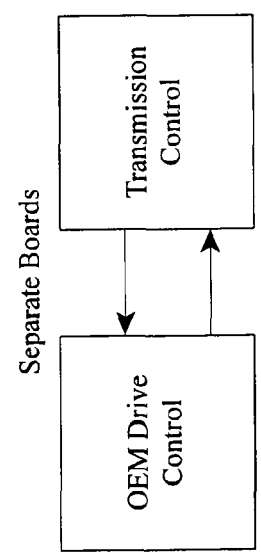
FIG. 8A is a schematic block diagram of one embodiment of a CVT controller adapted to cooperate with a stand alone drive motor controller.

A machine equipped with the control system 300 offers advantages over control systems with either a fixed ratio chain drive or a manually controlled CVT. In one embodiment, the controller 302 manages the speed and current of a drive motor 12, the current draw from a battery, and the speed ratio of the CVT 14 to optimize the efficiency, acceleration, hill climb capability, and ride feel of a given vehicle, while minimizing noise. The controller 302 can be assembled and operated in several configurations. For example, the controller 302 can include a drive motor controller 302A, for controlling the drive motor 12, as well as a CVT controller 302B, for controlling the CVT 14, all integrated on one board, as shown in FIG. 7.

Figure 8:
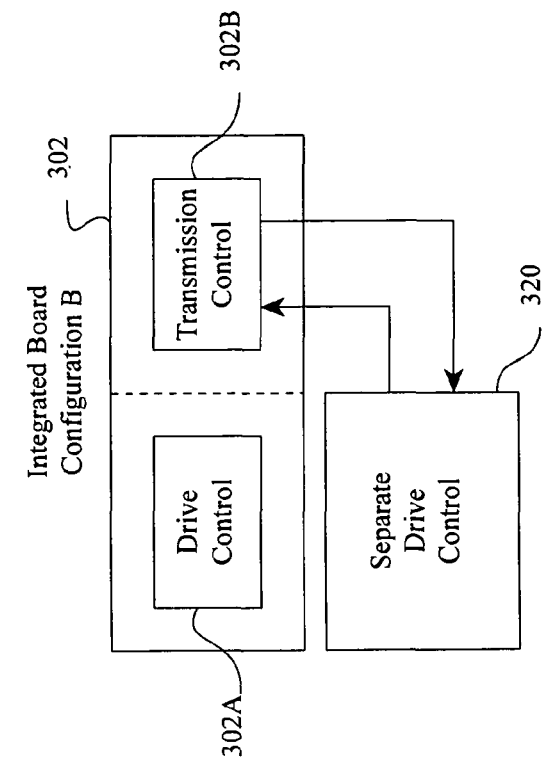
FIG. 8 is a schematic block diagram of one embodiment of a transmission and drive motor controller adapted to cooperate with a stand alone drive motor controller.

Alternatively, the controller 302 can be operated to control only the CVT 14 and to cooperate with an existing drive motor controller 320 installed on a given vehicle. In this configuration, the drive motor controller 302A in the fully integrated configuration of Figure G is disabled and the CVT controller 302B cooperates with the separate motor controller 320, as shown in FIG. 8. In this configuration, the CVT controller 302B can sense and communicate different operating parameters generated by the separate motor controller 320.

In either configuration, the controller 302 can control the drivetrain based on several inputs, such as speed of the drive motor 12, vehicle speed, current of the drive motor 12, or throttle signal.

In some embodiments, the control system 18 can have several modes of operation. In an acceleration mode ("drag race"), vehicle acceleration is maximized by quickly setting the CVT 14 in a full underdrive configuration as the vehicle launches, thus allowing the drive motor 12 to accelerate to its highest power condition and providing mechanical torque advantage to the drive motor 12. As the vehicle accelerates, the control system 18 shifts the CVT 14 according to the speed of the vehicle such that the speed of the drive motor 12 is held at the peak power condition of the drive motor 12 according to the torque, current draw, and speed of the drive motor 12. In one embodiment, in acceleration mode the control system 18 can control the electrical current between the battery 32 and the drive motor 12 in several ways. For example, the control system 18 can limit the maximum allowable current or the length of time above a certain current level, for example 65 Amps (A).

In a range mode ("economy"), the operating range of the vehicle on a single battery charge is maximized by controlling the acceleration and top speed of the vehicle to minimize power usage during driving. The controller 20 controls the speed ratio of the CVT 14 to allow the drive motor 12 to operate at its most efficient speed through all operating conditions in a given driving cycle. Further, the controller 20 can minimize the maximum current draw from the battery and the length of time operating above a certain current condition.

Figure 9:
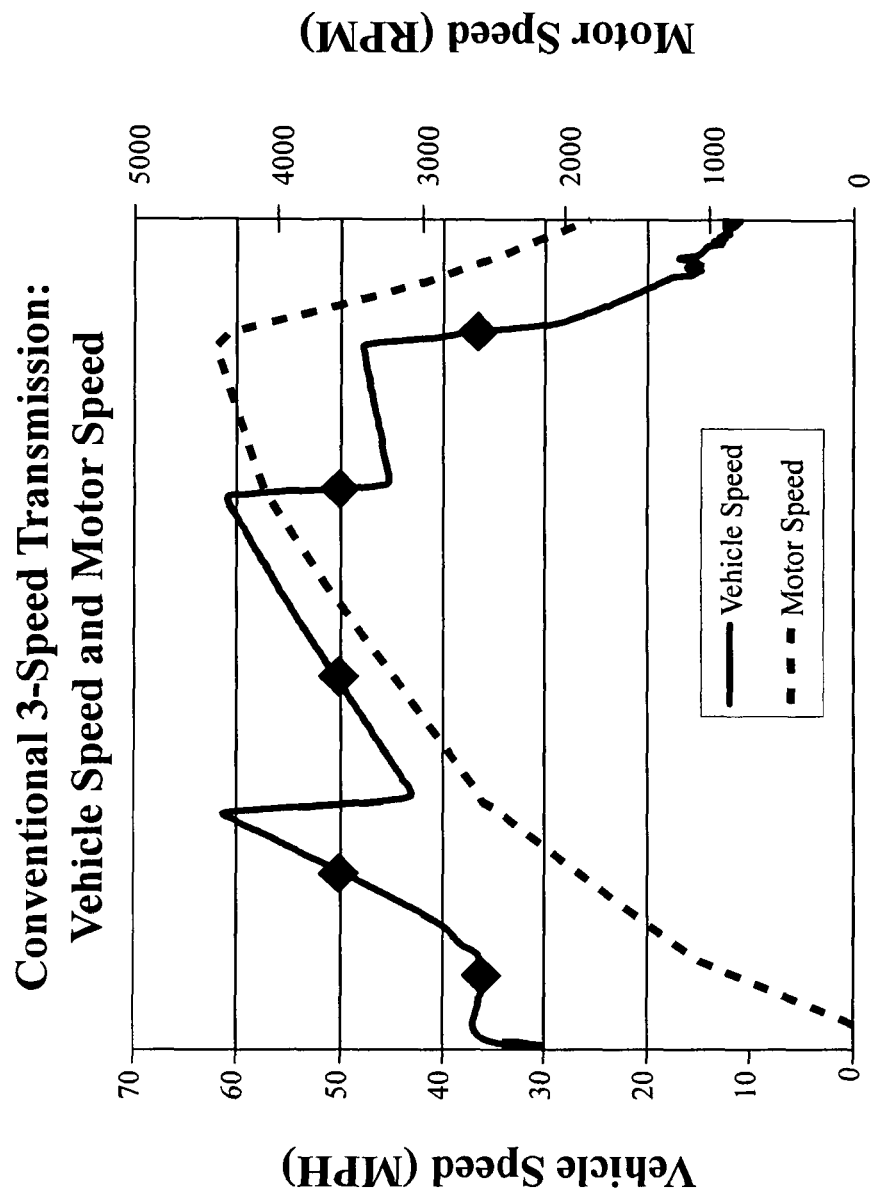
FIG. 9 is a chart showing a typical saw tooth vehicle acceleration that can be simulated by embodiments of the transmission and/or prime mover controllers disclosed here.

In a fixed ratio simulation mode ("stepped"), the control system 18 can control the CVT 14 to simulate the operation of a multispeed transmission. For example, during a wide open throttle acceleration, the controller 20 controls the speed ratio of the CVT 14 to a constant underdrive value, for example 2:1, and allows the speed of the drive motor 12 to accelerate through the operating range of the drive motor 12, for example from 500 rpm to 3500 rpm, as the vehicle accelerates. The controller 20 then quickly shifts the CVT 14, for example in less than 500 ms, to a higher speed ratio, for example 1.5:1 while simultaneously allowing the speed of the drive motor 12 to quickly drop back to a low speed, for example 500 rpm. Then the controller 20 repeats the same acceleration of the drive motor 12 and continues vehicle acceleration while holding constant the speed ratio of the CVT 14. The controller 20 can repeat this procedure for any number of speed ratios of the CVT 14, for example 5 or 6 settings. The mode of operation described by the fixed ratio simulation mode is similar to the "saw tooth" acceleration shown in FIG. 9.

In a hill climb mode, the performance of the vehicle while climbing a hill is maximized. In hill climb mode, the control system 18 controls the CVT 14 to a low speed ratio such that the drive motor 12 has a mechanical advantage as compared with a fixed ratio vehicle driveline. Additionally, the controller 20 can optimize the current draw to the drive motor 12 to manage the power delivered to the ground to optimize the ability of the vehicle to climb the hill.

In a manual mode, the control system 18 allows an operator to control manually the CVT 14. In manual mode, the user can use buttons, for example, on the user interface device 502 to increase or decrease the speed ratio of the CVT 14. In some embodiments, the operator can additionally select the mode (for example, economy, hill climb, etc.) using the user interface device 502.

In any of the modes described above, the top speed of the vehicle and the drive motor 12 can be controlled to any desired value within the full operating ratio range of the CVT 14 and the drive motor 12.

The operating modes described above can provide performance improvements of a vehicle equipped with the control system 18 and a CVT 14 versus a conventional fixed ratio drive system. FIG. 10 presents an example of observed performance differences and/or improvements.

Figure 11:
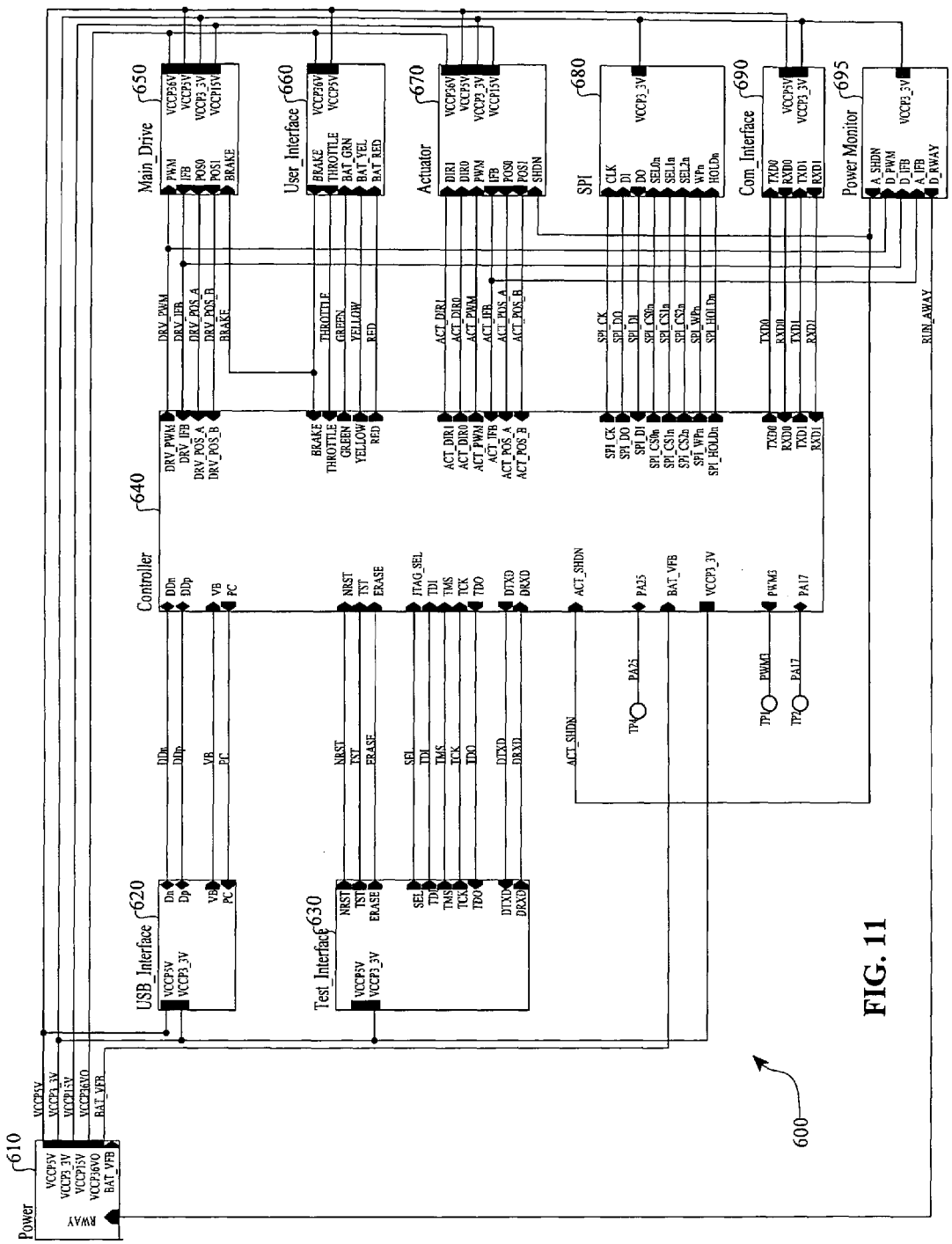
FIG. 11 is a schematic diagram of one embodiment of a transmission and/or prime mover control system according to inventive systems and methods disclosed here.

FIG. 11 shows a schematic diagram of one embodiment of a control system 600. The control system 600 can include several subsystems, such as a power control module 610, a USB Interface 620, a test interface 630, a controller 640, a main Drive 650, a user interface 660, an actuator control module 670, SPI 680, a com interface 690, and a power monitor 695.

Figure 12:
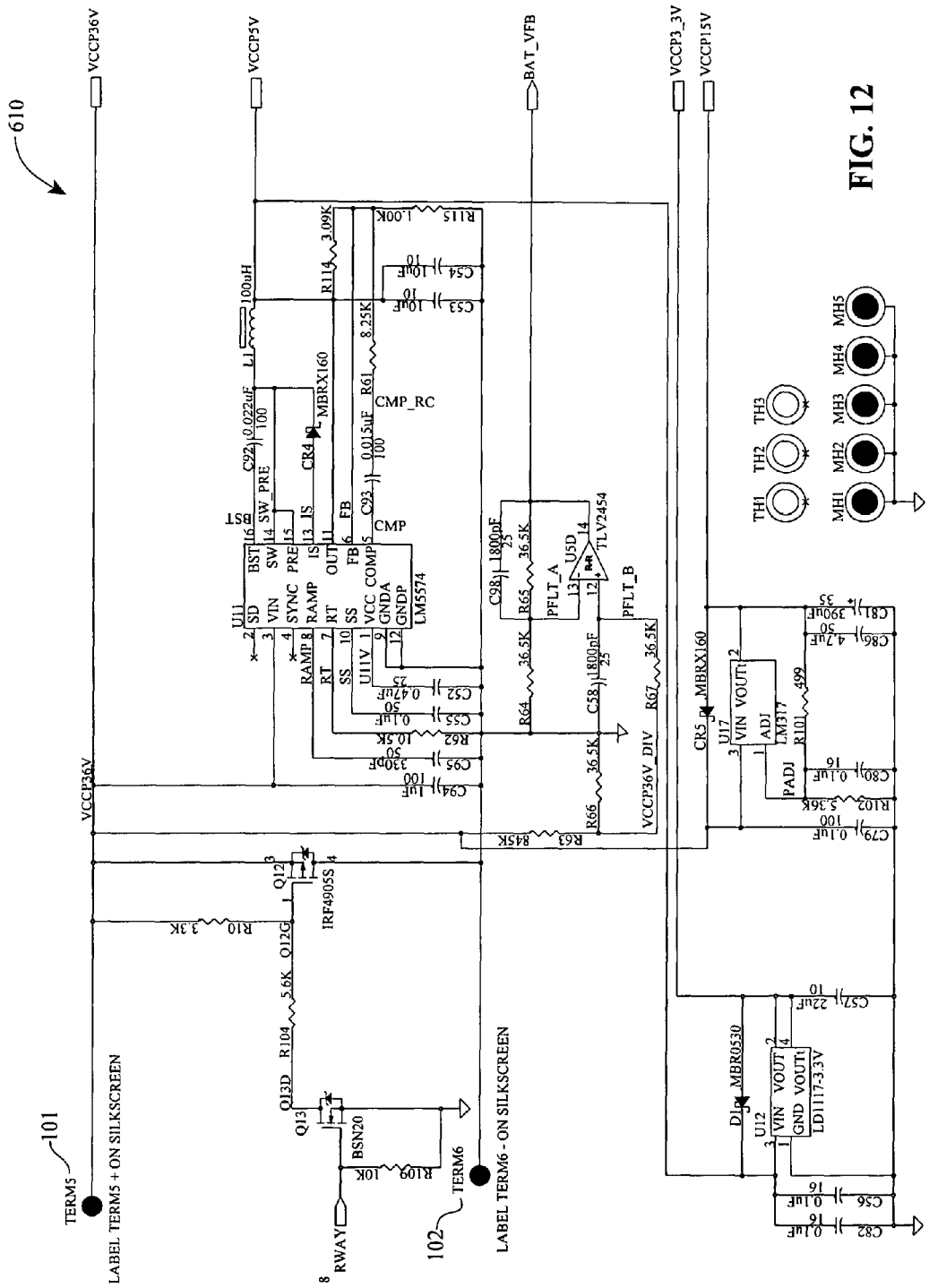
FIG. 12 is a schematic diagram of a power control module that can be used with the control system of FIG. 11.

FIG. 12 shows one embodiment of the power control module 610. The power control module 610 receives power from the battery 32 and incorporates voltage regulators and signal conditioners to regulate the output voltage into several distinct steady levels, possibly including for example 3 volt (V), 5V, 15V, 36V. The power control module 610 can provide an analog diagnostic signal of the battery voltage to the controller 640. In one embodiment, the power control module 610 includes two connections points TERM5 101 and TERM6 102, which represent the positive and negative lines coming from the 36V battery. In some embodiments, the power control module 10 has six built-in connection points that enable the power control module 610 to communicate with other subsystems on the control system 600. A connection VCCP3_3V supplies a steady 3.3V supply rail to the rest of the system. A connection VCCP5V supplies a 5V, VCCP15V supplies 15V, and VCCP36VO is the battery voltage supply rail to the entire system. BAT_VFB is an analog voltage signal that is sent to the controller 640 to monitor the voltage of the battery 32 during operation.

Figure 13:
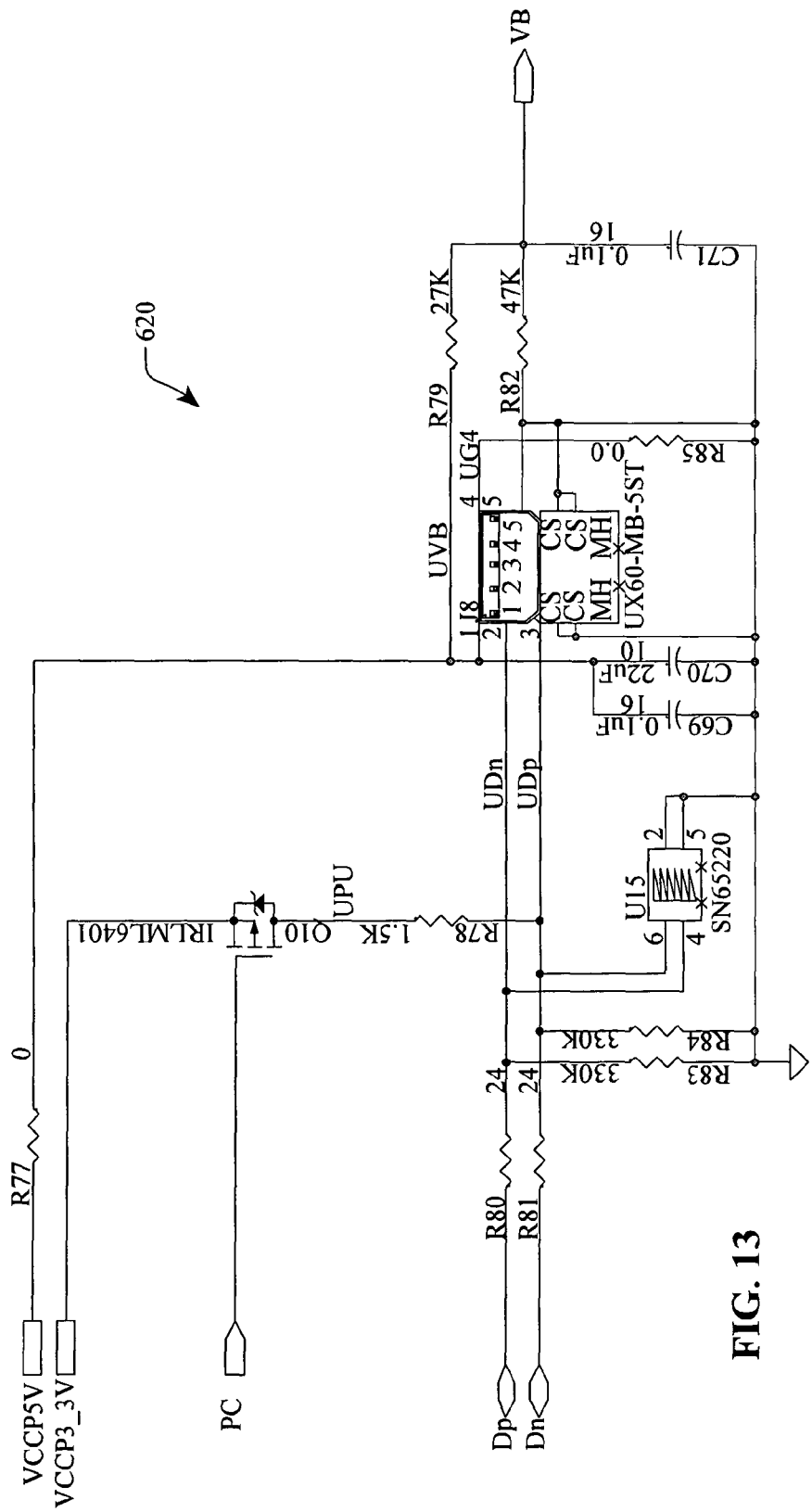
FIG. 13 is a schematic diagram of a universal serial bus interface that can be used with the control system of FIG. 11.

FIG. 13 shows a USB interface 620, which includes a Universal Serial Bus (USB) interface that allows a user to connect external programming or data acquisition hardware, for example a personal computer, to the control system 600 and specifically interface with hardware on the controller 640. In one embodiment, the USB interface 620 includes six connection points. The USB interface 620 is powered by VCCP5V and VCCP3_3V. The remaining four connections are common to a typical USB interface. The lines marked DDn and DDp are differential data pairs that enable the controller 640 to recognize the device connected to the USB port. The line marked VB is the 5V bus detector. The PC line is the pull up control.

Figure 14:
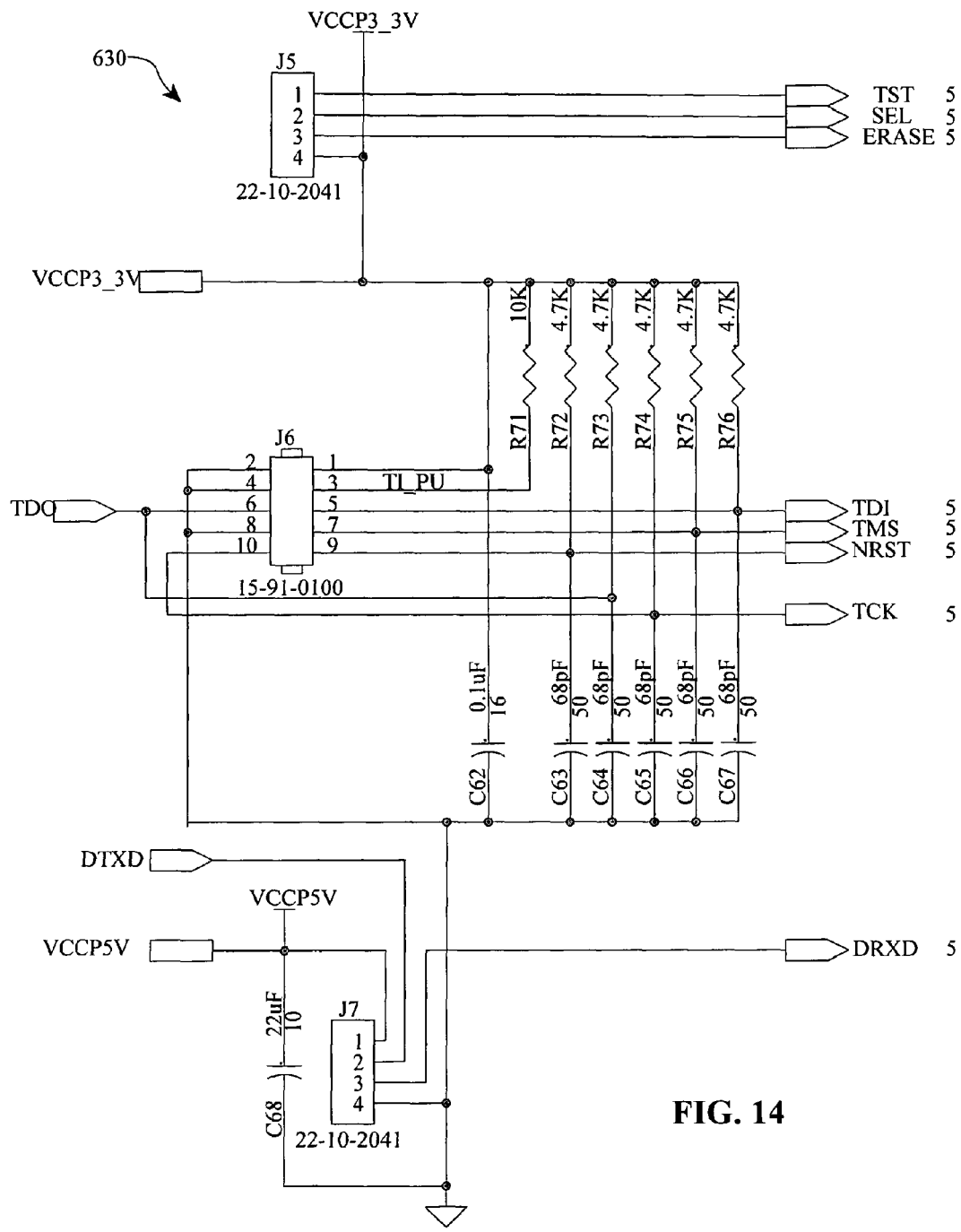
FIG. 14 is a schematic diagram of a test interface that can be used with the control system of FIG. 11.

FIG. 14 shows one embodiment of the test interface 630. Among other things, the test interface 630 allows developers to access the hardware on the control system 600 and, in particular, to access components built into the controller 640. The test interface 630 has specific test points built into the board to measure voltage and confirm operation of various components. In one embodiment, the test interface 630 functions as the port through which firmware is downloaded to the controller 640. The test interface 630 can contain a series of headers or connector pins so that a developer can connect external programming hardware, for example a computer.

In some embodiments, there are twelve connection points in the test interface 630. The test interface receives signals from the VCCP5V and the VCCP3_3V to power the subsystem for its communication with the controller 40. The test interface 30 can be adapted to communicate with the controller 640 through connections that are organized into industry standard functional groups. The lines labeled SEL, TDI, TMS, TCK, TDO, and NRST are part of an IEEE standard 1149.1 for Standard Test Access Port and Boundary-Scan Architecture for test access ports used for testing printed circuit boards. This standard is often referred to as JTAG, an acronym for Joint Test Action Group. The lines labeled TST and ERASE are used to put the controller 640 into different modes and erase the flash memory, respectively. The lines labeled DTXD and DRXD are part of a known connection type called a universal asynchronous receiver/transmitter (UART), which is computer hardware that translates data between parallel and serial interfaces. These connections are used for serial data telecommunications, a UART converts bytes of data to and from asynchronous start-stop bit streams represented as binary electrical impulses.

Figure 15:
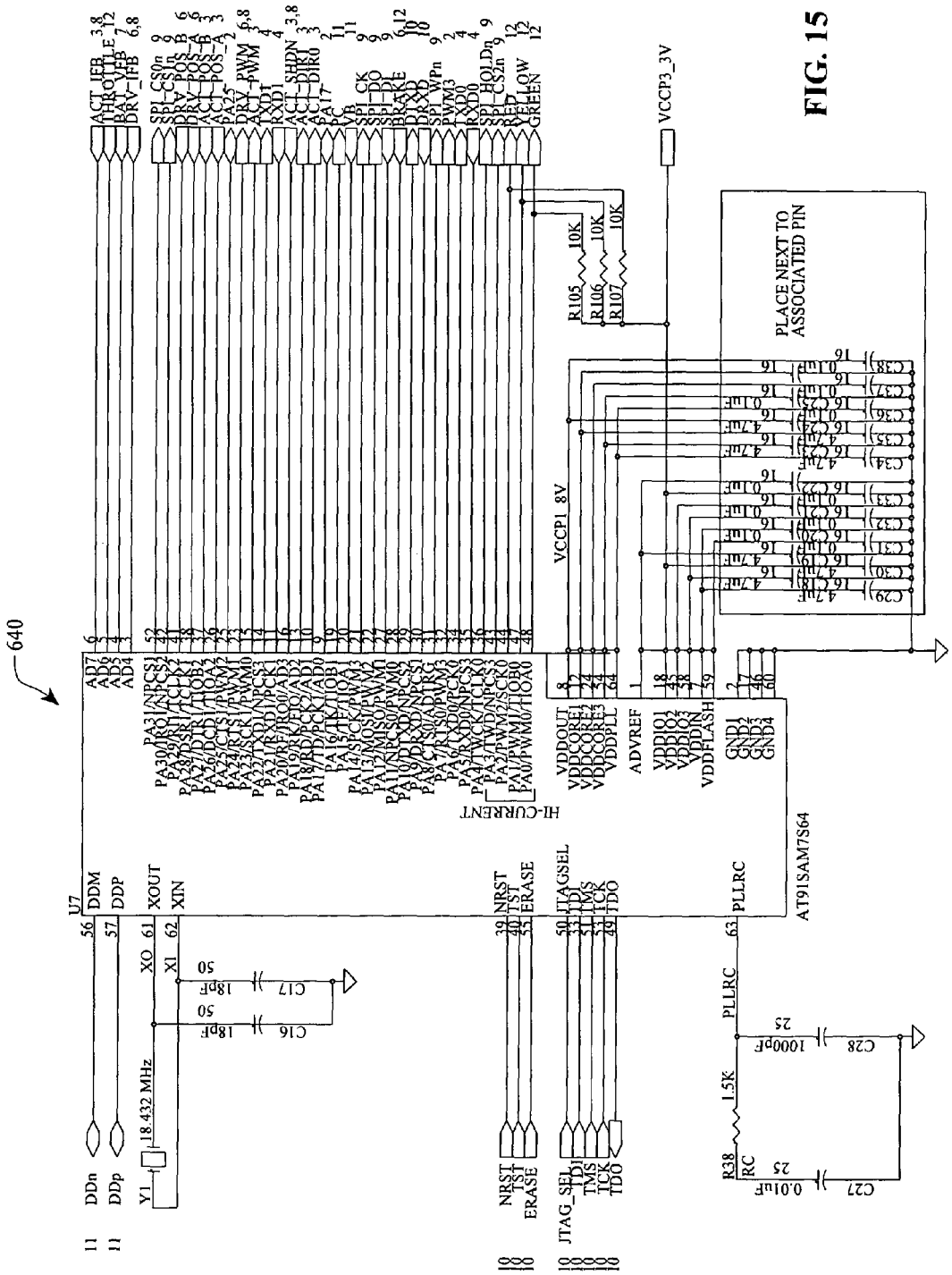
FIG. 15 is a schematic diagram of a controller that can be used with the control system of FIG. 11.

FIG. 15 shows one embodiment of the controller 640, which contains a microcontroller, firmware, random access memory, flash memory, and other hardware peripherals to allow communication between the controller 640 and other subsystems of the control system 600. The controller 640 holds a majority of the control processes for the controller 640, which is used to manage operations of the control system 600. Certain subsystems have several connections to communicate with the controller 640. These connections are described in correlation with the subsystems disclosed. In addition to those connections, there can be additional connection points or headers included in the board of the controller 640 for miscellaneous use. For example, referencing FIG. 11, there are three pins TP4, TP1, and TP2.

Figure 16:
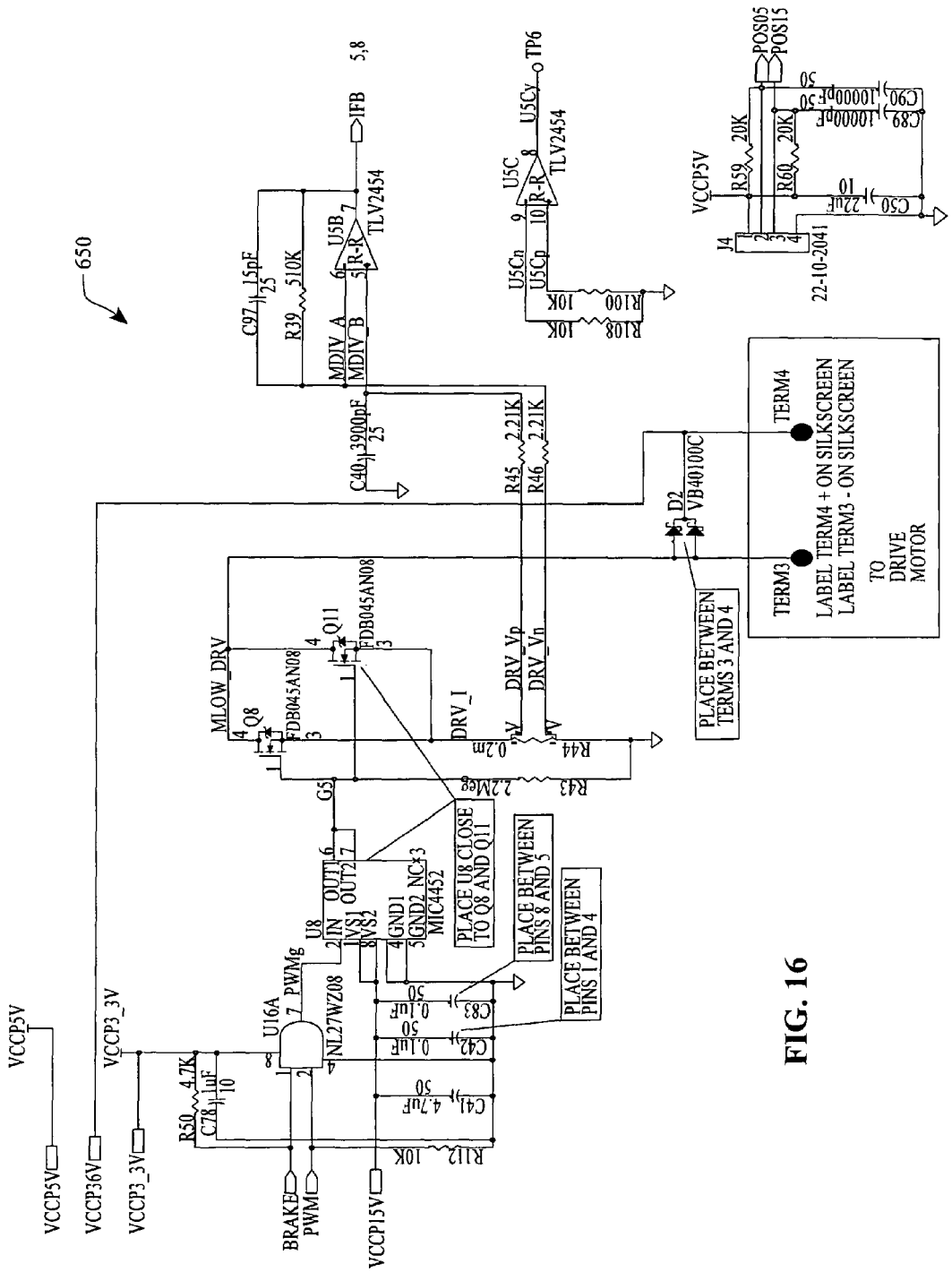
FIG. 16 is a schematic diagram of a main drive module that can be used with the control system of FIG. 11.

FIG. 16 illustrates one embodiment of the main drive 650. The main drive 650 can be adapted to control the drive motor 12. There are several power connections to the main drive 650, which utilizes power from the VCCP36V line that is connected directly to TERM4 on the drive motor 12. The DRV_PWM line represents a pulse width modulated current signal that the controller 640 generates to control the current that passes to the drive motor 12 and thus control the torque the drive motor 12 applies to the system 10. The BRAKE line delivers a signal from the brake detection switch that can be installed on the vehicle under the brake lever, for example, to detect when the operator engages the brake. If the brake is engaged, the BRAKE signal commands the main drive 650 to turn off to prevent damage to any component in the drivetrain or the control system 600.

VCCP5V, VCCP3_3V, VCCP 15V are lines for 5V, 3.3V and 15V supply voltages respectively. The DRV_IFB line is the motor current detection signal from the main drive 650. DRV_IFB is an analog signal read by the controller 640. The firmware loaded on the controller 640 uses the DRV_IFB signal as feed back to control the drive motor and protect against over-current conditions that may arise during normal operation. The lines DRV_POS_A and DRV_POS_B can be used to detect the direction of the drive motor 12. In some embodiments, DRV_POS_A can be used to measure speed of the drive motor and DRV_POS_B can be used to detect operating modes from the controller 640.

Figure 17:
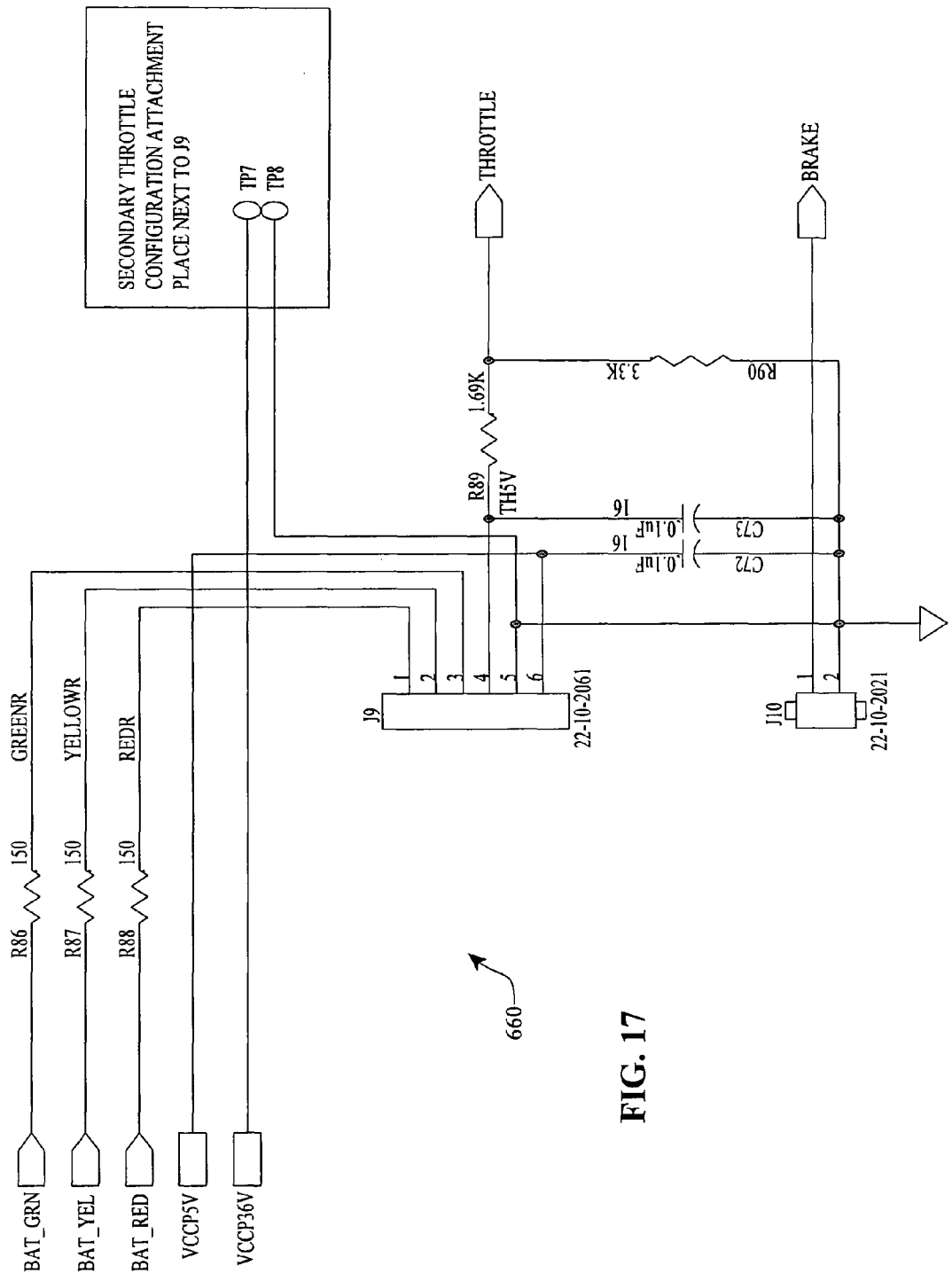
FIG. 17 is a schematic diagram of a user interface module that can be used with the control system of FIG. 11.

FIG. 17 shows one embodiment of a user interface module 660. The user interface module 660 represents the communication with hardware the operator uses to control the system 600. In some embodiments, the user interface 660 includes the Brake, Throttle and Battery Voltage feedback. The user interface 660 can receive signals from VCCP36V and VCCP5V.

Figure 18:
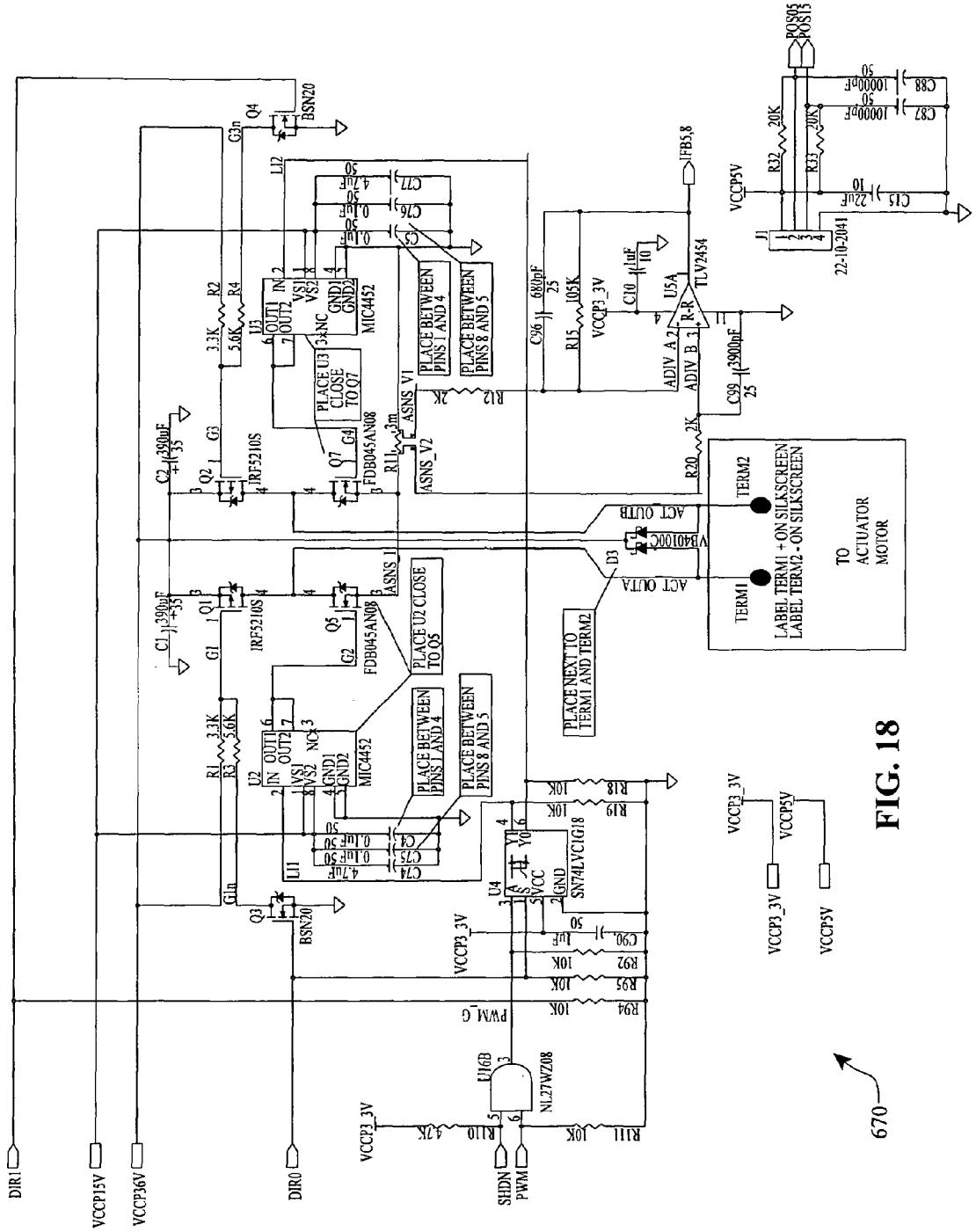
FIG. 18 is a schematic diagram of a shift actuator control module that can be used with the control system of FIG. 11.

FIG. 18 illustrates one embodiment of a shift actuator control 670. The shift actuator control 670 can be adapted to control the actuator motor 304 (for example, see FIG. 3) that adjusts the speed ratio of the CVT 14. The shift actuator control 670 is the physical interface to the actuator motor 304 and receives power from all of the regulated voltage lines. The shift actuator control 670 receives signals via ACT_DIR1 and ACT_DIR0 from the controller 640 that define the direction of rotation of the actuator motor 304. The shift actuator control 670 can receive a PWM signal from the controller 640 via ACT PWM that defines the electrical power and current level going to the actuator motor 304. Similarly, ACT IFB is a measurement signal indicating to the controller 640 the current amperage to the actuator motor 304. The controller 640 can include logic to limit and manage the current driving the actuator motor 304. The shift actuator control 670 can receive signals from an actuator position sensor 310, for example, and quadrature encoder or potentiometer and sends the signals to the controller 640 via ACT_POS_A and ACT_POS_B.

Figure 19:
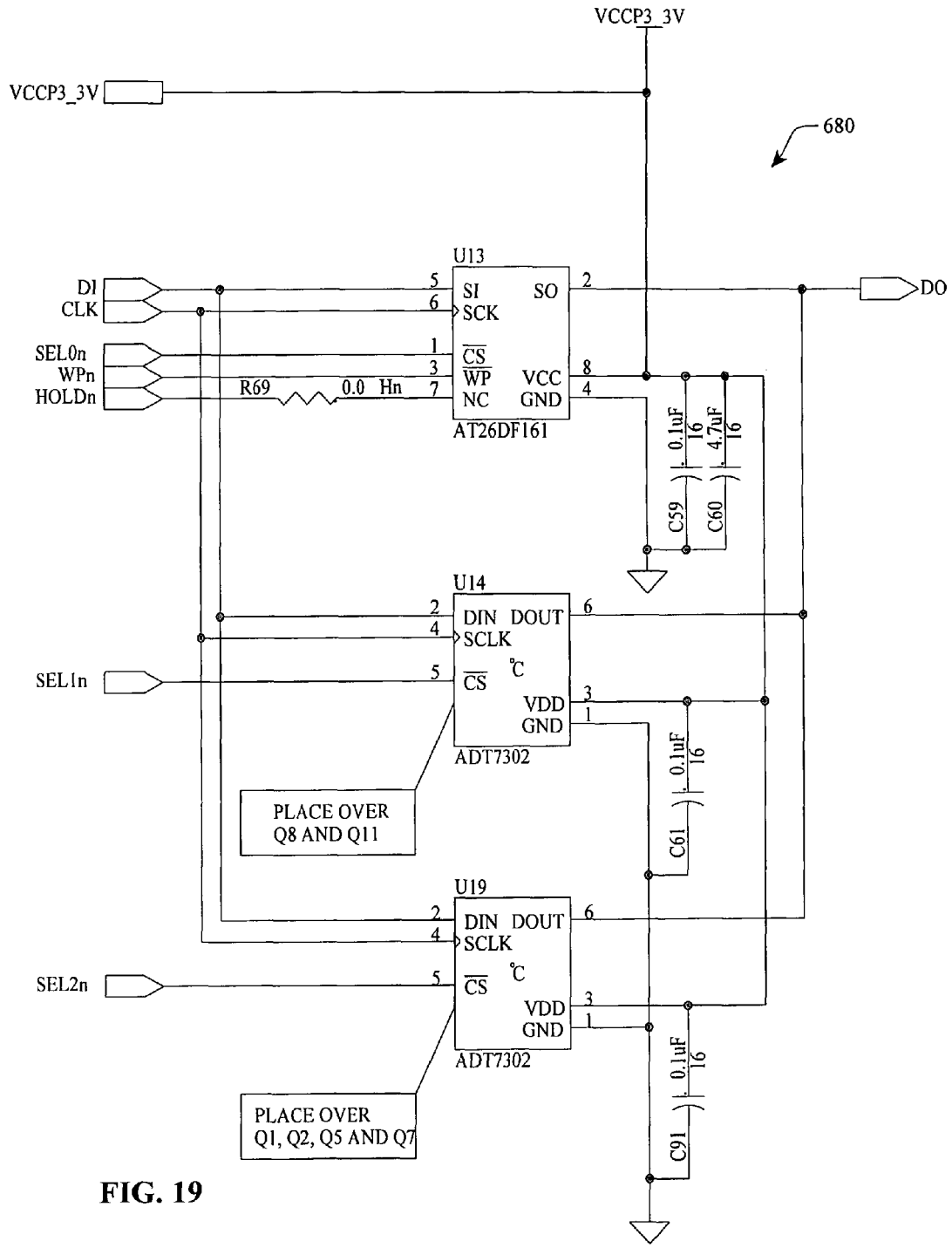
FIG. 19 is a schematic diagram of a serial peripheral interface that can be used with the control system of FIG. 11.

FIG. 19 shows the serial peripheral interface (SPI) 680. In one embodiment, the SPI 680 can be a standard synchronous serial data link that operates in full duplex mode. Devices communicate in master/slave mode where the master device initiates the data frame. Multiple slave devices are allowed with individual slave select (chip select) lines.

Figure 20:
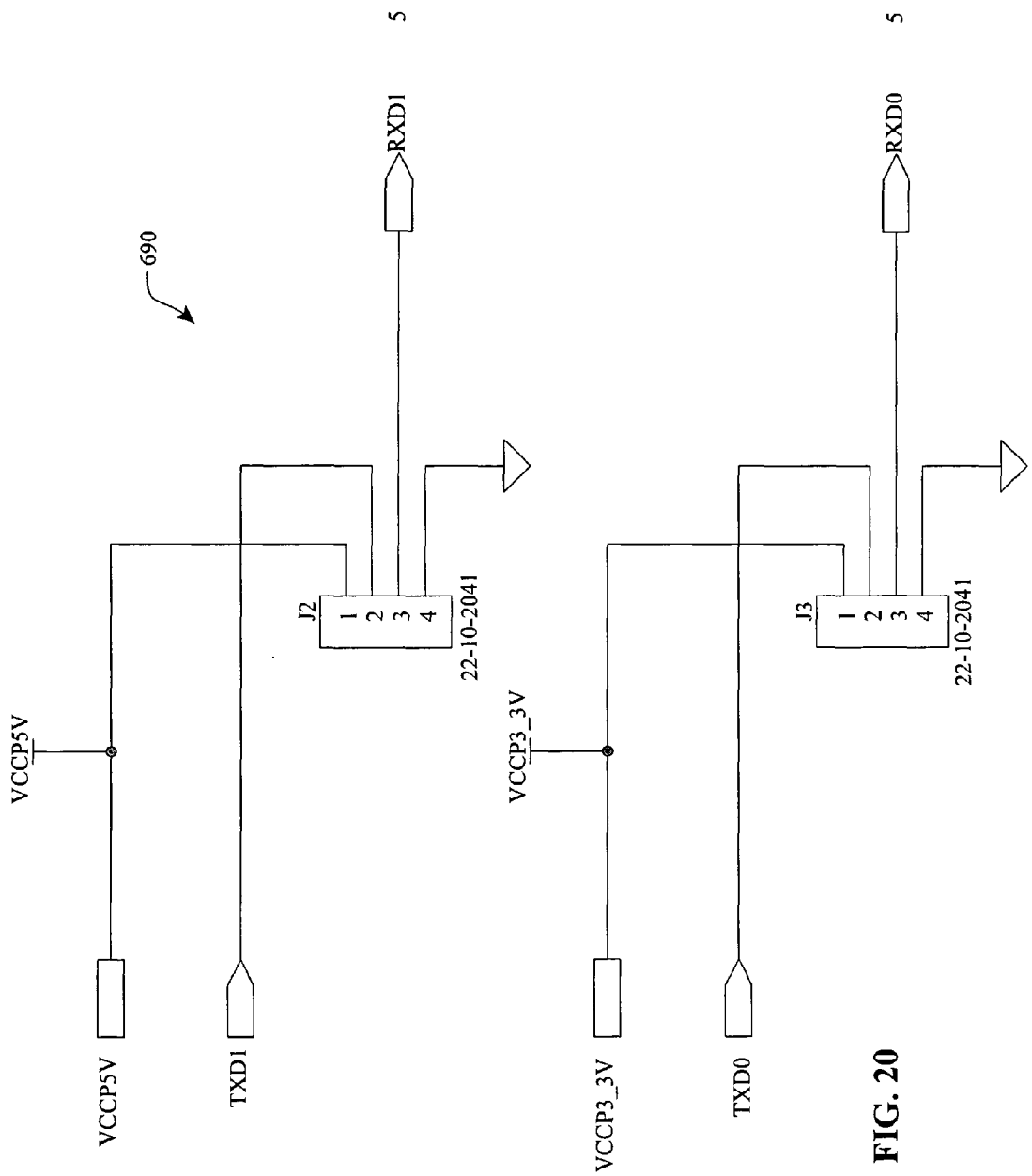
FIG. 20 is a schematic diagram of a com interface module that can be used with the control system of FIG. 11.

FIG. 20 illustrates one embodiment of the com interface 690, which is the physical interface for an interface module 502. The connectors shown in FIG. 11 are known transmitter/receiver pairs for communication with the interface module 502.

Figure 21:
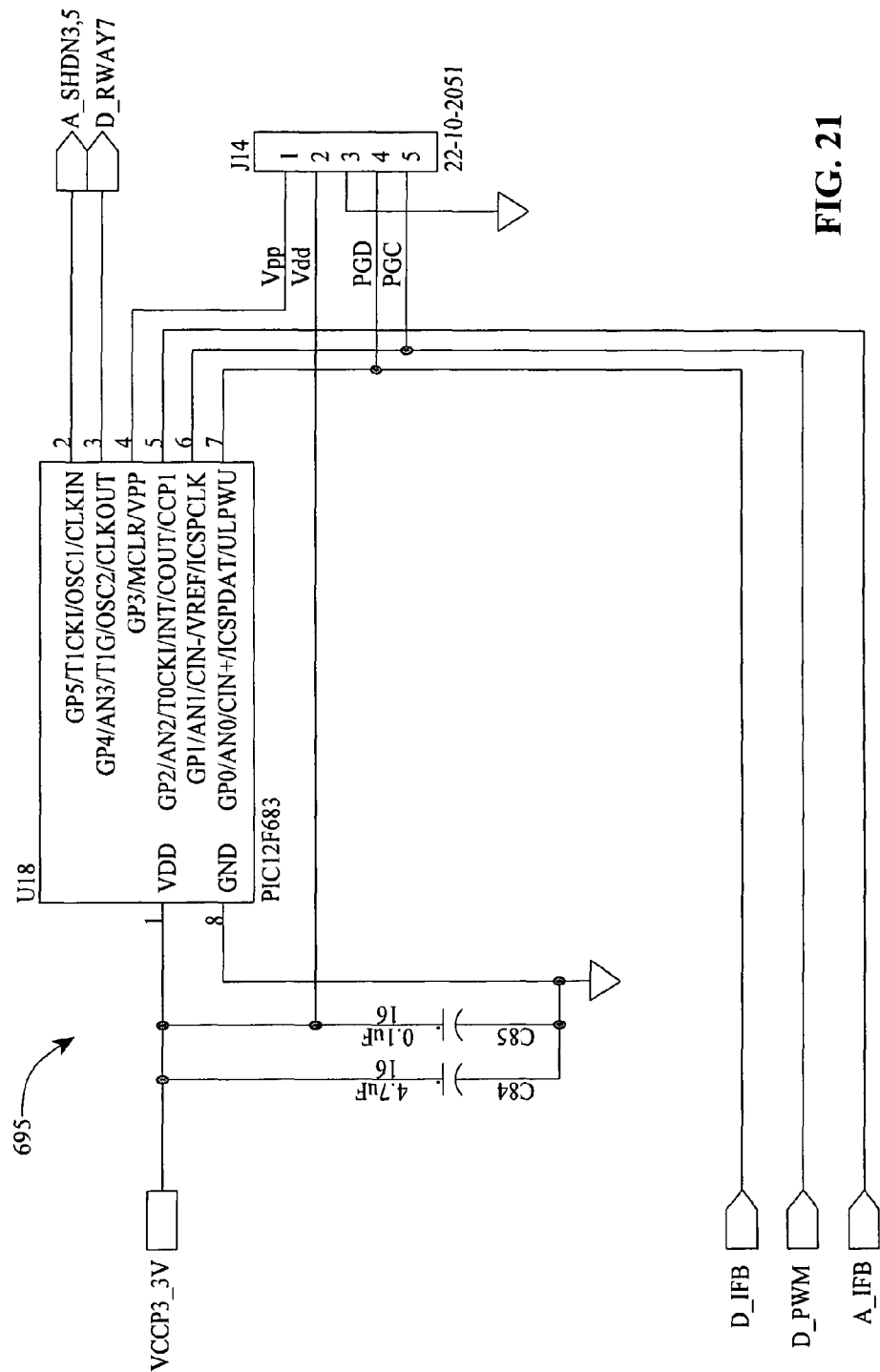
FIG. 21 is a schematic diagram of a power monitor module that can be used with the control system of FIG. 11.

FIG. 21 shows one embodiment of the power monitor 695, which monitors the operation of the system 600 and in the event of a loss of control or unexpected occurrence shuts down the system 600 by short circuiting the battery lines and blowing the fuse of the system 600. The shutdown command is sent via D_RWAY and RUN_AWAY. The power monitor 695 can include a second microcontroller that makes decisions based on the system operation. The power monitor 695 monitors actuator current, A_IFB, and will disable power to the actuator motor via A_SHDN if necessary. In one embodiment, the power monitor 695 monitors the PWM signal to the drive motor via D PWM. The power monitor 695 can receive a signal VCCP3_3V.

Figure 22:
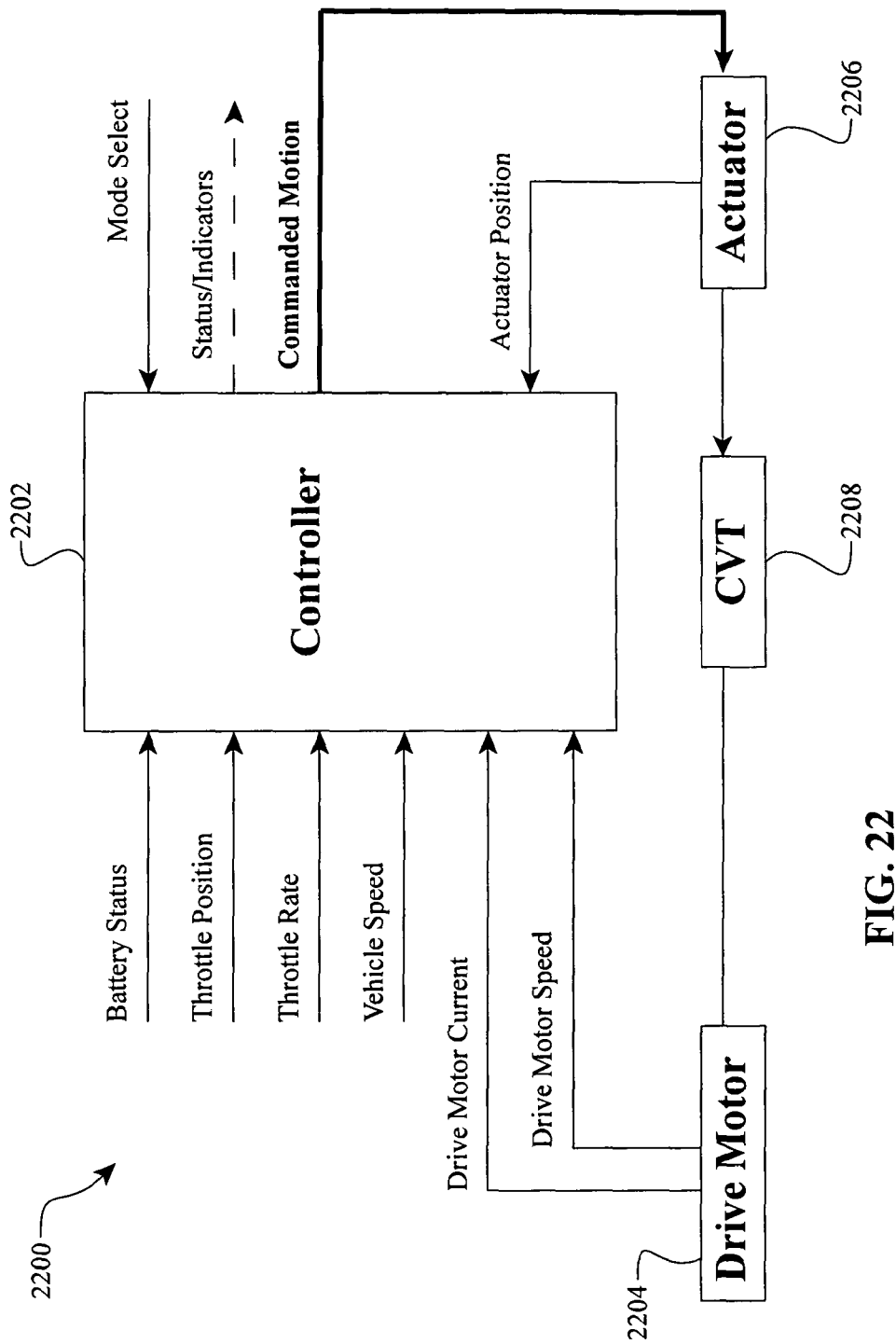
FIG. 22 is a block diagram of a control system that can be used with the drive system of FIG. 1.

Referencing FIG. 22, a control system 2200 can include a controller 2202 adapted to receive inputs such as battery status, throttle position, throttle rate, vehicle speed, current in a drive motor 2204, speed of the drive motor 2204, a mode selection, and a position of an actuator 2206 that adjusts a speed ratio of a CVT 2208. Based on at least some of these inputs, the controller 2202 commands a motion of the actuator 2206. The controller 2202 can be additionally adapted to provide status or other indicators to, for example, a user interface and/or to a data storage device.

Figure 23:
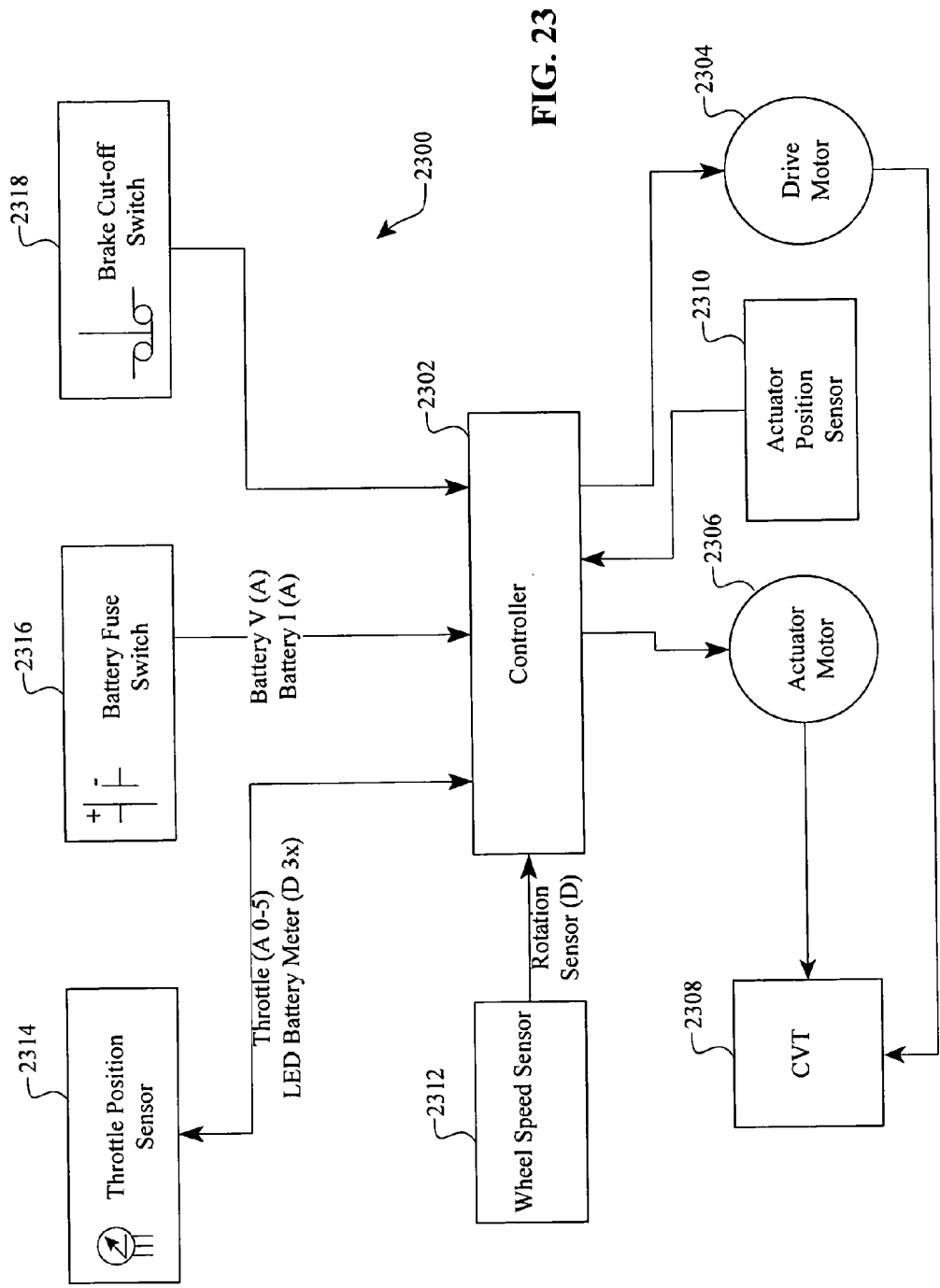
FIG. 23 is a block diagram of one embodiment of yet another control system that can be used with the drive system of FIG. 1.

Passing to FIG. 23 now, a control system 2300 can include a controller 2302 coupled to a drive motor 2304 and to an actuator motor 2306. In one embodiment, the drive motor 2304 couples to a CVT 2308, which couples to the actuator motor 2306. The controller 2302 can be adapted to receive signals from an actuator position sensor 2310 and/or a wheel speed sensor 2312. In some embodiments, the controller 2302 can be adapted to receive signals from a throttle position sensor 2314, a battery fuse switch 2316, and/or a brake cut-off switch 2318. Signals from the battery can include voltage and/or current signals indicating the status of the battery.

Figure 24:
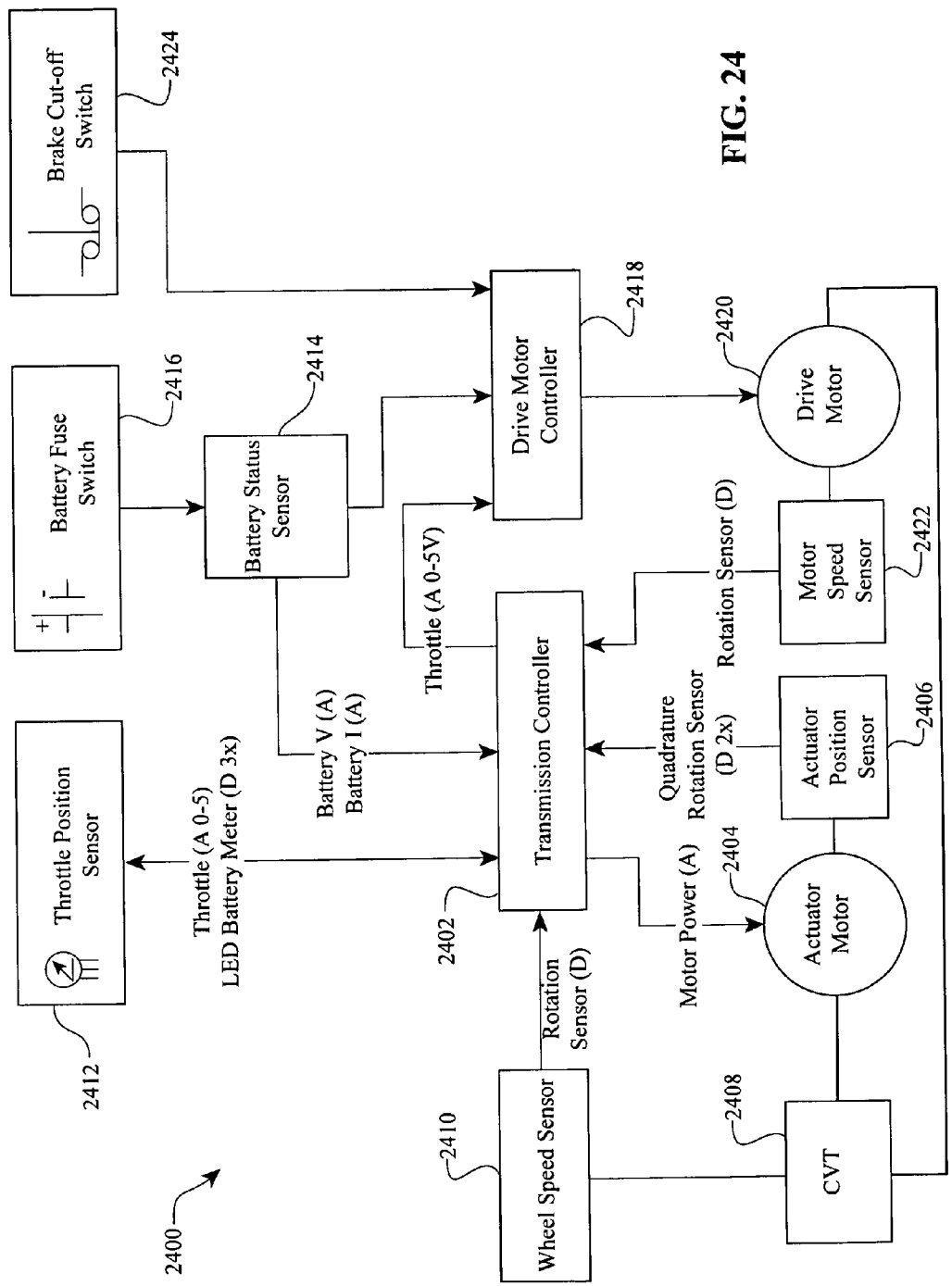
FIG. 24 is a block diagram of one embodiment of another control system that can be used with the drive system of FIG. 1.

Moving to FIG. 24 now, a control system 2400 can include a transmission controller 2402 coupled to a shift actuator motor 2404. The shift actuator motor couples to a CVT 2408. The transmission controller 2402 can provide commands and/or power to the shift actuator motor 2404. A shift actuator position sensor 2406 can be coupled to the shift actuator motor 2404 or to a component of the CVT 2408. In some embodiments, a wheel speed sensor 2410, which can be coupled to the CVT 2408, provides signals to the controller 2402. In one embodiment, the transmission controller 2402 receives signals from a throttle position sensor 2412 and/or a battery status sensor 2414, which couples to a battery or battery fuse switch 2416.

In some embodiments, the transmission controller 2402 cooperates with a drive motor controller 2418 that is coupled to a drive motor 2420. The CVT 2408 can be coupled to the drive motor 2420. In one embodiment, a motor speed sensor 2422, which can be coupled to the drive motor 2420, sends signals to the transmission controller 2402. A brake cut-off switch 2424 can be adapted to provide signals to the drive motor 2418. In one embodiment, the transmission controller 2402 provides a throttle signal to the drive motor controller 2418.

Thus, the control system 2400 can be configured such that a transmission controller 2402 is used for controlling the speed ratio of a CVT 2408, a drive motor controller 2418 is used for controlling a drive motor 2420, and the controllers 2402, 2418 are configured to cooperate in controlling a drive system, such as drive system 10 of FIG. 1.

Figure 25:
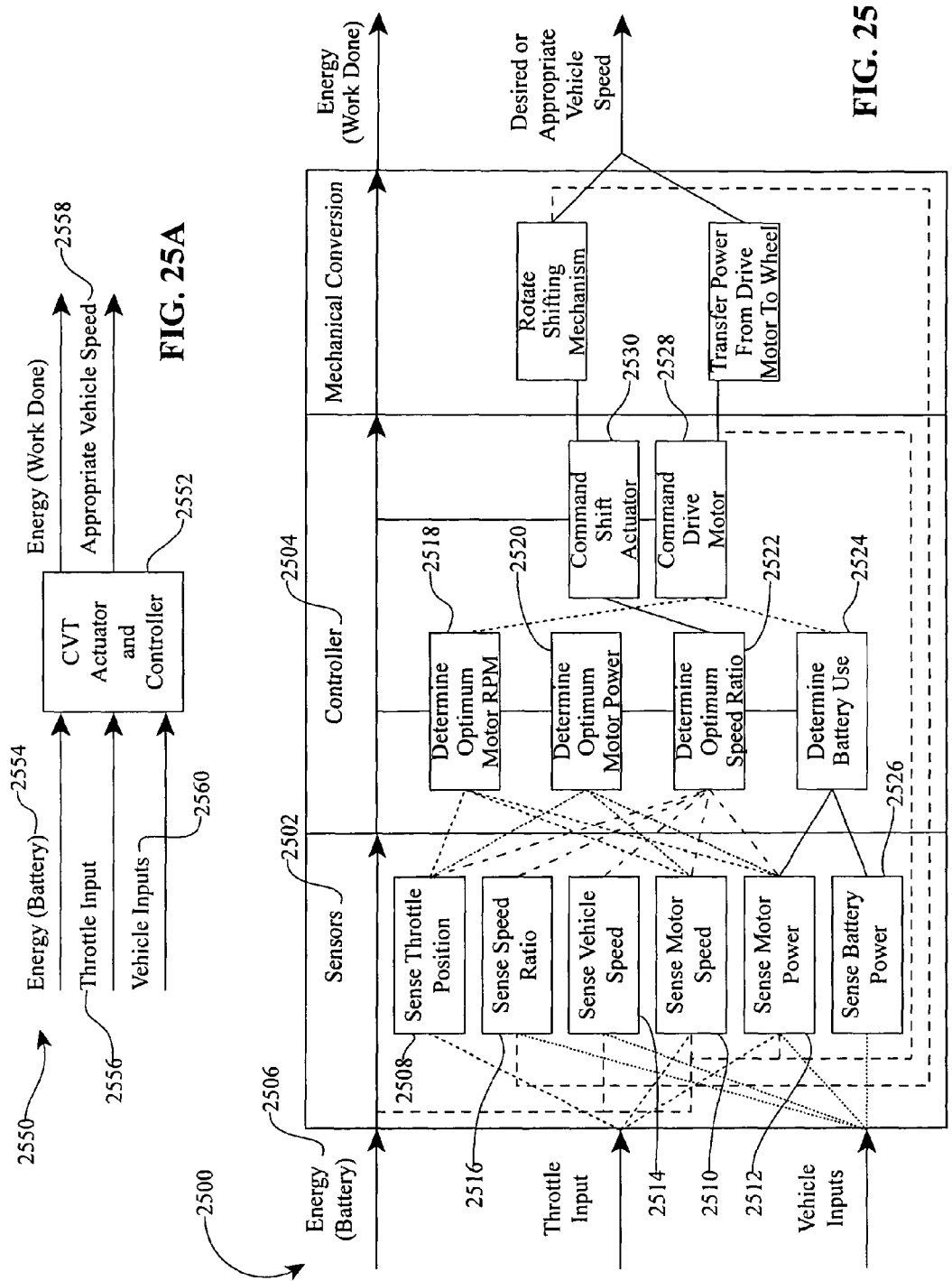
FIG. 25 is a block diagram of one embodiment of yet another control system that can be used with the drive system of FIG. 1.

Turning to FIG. 25 now, a control process and drive system 2500 can include sensors 2502 that provide signals to a controller 2504, which is adapted to control a shift actuator of a transmission and a drive motor. In one embodiment, energy is supplied to the system 2500 from battery 2506, and the energy is ultimately converted to a mechanical actuation of a shifter mechanism of the transmission, and powering a wheel of a vehicle via the drive motor, to provide an appropriate or desired vehicle speed.

In one embodiment, a throttle input is provided to a throttle position sensor 2508, a drive motor speed sensor 2510, and a motor power sensor 2512. Vehicle inputs can be received from the motor power sensor 2512, vehicle speed sensor 2514, and a speed ratio sensor 2516 of the transmission. Signals from the battery can be provided to the vehicle speed sensor 2514 and to the drive motor speed sensor 2510.

The controller 2504 can be configured to determine at a module 2518 an optimum drive motor speed (in rpm, for example) and/or at a module 2520 an optimum motor power based on one or more signals provided by the throttle position sensor 2508, drive motor speed sensor 2510, and/or the motor power sensor 2512. The controller 2504 can be configured to determine at a module 2522 an optimum transmission speed ratio based on at least some of the signals provided by the throttle position sensor 2508, the speed ratio sensor 2516, the vehicle speed sensor 2514, and/or the motor power sensor 2512. The module 2522 can also use results from the modules 2518 and 2520 to determine the optimum speed ratio for the transmission. In one embodiment, the controller 2504 includes a module 2524 for determining battery use based on signals received from the motor power sensor 2512 and/or a battery power sensor 2526.

In some embodiments, the controller 2504 includes a drive command module 2528 that receives signals from the optimum motor speed module 2518 and the battery use module 2524. The drive command module 2528 governs the transfer of power from the drive motor 12 to the wheel, for example, of a vehicle. The drive command module 2528 can also be configured to provide a feedback signal to the motor speed sensor 2510. The controller 2504 can also include a command shift actuator module 2530 adapted to govern the actuation of a shifting mechanism of a transmission based, at least in part, on results produced by the optimum speed ratio module 2522.

Referencing FIG. 25A, a drive and control system 2550 includes a CVT actuator and controller 2552, which is adapted to receive power from a source such as a battery 2554. The actuator and controller 2552 can establish an appropriate vehicle speed 2558 based on throttle input 2556 and vehicle inputs 2560.

Figure 26:
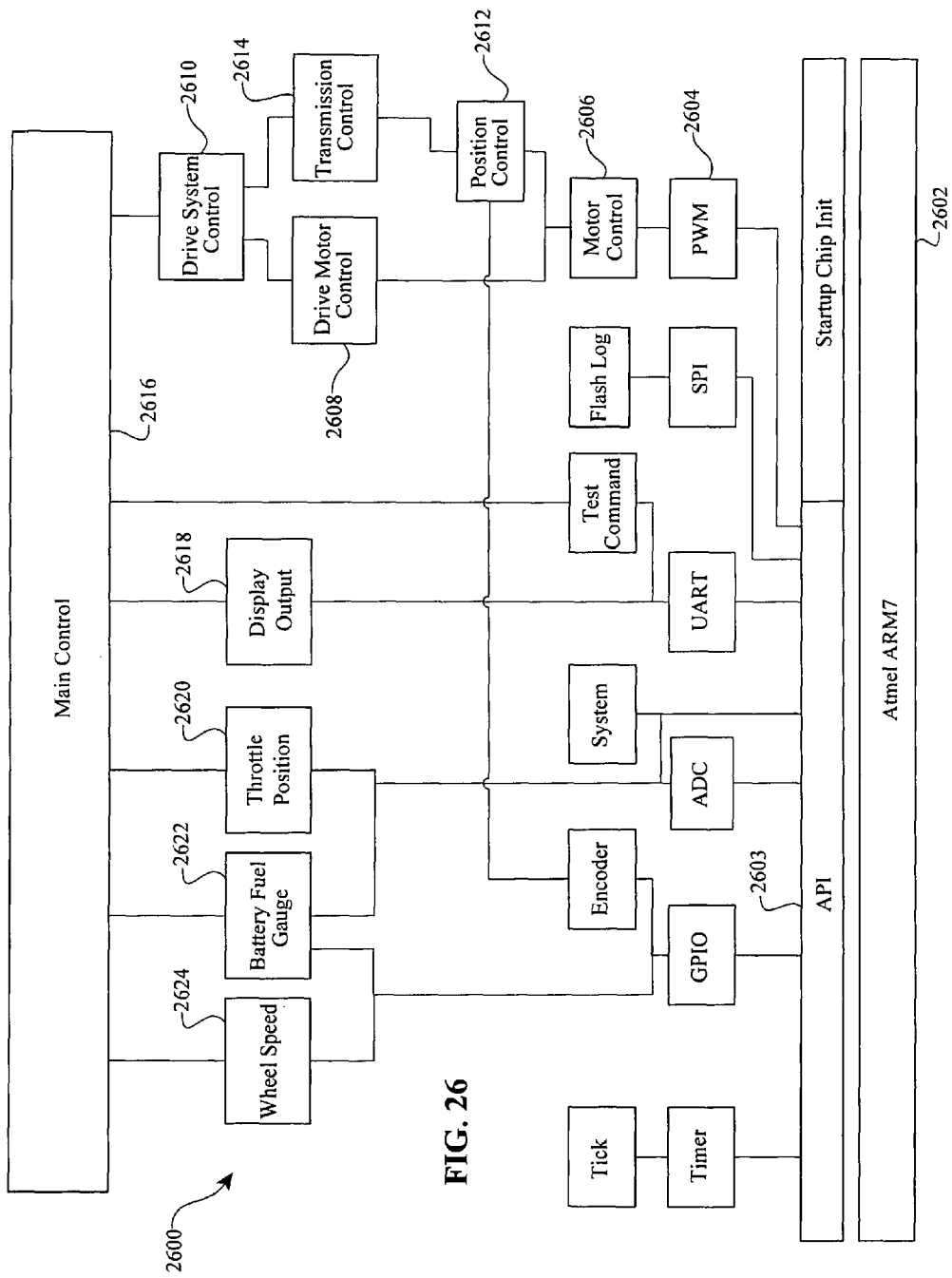
FIG. 26 is a block diagram of one embodiment of a yet another control system that can be used with the drive system of FIG. 1.

Passing to FIG. 26 now, a drive and transmission control system 2600 can include a microprocessor 2602, such as an Atmel ARM7 chip, that is adapted to cooperate with a number of software modules or processes. An application programmer interface 2603 is in communication with a pulse width modulation module 2604, which cooperates with a motor control module 2606. A drive motor control module 2608 is in communication with the motor control module 2606 and a drive system control module 2610. The motor control module 2606 communicates with a position control module 2612 that is in communication with a transmission control module 2614. A main control module 2616 is in communication with the drive system control module 2610, a display output module 2618, a throttle position module 2620, a battery fuel gauge module 2622, and/or a wheel speed module 2624.

Figure 27:
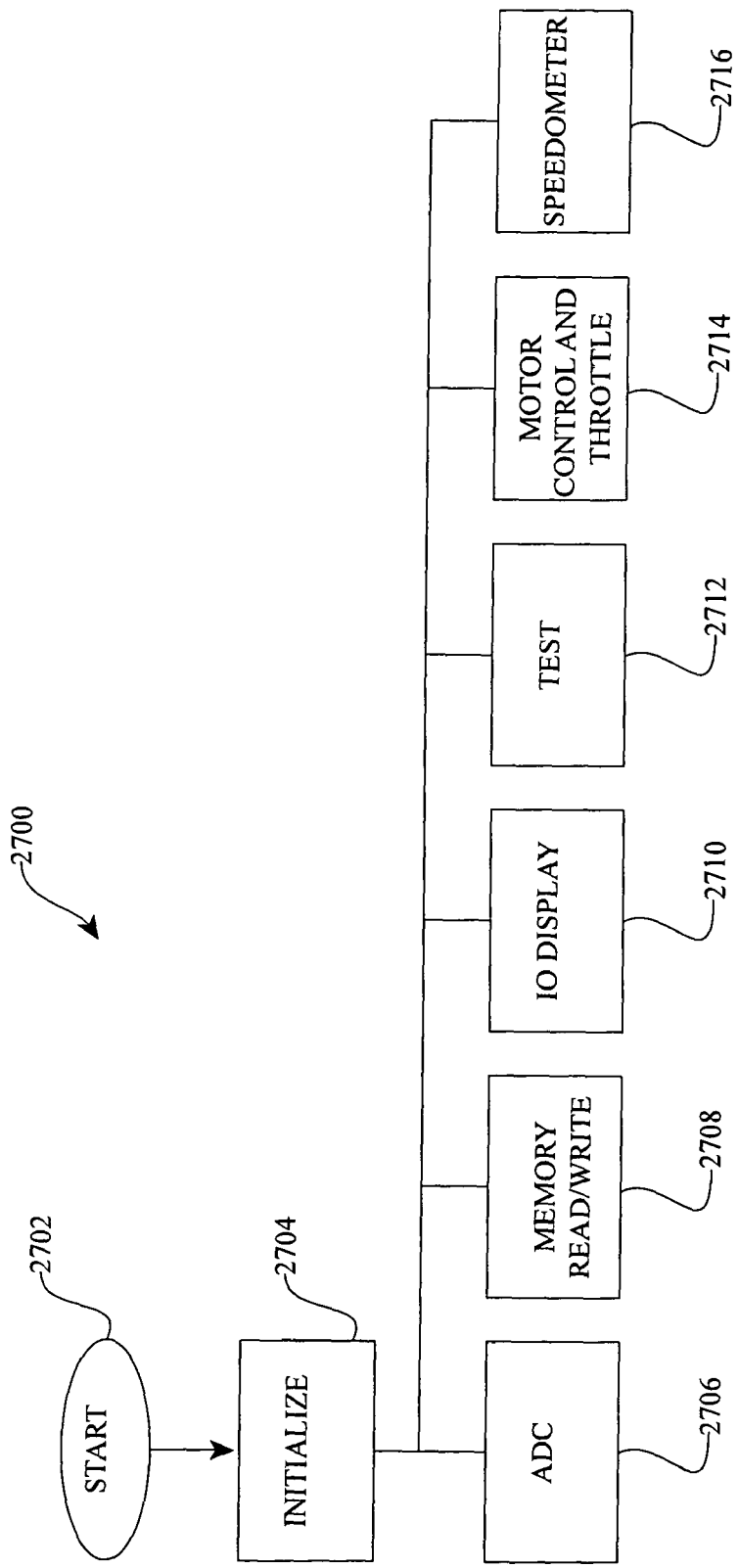
FIG. 27 is a flowchart describing one embodiment of a control process that can be used with the drive system of FIG. 1.

Turning to FIG. 27 now, a process 2700 of controlling a prime mover and/or a transmission is illustrated. The process 2700 starts at a state 2702. The process 2700 moves to a state 2704, wherein an initialization routine runs a number of processes. One process includes loading system parameters and defaults such as maximum vehicle speed, transmission shift limits, wheel pulse count, wheel size, etc.

The process 2700 then performs various subprocesses. The subprocesses includes an analog-to-digital converter subprocess 2706, a memory read/write subprocess 2708, a display IO subprocess 2710, a test subprocess 2712, a motor control and throttle subprocess 2714, and a road speed calculation subprocess 2716.

Figure 28:
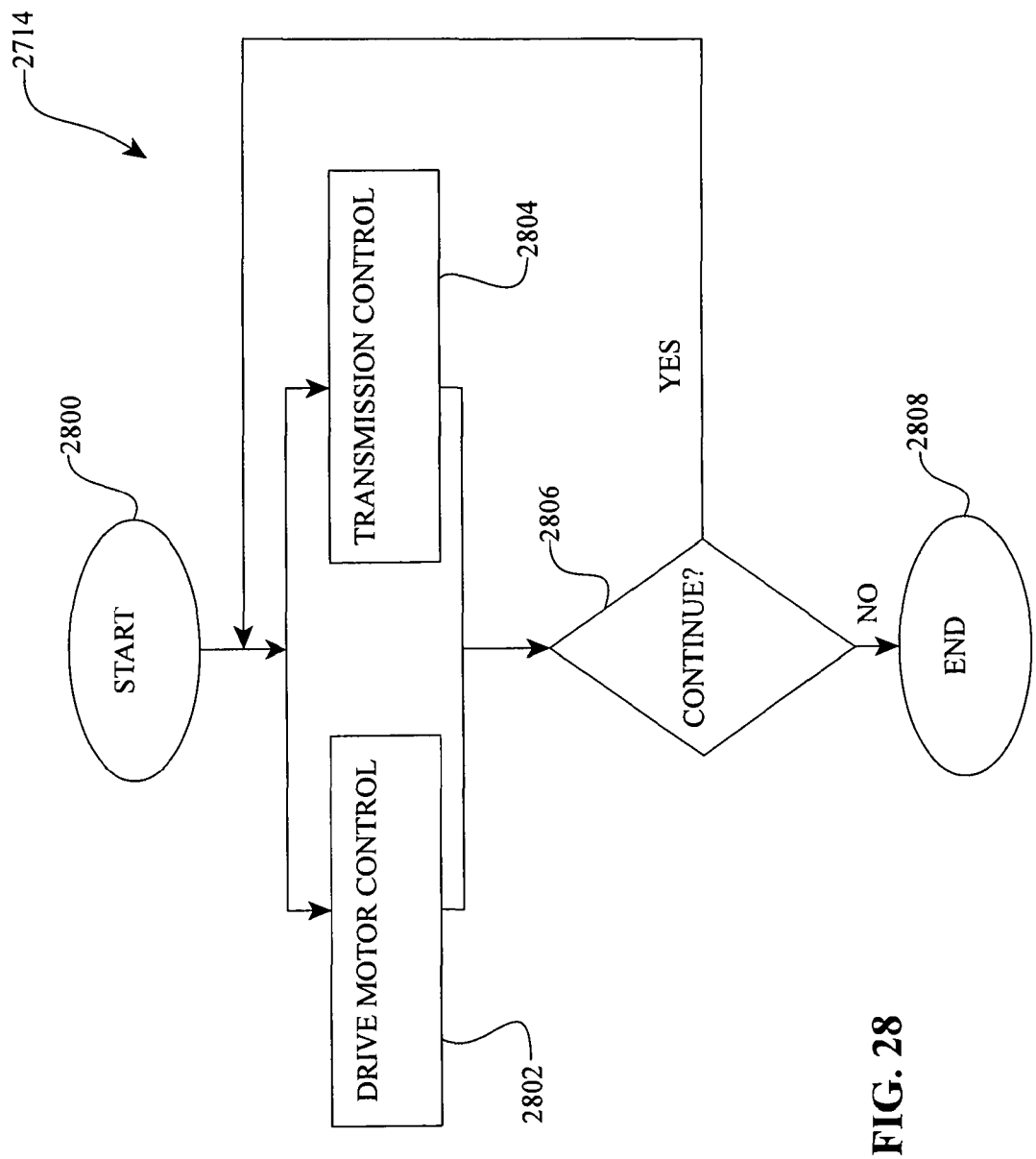
FIG. 28 is a flowchart of a transmission and/or prime mover control subprocess that can be used with the process of FIG. 27.

Referencing FIG. 28, the motor control and throttle subprocess 2714 can be configured as a loop that repeats every 5-milliseconds (200 Hz refresh), for example. In one embodiment, the motor control and throttle subprocess 1014 includes a drive control module 2802 and a transmission control module 2804. The drive control module 2802, in some embodiments, can be any suitable pulse width modulation motor control scheme. In one embodiment, the transmission control module 2804 includes a position control servo feedback loop. Hence, the motor control and throttle subprocess can provide drive motor control and actuator motor position control.

In some embodiments, the motor control and throttle subprocess 2714 starts at a state 2800. The process 2714 then substantially simultaneously executes the drive motor control module 2808 and the transmission control module 2804. At a decision state 2806, the subprocess 2714 determines whether the subprocess 2714 should continue to be executed in its loop. If the decision is to continue, the subprocess 2714 resumes execution of the modules 2802, 2804. If the decision is not to continue, the subprocess ends at a state 2808. In some instance, at the decision state 2806 it is determined not to continue the subprocess 2714 because, for example, an off signal or a brake signal has been issued by the system.

In one embodiment, the drive control module 2802 handles the vehicle speed demand and modulates the output of a drive motor. The drive control module 2802 can also incorporate a soft-start routine to minimize abrupt shocks on a vehicle during high speed demand (that is, fast throttle ON). In one embodiment, the drive control module 2802 accomplishes a soft start by regulating the maximum current that the drive motor can pull and by delaying the throttle signal value, eliminating an instant-on effect.

Figure 29:
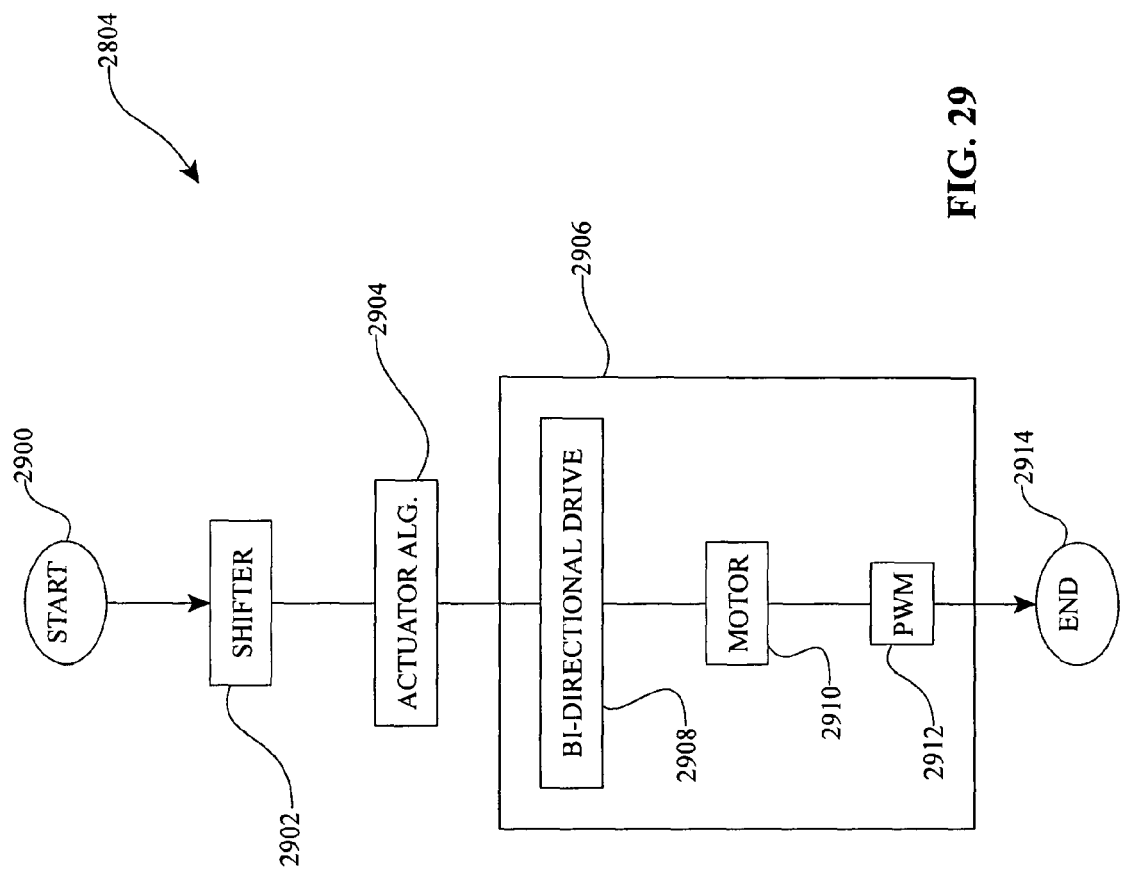
FIG. 29 is a flowchart of a transmission control subprocess that can be used with the subprocess of FIG. 28.
Figure 30:
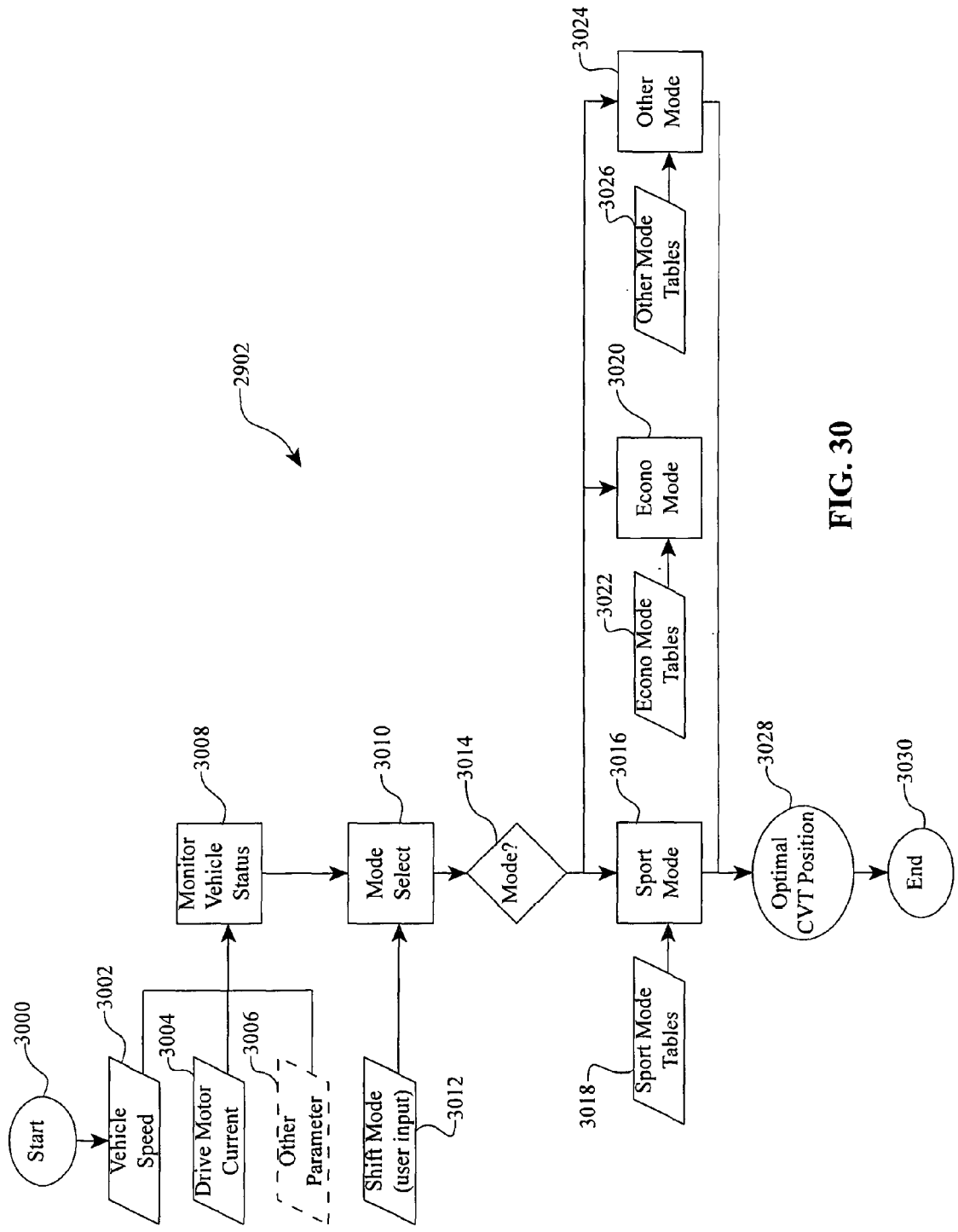
FIG. 30 is a flowchart of a subprocess for determining a speed ratio of a CVT, which subprocess can be used with the transmission control subprocess of FIG. 29.
Figure 31:
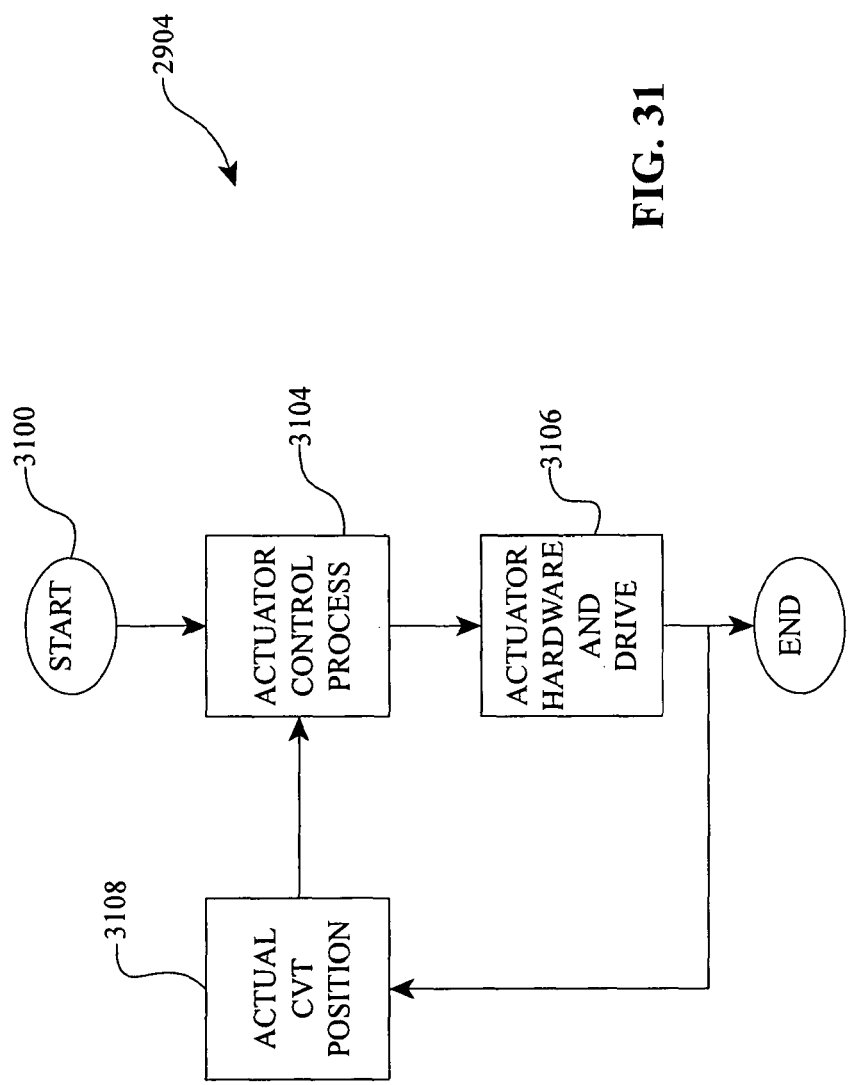
FIG. 31 is a flowchart of a subprocess for controlling a shift actuator of a CVT, which subprocess can be used with the transmission control subprocess of FIG. 29.

Referring to FIGS. 29-31, in some embodiments, the initialization of the transmission control module 2804 includes an actuator homing routine to position the transmission at a desired state (for example, the tilt angle of the traction rollers, or power adjusters, is put in an underdrive configuration) to begin a drive cycle. In one embodiment, the transmission control module 2804 on startup drives the shift actuator motor towards underdrive, while reading the position of a shift rod via counts from an encoder on a shaft of the actuator motor. When the reading stops changing (for example, when the actuator motor has rotated the shift rod until the internal shifter assembly runs up against a shift stop), an actuator control process 3104 stops driving the actuator motor and reads the initial shift position parameter from a shifter subprocess 2902. In one example, the actuator control process 3104 initially sets the transmission speed ratio to just above full underdrive (for example, 17 degrees gamma into underdrive; wherein, the full underdrive range goes to 18 degrees gamma into underdrive). In one embodiment, the actuator control process 3104 uses encoder counts as an indication of position. After actuator homing, the actuator control process 3104 continues with further operations.

The transmission control process 2804, which begins at a starting state 2900, determines a required transmission speed ratio (that is, the tilt angle of the traction planets) from a shifter process 2902 that handles the current state of inputs and from a lookup table with prescribed output values of speed ratio of the transmission. The transmission control process 2804 then passes the output set point to the actuator process 2904, which applies power, via an actuator motor drive module 2906, to the actuator motor until the set point is reached.

In one embodiment, the transmission control process 2804 receives a set of inputs to describe a state of the vehicle. In one embodiment, these inputs include vehicle speed, drive motor current, and other parameters that describe the state of the vehicle. In some embodiments, the mode of the controller is also determined. The mode can be selected manually via a toggle switch or a button. In some embodiments, the mode can be a performance (sport) mode or an economy mode. Yet in other embodiments, the mode can be a simulated 4-speed transmission "sawtooth" mode. The controller can store mode tables in a memory. A mode table is a set of data that includes input parameters (for example, vehicle speed, motor current, etc.) as well as a desirable speed ratio of the transmission as the output parameter. Input values can be used to reference a table and produce an output value. The output value is then passed over to the actuator process 2904.

The actuator process 2904 can be a proportional control feedback loop using the set point for the speed ratio of the transmission as an input, with the actuator shaft encoder as a feedback signal. The actuator motor drive module 2906 can include a bi-directional (reversing) routine 2908, a motor drive routine 2910, and a suitable pulse width modulation (PWM) routine 2912. The transmission control process 2804 then ends at a state 2914.

FIG. 30 depicts one embodiment of a shifter process 2902. The shifter process 2902 starts at state 3000. Vehicle speed 3002, drive motor current 3004, and/or other parameters 3006 are received in a monitor vehicle status module 3008. The shifter process 2902 then moves to a mode select state 3010, wherein a shift mode input 3012 can be received. The shifter process 2902, then proceeds to a decision state 3014, wherein the shifter process 2902 determines which shift mode to use. If the shift mode selected is the sport mode, at a state 3016 the shifter process 2902 takes as input the sport mode lookup tables 3018. If the shift mode selected is the economy mode, at a state 3020 the shifter process 2902 takes as input the economy mode lookup tables 3022. If the shift mode selected is another mode, at a state 3024 the shifter process 2902 takes as input the appropriate lookup tables 3026 for the selected mode.

Based on the vehicle status and the mode selected, the shifter process 2902 determines an optimal speed ratio for the CVT at a state 3028. In one embodiment, determining the optimal speed ratio for the CVT includes determining a position for a shift rod of the CVT. In some embodiments, determining the optimum speed ratio for the CVT includes determining a number of encoder counts for actuating a shifter mechanism of the CVT, which shifter mechanism can be a shift rod.

Referencing FIG. 31 now, an embodiment of the actuator process 2904 can start at a state 3100 and proceed to execute an actuator control process 3104. The actuator process 2904 then executes an actuator hardware and drive module 3106. The actuator process 2904 can then end, if an actual CVT position 3108 is substantially the same as the optimum CVT position determined by the shifter process 2902.

Figure 32:
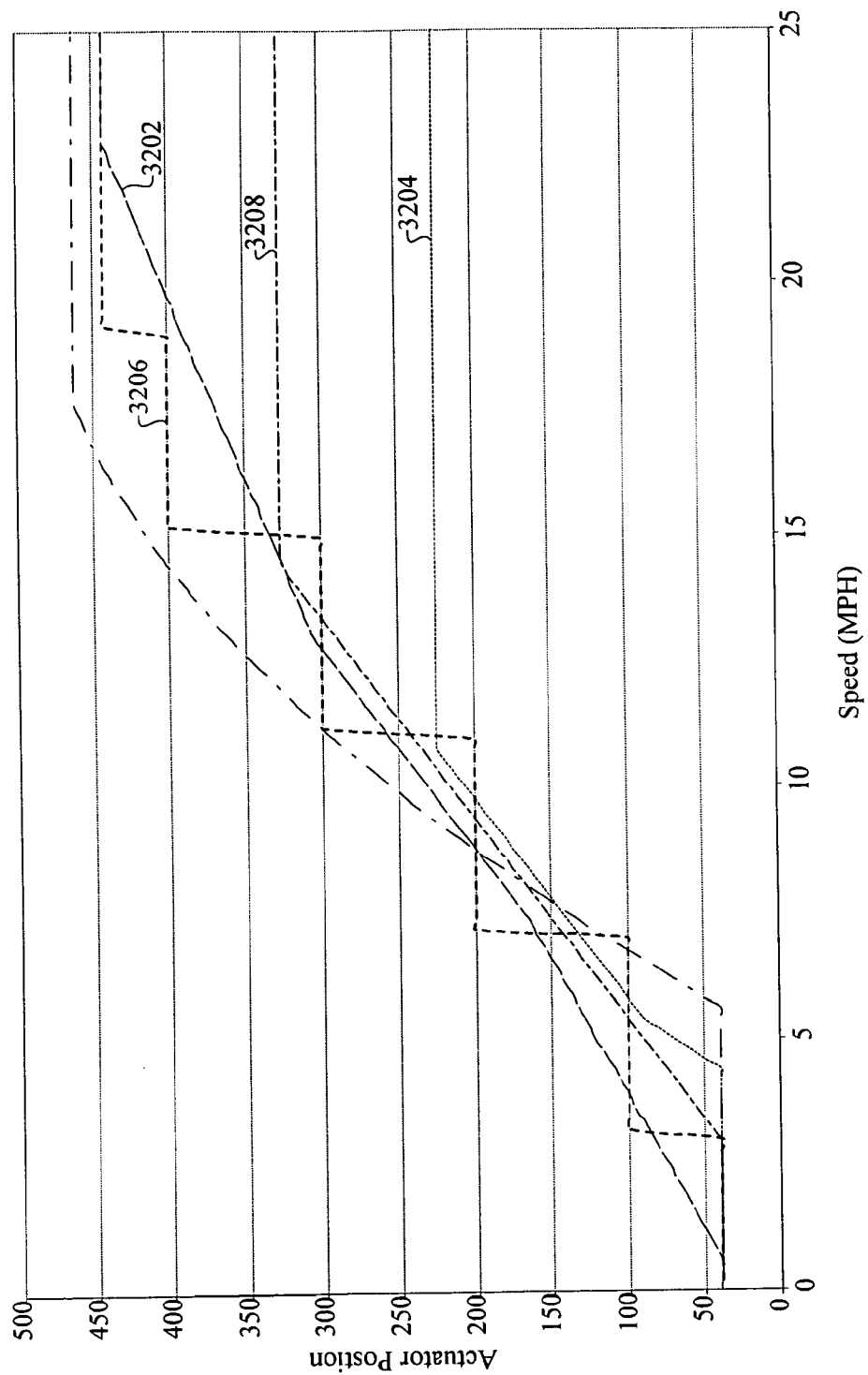
FIG. 32 is a chart representing a speed ratio of a CVT versus vehicle speed lookup table that can be used with the subprocess, of FIG. 30, for determining a speed ratio of a CVT.

Passing to FIG. 32 now, a lookup table that can be used by the shifter process 2902 can be exemplified by each of the curves graphed on the chart shown. Depending on the speed of the vehicle, a speed ratio of the transmission is selected (which is equivalently to selecting a position of a shifting mechanism of the transmission, such a position of a shift rod; the position can be expressed in terms of encoder counts). A curve 3202 represents a lookup table for a "drag race" or fast acceleration mode. A curve 3204 represents a lookup table for an economy ("econ") mode. A curve 3206 represents a lookup table for a fixed ratio simulation (or "stepped") mode. A curve 3208 represent a lookup table for a performance (or "hill climb") mode. FIG. 33 is a data table used to derive the chart of FIG. 32. MPH refers to vehicle speed; RPM refers to drive motor speed; GR refers to speed ratio of a CVT. Act Pos refers to the position of the shift rod in encoder counts.

In one embodiment, a method of controlling a drivetrain of an EV provides for an economy mode and a performance mode. In economy mode, the control system is configured to control the drive motor in the following manner. The control system allows the current to the drive motor to have an initial maximum current peak (that is, current limit), for example 30-Amps. This initial maximum current peak can be held for a predetermined amount of time (for example 2-seconds), which amount of time, in some cases, is preferably sufficient to allow the drive motor to achieve its base speed, said base sped being the drive motor speed above which the motor produces constant power at increasing drive motor speed and decreasing drive motor torque, where the drive motor typically operates at higher efficiency that at lower drive motor speeds. Thereafter, the control system manages current to the drive motor such that current is delivered to the drive motor only up to a predetermined current limit (for example, 25-Amps), which can be sustained as long as required by, for example, throttle command (or user input). In some embodiments, the power (or current) supplied to the electric drive motor is a function of throttle position and battery voltage. In economy mode, the control system is configured to control the CVT in a fashion that allows the electric motor to arrive at its base speed as quickly as possible, and then the control system controls the CVT to maintain the CVT at a transmission speed ratio of peak efficiency for the given operating conditions (for example, in certain CVTs the peak efficiency is found at a transmission speed ratio of 1:1).

In performance mode, the control system is configured to allow the drive motor to achieve a predetermined initial maximum current limit (for example, 60-Amps). This initial maximum current limit can be sustained for a predetermined amount of time (for example, 5-seconds), which can be determined, at least in part, by considerations of circuitry temperature specifications, circuitry life cycle, etc. Under this control strategy, the EV drivetrain is provided with high power at vehicle launch. The control system then controls the CVT in a manner to produce high acceleration and achieve the maximum speed of the EV in a short period. The control system, in performance mode, can be configured so that after the initial maximum current limit has been provided, the drivetrain can be provided with up to a predetermined maximum current limit (for example, 45-Amps).

In some embodiments, in either or both of the performance and economy modes, the control system can be provided with a timed linear ramp to maximum throttle function, which can be used to ensure that the EV launches smoothly, rather than abruptly and to the point that it can tend to lift the front of the EV off the ground. The timed linear ramp to maximum throttle function can also be used to manage power delivery to the drive motor under various operating conditions (for example, reducing current draw during operation in economy mode).

In one embodiment, the control system is configured to optimize the overall efficiency of the drivetrain of the EV. The drivetrain overall efficiency is a function of the efficiency of the drive motor, the efficiency of the CVT, the efficiency of the control system itself, and/or an indication of how battery life is affected at certain operating conditions. Hence, in some embodiments, the control system is configured to modulate power (or current) to the electric motor and to modulate the transmission speed ratio of the CVT (preferably in conjunction with the power modulation) based upon certain inputs, which can include one or more of the following: throttle position, throttle position rate of change (with respect to time), control system mode (for example, economy, performance, manual, simulation of stepped transmission, etc.), average or instantaneous battery voltage, average or instantaneous state of charge of the battery, data indicative of battery life versus current draw over time, average or instantaneous drive motor current draw, average or instantaneous speed of the vehicle, transmission speed ratio of the CVT, data indicative of the efficiency of the CVT versus speed of the EV and/or transmission speed ratio, speed of the drive motor, data indicative of the efficiency of the drive motor versus torque and/or speed of the drive motor, and efficiency of the control system (such as data indicative of power use by the control circuitry for the shift actuator and/or the drive motor). In certain embodiments, the control system is configured to control the transmission speed ratio of the CVT as a function of one or more of the speed of the EV, speed of the electric drive motor, battery voltage, and current draw (that is current provided to the drive motor, which can in some cases be based on throttle position).

Figure 34:
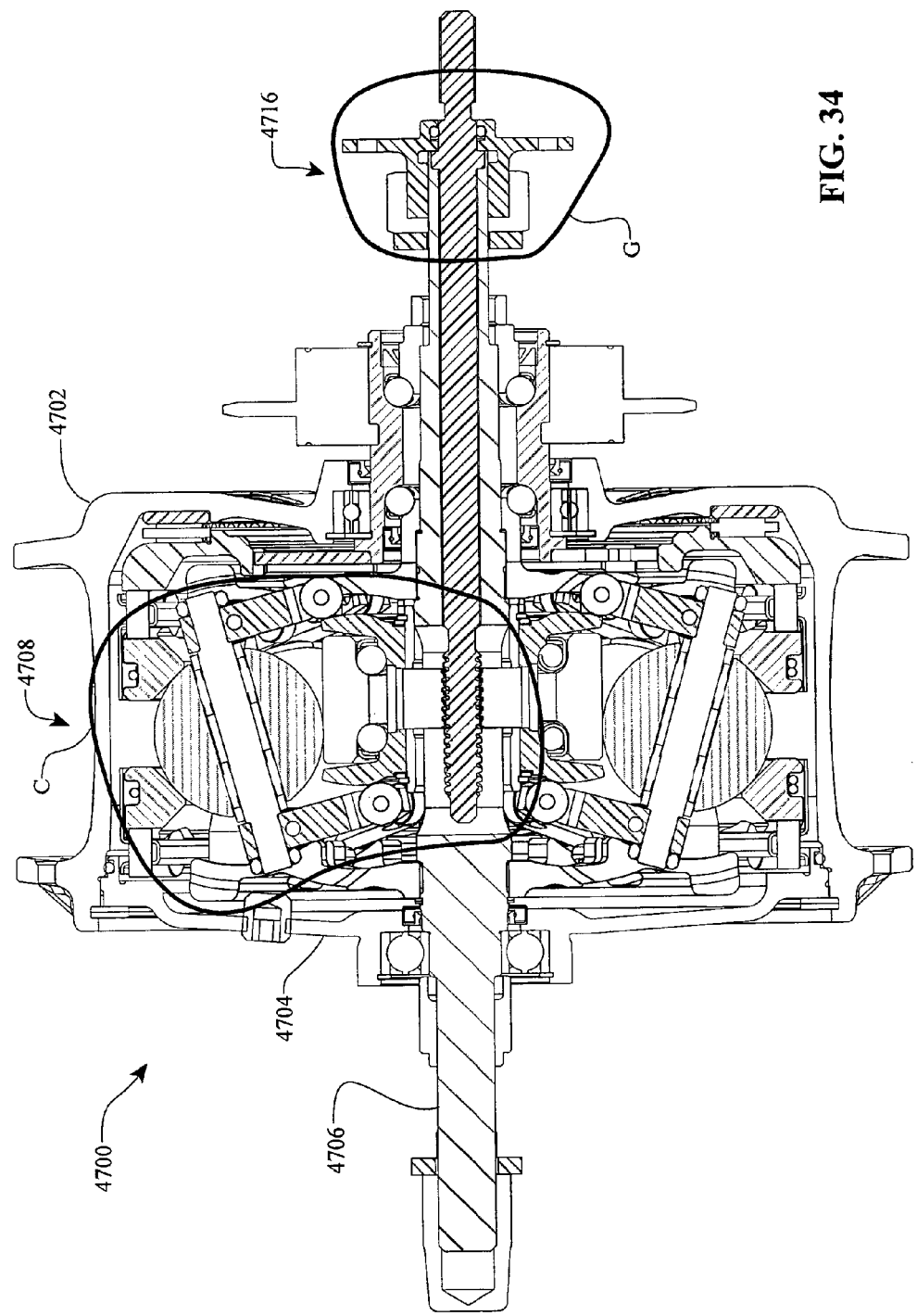
FIG. 34 is a cross-sectional view of a CVT that can be used with the control systems described here.

Referencing FIG. 34 now, a bicycle rear wheel hub incorporates a continuously variable transmission (CVT) 4700. A CVT 4700 and equivalent variants thereof may be used in applications other than bicycles, including but not limited to, other human powered vehicles, light electrical vehicles, hybrid human-, electric-, or internal combustion powered vehicles, industrial equipment, wind turbines, etc. Any technical application that requires modulation of mechanical power transfer between an input source and an output load can implement embodiments of a CVT 4700 in its power train. Embodiments of the CVT 4700, and related CVTs, are described in U.S. application Ser. No. 11/543,311, filed Oct. 3, 2006, and entitled "Continuously Variable Transmission," the disclosure of which is explicitly hereby incorporated herein by reference in its entirety.

As illustrated in FIG. 34, the CVT 4700 includes a shell or hub shell 4702 that couples to a cover or hub cover 4704. The hub shell 4702 and the hub cover 4704 form a housing that, among other things, functions to enclose most of the components of the CVT 4700. A main shaft or main axle 4706 provides axial and radial positioning and support for other components of the CVT 4700. The CVT 4700 can include a variator subassembly 4708 as shown in detail view C, and a shift rod and/or shifter interface subassembly 4716 as shown in detail view G.

Figure 35:
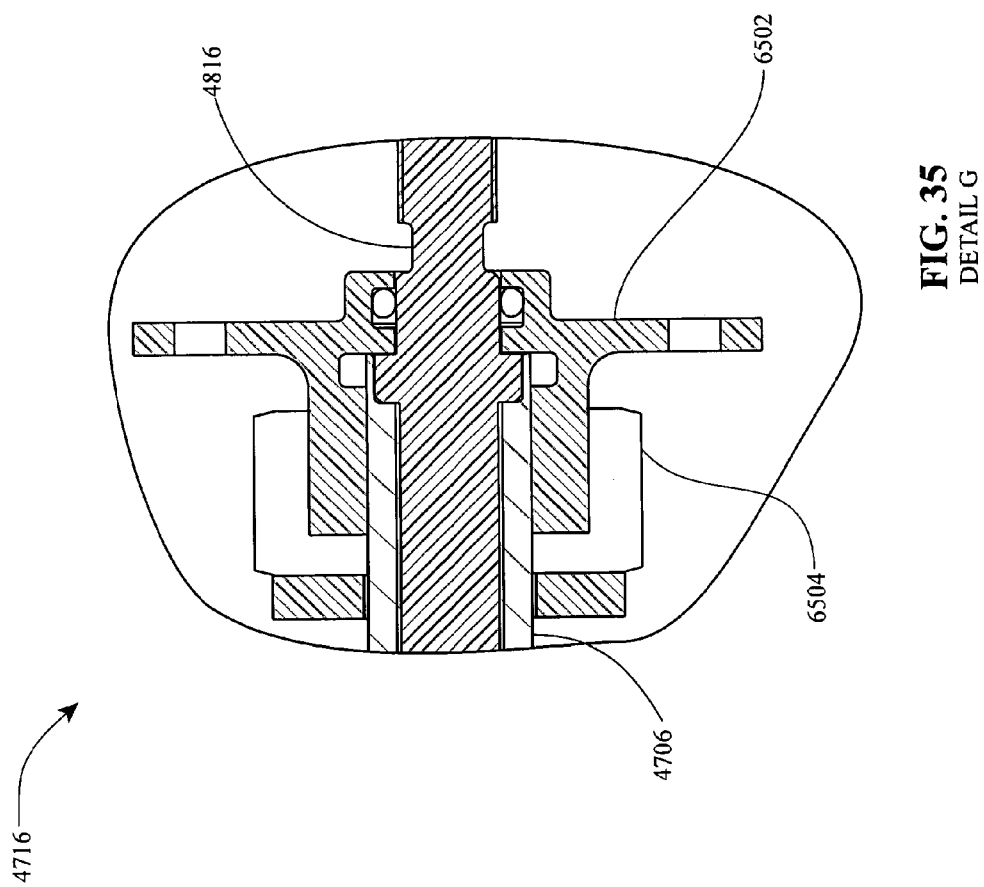
FIG. 35 is a cross-sectional view of a shifting mechanism for a CVT that can be used with the control systems and methods described here.

Referencing FIG. 35, the shifter interface 4716 serves, among other things, to cooperate with a shifting mechanism (such as the control systems, including shift actuator motor, described above) to actuate the shift rod 4816 for changing the speed ratio of the CVT 4700. The shifter interface 4716 also serves to retain the shift rod 4816 and constrain the axial displacement of the shift rod 4816. In the embodiment illustrated, the shifter interface 4716 includes a shift rod retainer nut 6502 adapted to receive the shift rod 4816 and to mount about the main axle 4706. The shifter interface 4716 may also include a nut 6504 adapted to be threaded on the shift rod retainer nut 6502 for, among other things, coupling the main axle 4706 to a dropout (not shown) of a bicycle and to prevent the shift rod retainer nut 6502 from unthreading off the main axle 4706 during operation of the shifter mechanism.

Figure 36:
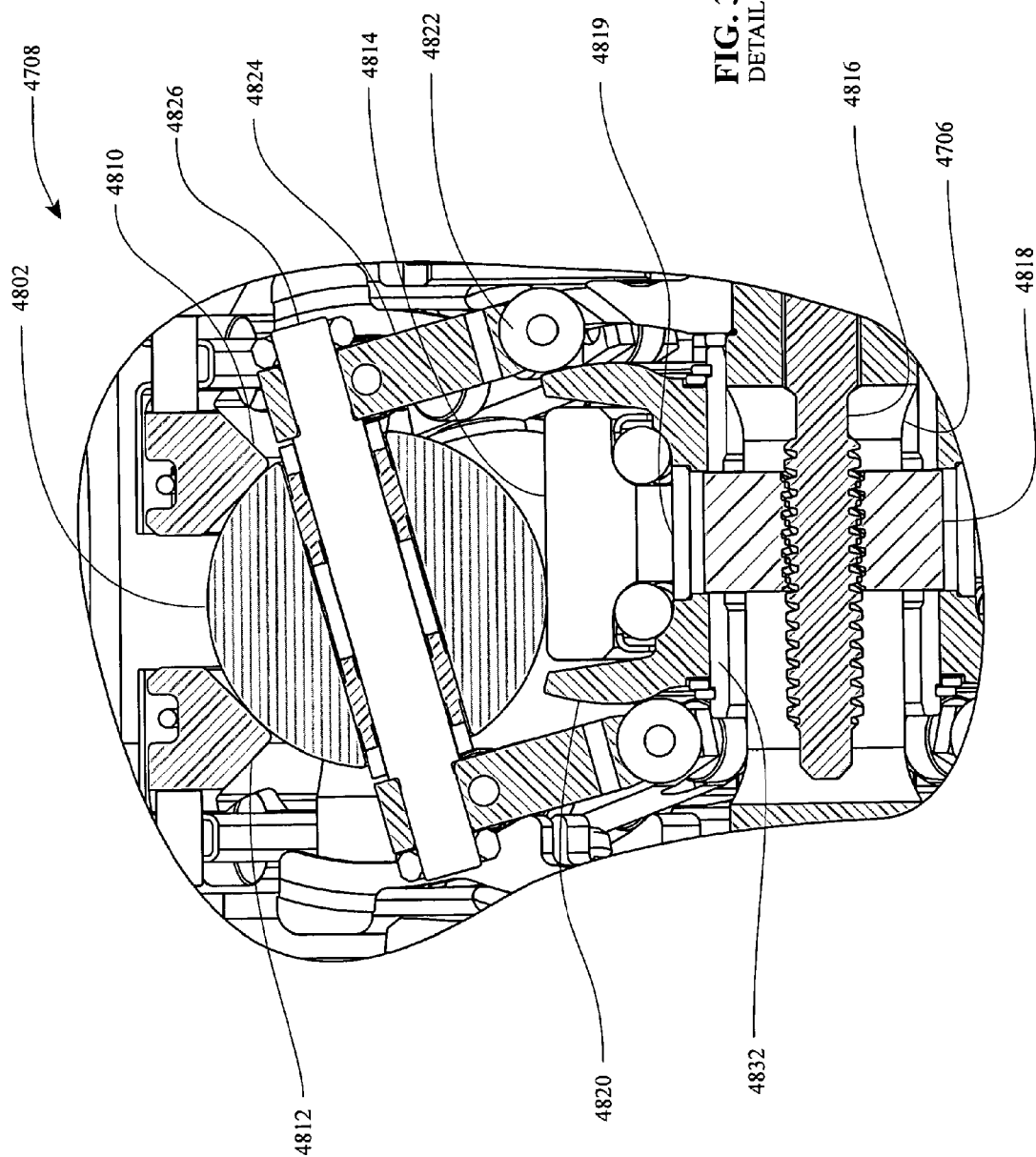
FIG. 36 is a cross-sectional view of a CVT variator mechanism for adjusting the speed ratio of a CVT, which can use the shifting mechanism of FIG. 36.

Referring now to FIG. 36, in one embodiment the variator subassembly 4708 includes a number of traction power rollers 4802 placed in contact with an input traction ring 4810, and output traction ring 4812, and a support member or idler 4814. A shift rod 4816 threads into a shift rod nut 4818, which is located between and is adapted to interact with shift cams 4820. An idler bushing 4832 is piloted by the main axle 4706 and interfaces with the shift rod nut 4818. A shift rod nut collar 4819 is mounted coaxially about the main axle 4706 and is positioned between the shift cams 4820. The shift cams 4820 contact the cam rollers 4822. Each of several legs 4824 couples on one end to a cam roller 4822. Another end of each leg 4824 couples to a power roller axle 4826, which provides a tiltable axis of rotation for the power roller 4802.

Figure 40:
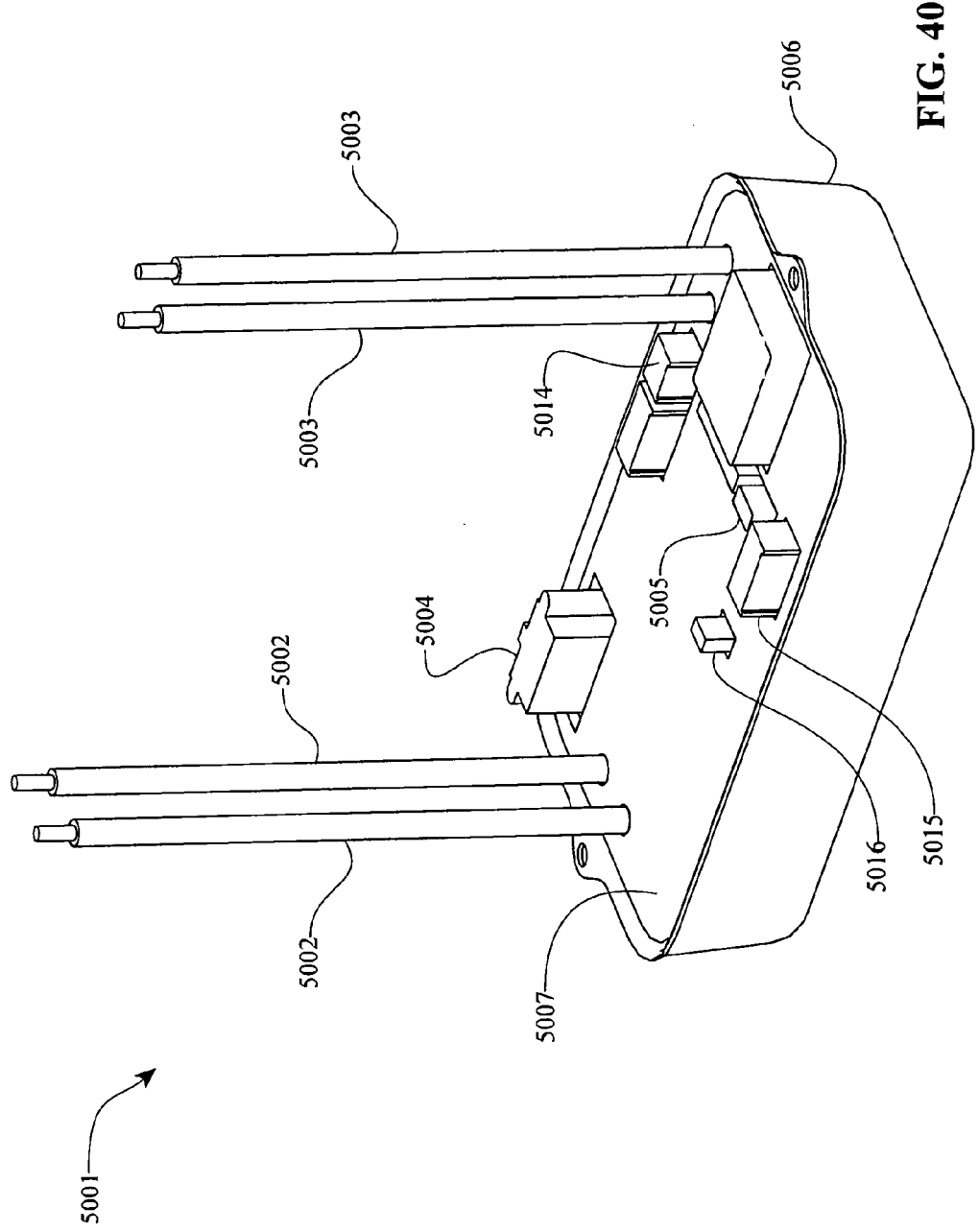
FIG. 40 is a perspective view of an exemplary controller that can be used EV drivetrains disclosed here.

Referring now to FIG. 40, in one embodiment a controller 5001 can include a controller housing 5006 having a set of drive cables 5002 and a set of power source cables 5003. The drive cables 5002 can be configured to connect electrically the controller 5001 to a drive motor. The power source cables 5003 can be configured to connect electrically the controller 5001 to a power source, such as a battery. In some embodiments, the drive cables 5002 and power source cables 5003 are 10AWG wire. The controller 5001 can further include an actuator connector 5004, which can be configured to connect to a mating connector of a mechanical actuator, said mechanical actuator configured to adjust a transmission speed ratio of a CVT. The controller 5001 can be provided with a communication port 5005 (for example, a USB port) that can facilitate communication between the controller 5001 and a computer, for example, or any other data or programming input or output device. A display connector 5014 can be provided to facilitate the electrical communication of user commands, such as a desired operating mode, between the controller 5001 and a user interface. In one embodiment, the controller 5001 includes a throttle-brake-charger connector 5015 that is configured to connect to various sensors on a vehicle such as a throttle sensor, a brake sensor, and/or a charger sensor. In some embodiments, the controller 5001 can also include a serial communication port 5016. The serial communication port 5016 can be configured to allow programming of the controller 5001 using a process, for example, commonly known as flashing. The serial communication port 5016 is typically provided for prototype and development purposes. In one embodiment, the actuator connector 5004, the communication port 5005, the display connector 5014, the throttle-brake-charger connector 5015, and the serial communication port 5016 are arranged on one side of the controller housing 5006. In some embodiments, the controller housing 5006 can be a generally rectangular-shaped, sheet metal enclosure having an interior cavity, which can be filled with a potting 5007. The potting 5007 can be a plastic or resin material.

Figure 41:
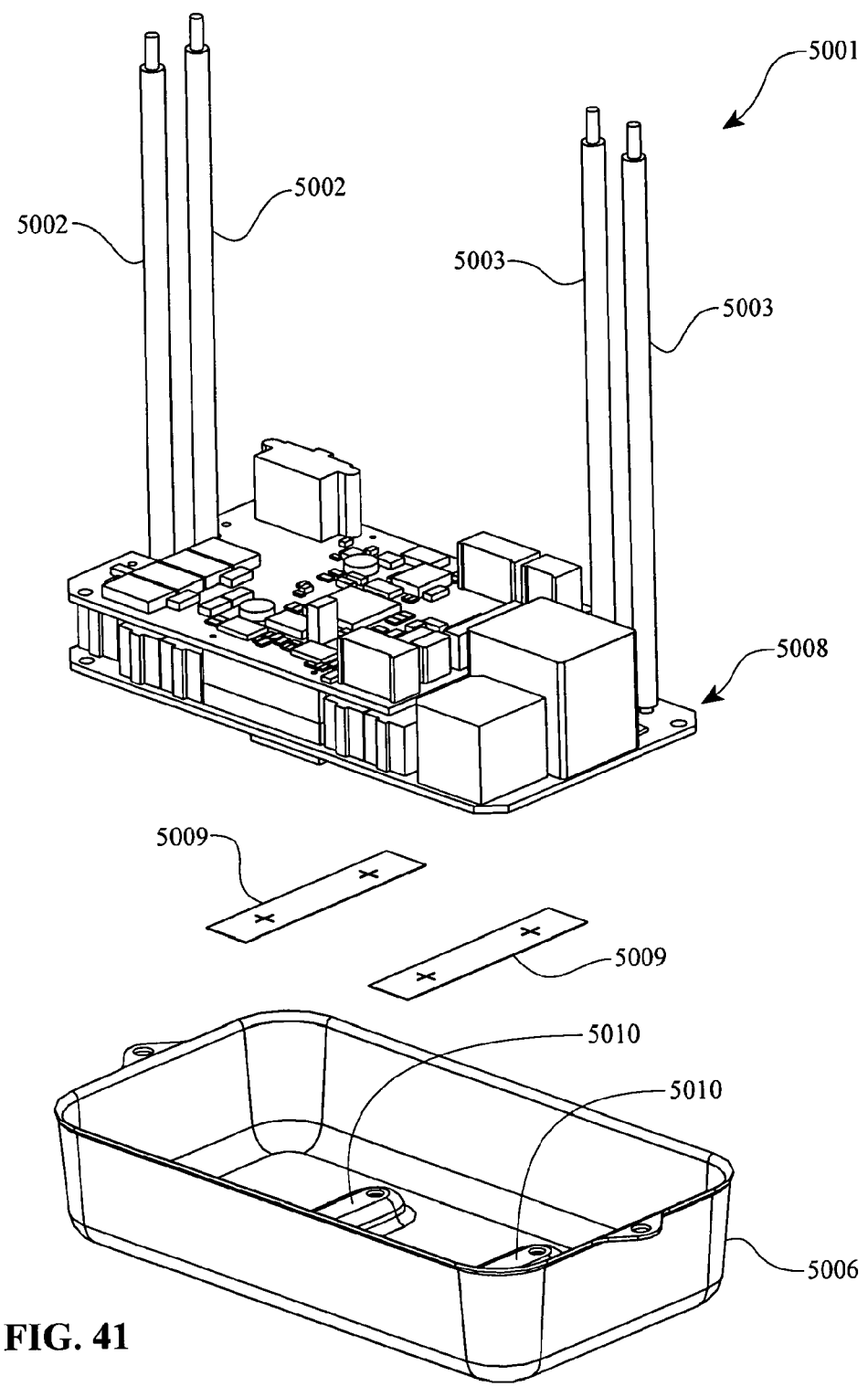
FIG. 41 is an exploded perspective view of certain components of the controller of FIG. 40.
Figure 42:
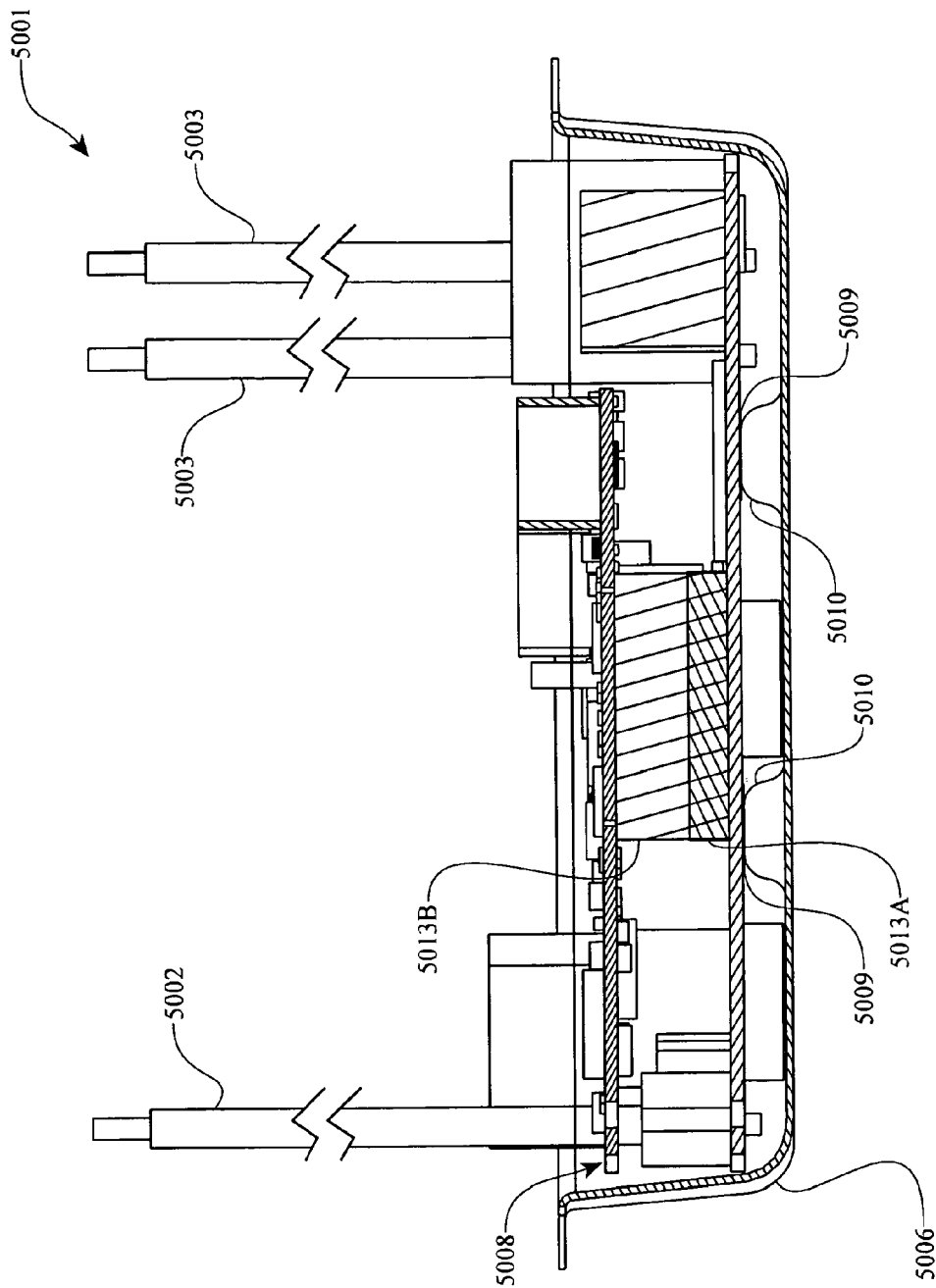
FIG. 42 is a partial, cross-section showing certain components of the controller of FIG. 40.

Turning now to FIGS. 41 and 42, in one embodiment, the controller 5001 includes a controller board assembly 5008 that can be housed in the controller housing 5006 and enclosed with the potting 5007. The controller board assembly 5008 can be attached to the controller housing 5006. In one embodiment, the drive cables 5002, the power source cables 5003, the actuator connector 5004, the communication port 5005, the display connector 5014, the throttle-brake-charger connector 5015, and the serial communication port 5016 couple to the controller board assembly 5008. The potting 5007 can be arranged to expose the aforementioned connections while enclosing a substantial portion of the controller board assembly 5008. In some embodiments, a number of thermal pads 5009 are placed between the controller board assembly 5008 and the controller housing 5006. The thermal pads 5009 can be located on a number of controller body protrusions 5010. The controller body protrusions 5010 can be formed on the interior cavity of the controller housing 5006.

Figure 43:
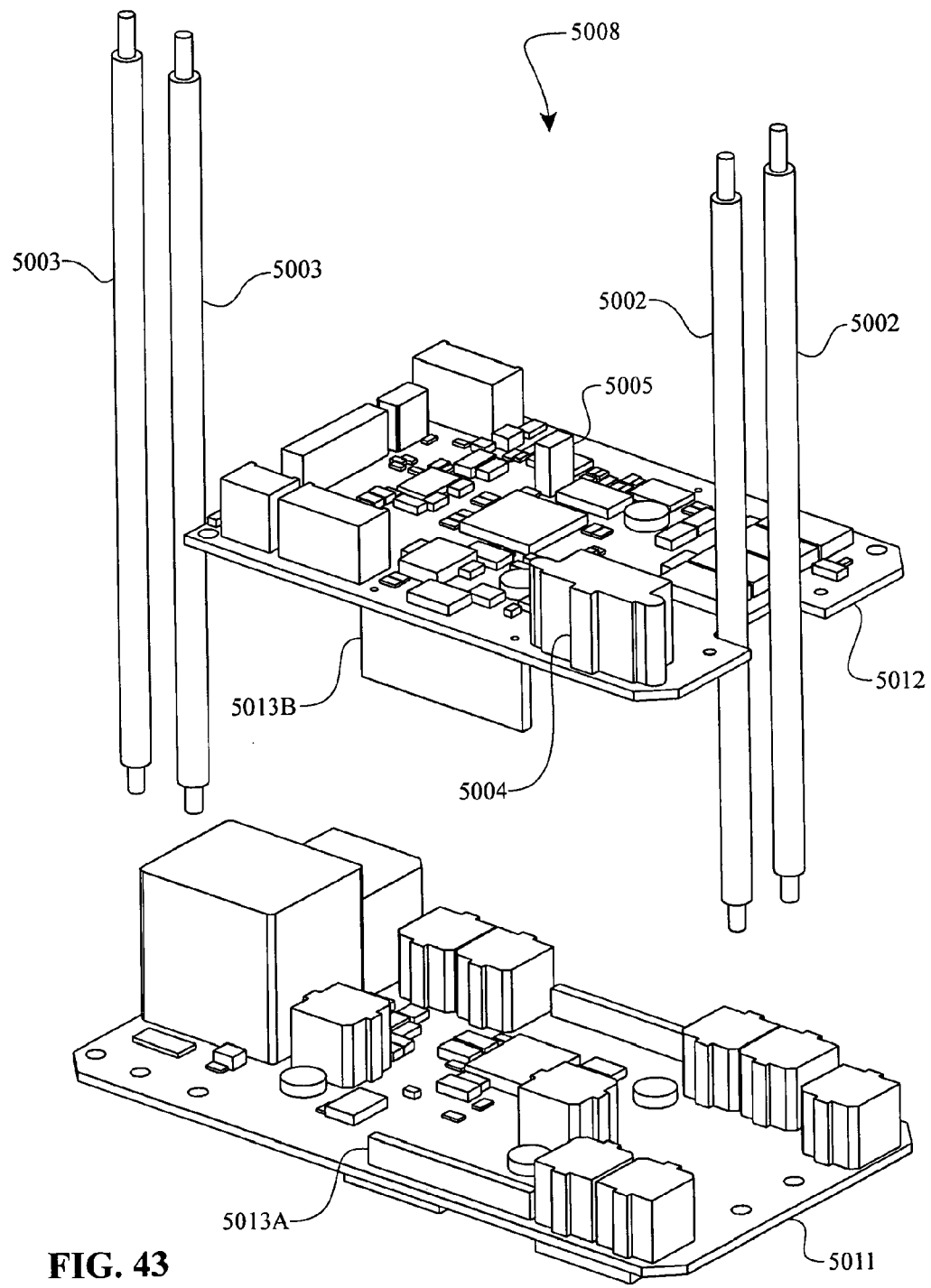
FIG. 43 is an exploded, assembly view of an actuator control circuit board and a drive motor control circuit board that can be configured for use with the controller of FIG. 40.

Passing now to FIG. 43, in one embodiment the controller board assembly 5008 can include a motor control board 5011 and a transmission control board 5012. The motor control board 5011 preferably includes electrical circuitry (that is, integrated electrical circuits, memory circuits, firmware, etc.) configured to facilitate control of a drive motor. The transmission control board 5012 preferably includes electrical circuitry (that is, integrated electrical circuits, memory circuits, firmware, etc.) configured to facilitate control of a transmission, such as a CVT, A crossover connector 5013 can be provided to electrically connect the motor control board 5011 to the transmission control board 5012. In some embodiments, the motor control board 5011 and the transmission control board 5012 are assembled so that the motor control board 5011 is below the transmission control board 5012 in the controller housing 5006. The crossover connector 5013 can include a female connection body 5013A and a male connection body 5013B. The female connection body 5013A can be attached to the motor control board 5011. The male connection body 5013B can be attached to the transmission control board 5012. During assembly, the female connection body 5013A is aligned with the male connection body 5013B to facilitate electrical communication between the motor control board 5011 and the transmission control board 5012. In some embodiments, the control board 5011 can be disabled so that the controller 5001 can be used with a separate drive motor controller already provided with an EV. In such cases, the control board 5011 is not employed, and the transmission control board 5012 is configured to communicate with the separate drive motor controller.

The foregoing description details certain preferred embodiments of the present invention and describes the best mode contemplated. It will be appreciated, however, that no matter how detailed the foregoing appears in text, the invention can be practiced in many ways. The scope of the present invention should therefore be construed in accordance with the appended claims and any equivalents thereof.

What is claimed is:
1. A drive system comprising:
a continuously variable transmission (CVT) having a plurality of spherical planets arranged radially about a longitudinal axis of the transmission;
a control system coupled to the CVT, the control system comprising:
a mechanical actuator coupled to the CVT;
a controller configured to be in electrical communication with the mechanical actuator, the controller configured to control the mechanical actuator;
a data display configured to be in electrical communication with the controller, the data display having at least one button for selecting from a plurality of operating modes;
a plurality of sensors coupled to the controller; and
a shifter interface coupled to the actuator motor, the shifter interface configured to adjust the plurality of tiltable spherical planets, wherein the CVT is enclosed in a housing integrated into a wheel of an electric vehicle, the housing adapted to cooperate with the mechanical actuator, and wherein the mechanical actuator is configured to adjust an angle of the tiltable spherical planets based at least in part on one of the plurality of operating modes and on an indication of transmission speed ratio of the CVT.

2. The drive system of claim 1, wherein the controller is configured to control the mechanical actuator based at least in part on data indicative of a transmission speed ratio and a vehicle speed.

3. The drive system of claim 2, wherein the plurality of sensors comprises a sensor configured to provide vehicle speed data.

4. The drive system of claim 3, wherein the plurality of sensors comprises a sensor configured to provide data associated with the transmission speed ratio of the CVT.

5. The drive system of claim 4, wherein the plurality of sensors comprises a sensor configured to provide data associated with a battery voltage.

6. The drive system of claim 4, wherein the plurality of sensors comprises a sensor configured to provide data associated with a current level provided to an electric drive motor.

7. A control system for use with a continuously variable transmission (CVT), the CVT having a plurality of tiltable spherical power adjusters, the control system comprising:
- a controller configured to provide a plurality of operating modes for the CVT, said modes being selectable by a user of the CVT;
- an actuator motor coupled to the CVT and in electrical communication with the controller;
- a drive motor coupled to the CVT and in electrical communication with the controller;
- an actuator position sensor coupled to the actuator motor and in electrical communication with the controller, wherein the actuator position sensor is configured to provide an indication of a transmission speed ratio of the CVT;
- a shifter interface coupled to the actuator motor, the shifter interface configured to adjust the plurality of tiltable spherical power adjusters; and
- a user interface configured to communicate with the controller, the user interface having a display and at least one button for selecting from the plurality of operating modes, wherein the CVT is enclosed in a housing integrated into a wheel of an electric vehicle, the housing adapted to cooperate with the actuator motor, the drive motor, and the actuator position sensor, and wherein the actuator motor is configured to adjust an angle of the tiltable spherical power adjusters based at least in part on one of the plurality of operating modes and on the indication of transmission speed ratio of the CVT.

8. The control system of claim 7, wherein said operating modes comprise an economy mode and a performance mode.

9. The control system of claim 7, wherein said operating modes comprise a hill climbing mode.

10. The control system of claim 7, wherein the controller is configured to provide a current to the drive motor, the level of said current being dependent at least partially on the selected mode.

11. The control system of claim 10, wherein the level of said current is further dependent on a battery voltage.

12. The control system of claim 10, wherein the level of said current is further dependent on a throttle position.

13. The control system of claim 10, wherein the level of said current is further dependent on data associated with an efficiency of the drive motor versus current draw.

* * * * *

UNITED STATES PATENT AND TRADEMARK OFFICE
CERTIFICATE OF CORRECTION

PATENT NO. : 8,738,255 B2  
APPLICATION NO. : 12/525294  
DATED : May 27, 2014  
INVENTOR(S) : Carter et al.

Page 1 of 1

It is certified that error appears in the above-identified patent and that said Letters Patent is hereby corrected as shown below:

In the Specification

Column 8 at line 44 (Equation 6)

Replace "$$a_v = \frac{(T_m - I_{eq_m}\alpha)i_o i_{cvp}\eta_{cvp}}{M_v r_d} - gf_r$$" with $$a_v = \frac{(T_m - I_{eq_m}\alpha_m)i_o i_{cvp}\eta_{cvp}}{M_v r_d} - gf_r$$ --.

Signed and Sealed this  
Eleventh Day of November, 2014

Michelle K. Lee  
*Deputy Director of the United States Patent and Trademark Office*